US012593172B2

(12) United States Patent
Hiroe

(10) Patent No.: US 12,593,172 B2
(45) Date of Patent: Mar. 31, 2026

(54) SIGNAL PROCESSING APPARATUS AND SIGNAL PROCESSING METHOD

(71) Applicant: SONY GROUP CORPORATION, Tokyo (JP)

(72) Inventor: Atsuo Hiroe, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 180 days.

(21) Appl. No.: 18/549,014

(22) PCT Filed: Jan. 13, 2022

(86) PCT No.: PCT/JP2022/000834
§ 371 (c)(1),
(2) Date: Sep. 5, 2023

(87) PCT Pub. No.: WO2022/190615
PCT Pub. Date: Sep. 15, 2022

(65) Prior Publication Data
US 2024/0155290 A1 May 9, 2024

(30) Foreign Application Priority Data
Mar. 10, 2021 (JP) ............................ JP2021-038488

(51) Int. Cl.
*H04R 3/00* (2006.01)

(52) U.S. Cl.
CPC .................................... *H04R 3/005* (2013.01)

(58) Field of Classification Search
CPC .............................. H04R 3/005; H04R 1/1083
USPC .............................................. 381/56, 58, 119
See application file for complete search history.

(56) References Cited

U.S. PATENT DOCUMENTS

2012/0263315 A1* 10/2012 Hiroe .................. G10L 21/0216 381/92
2022/0028406 A1* 1/2022 Burmistrov ............. G06F 18/21

FOREIGN PATENT DOCUMENTS

| | | | |
|---|---|---|---|
| JP | 10-051889 | A | 2/1998 |
| JP | 2006-072163 | A | 3/2006 |
| JP | 2007-328516 | A | 12/2007 |
| JP | 2008-233866 | A | 10/2008 |
| JP | 4182444 | B2 | 11/2008 |
| JP | 4449871 | B2 | 4/2010 |
| JP | 2010-121975 | A | 6/2010 |

(Continued)

OTHER PUBLICATIONS

International Search Report and Written Opinion of PCT Application No. PCT/JP2022/000834, issued on Mar. 29, 2022, 02 pages of ISRWO.

(Continued)

*Primary Examiner* — William A Jerez Lora
(74) *Attorney, Agent, or Firm* — CHIP LAW GROUP

(57) ABSTRACT

Provided is a signal processing apparatus that includes a reference signal generating section that generates a reference signal corresponding to a target sound on the basis of a mixed sound signal which is recorded with multiple microphones arranged at different positions and is a mixture of the target sound and a non-target sound. The signal processing apparatus further includes a sound source extracting section that extracts, from the mixed sound signal of one frame or multiple frames, a signal of one frame which is similar to the reference signal and in which the target sound is more enhanced.

18 Claims, 15 Drawing Sheets

(56) References Cited

FOREIGN PATENT DOCUMENTS

| | | | |
|---|---|---|---|
| JP | 2011-175114 | A | 9/2011 |
| JP | 2011-191423 | A | 9/2011 |
| JP | 2012-150237 | A | 8/2012 |
| JP | 2012-234150 | A | 11/2012 |
| JP | 2014-219467 | A | 11/2014 |

OTHER PUBLICATIONS

Makishima, et al., "Independent Deeply Learned Matrix Analysis for Determined Audio Source Separation", IEEE/ACM Transactions on Audio, Speech, and Language Processing, vol. 27, No. 10, Oct. 2019, pp. 1601-1615.

Delcroix, et al., "Single Channel Target Speaker Extraction and Recognition with Speaker Beam", IEEE International Conference on Acoustics, Speech and Signal Processing (ICASSP), Apr. 15-20, 2018, pp. 5554-5558.

Wang, et al., "VOICEFILTER: Targeted Voice Separation by Speaker-Conditioned Spectrogram Masking", Audio and Speech Processing, Jun. 19, 2019, 5 pages.

Liu, et al., "Experiments on deep learning for speech denoising", Proceedings of the Annual Conference of the International Speech Communication Association, INTERSPEECH, 2014, 5 pages.

Hyvarinen, et al., "Independent Component Analysis", John Wiley & Sons, Jun. 2001.

Atsuo Hiroe "Similarity and Independence Aware Beamformer : Method for Target Source Extraction using Magnitude Spectogram as Reference." Oct. 25-29, 2020, Shanghai, China, pp. 5.

Japanese Patent Application No. 2019-073542.

Japanese Patent Application No. 2019-227192, filed on Dec. 17, 2019.

* cited by examiner

WAVEFORM OF OBSERVATION SIGNAL
AMPLITUDE
SAMPLE SIGNAL (OR TIME)
51
52
53
SEGMENTATION & WINDOWING

SHORT-TIME FOURIER TRANSFORM

OBSERVATION SIGNAL SPECTROGRAM
FREQUENCY BIN NUMBER
FRAME NUMBER (OR TIME)
51A
52A
53A

SIGNAL PROCESSING APPARATUS AND SIGNAL PROCESSING METHOD

CROSS REFERENCE TO RELATED APPLICATIONS

This application is a U.S. National Phase of International Patent Application No. PCT/JP2022/000834 filed on Jan. 13, 2022, which claims priority benefit of Japanese Patent Application No. JP 2021-038488 filed in the Japan Patent Office on Mar. 10, 2021. Each of the above-referenced applications is hereby incorporated herein by reference in its entirety.

TECHNICAL FIELD

The present technology relates to a signal processing apparatus, a signal processing method, and a program and, in particular, relates to a signal processing apparatus, a signal processing method, and a program that make it possible to improve precision of target sound extraction.

BACKGROUND ART

There has been technologies proposed to extract a sound that is desired to be extracted (hereinafter, referred to as a target sound as appropriate) from a mixed sound signal which is a mixture of the target sound and a sound that is desired to be removed (hereinafter, referred to as an interfering sound as appropriate) (e.g., see PTL 1 to PTL 3 described below.).

CITATION LIST

Patent Literature

[PTL 1]
Japanese Patent Laid-open No. 2006-72163
[PTL 2]
Japanese Patent No. 4449871
[PTL 3]
Japanese Patent Laid-open No. 2014-219467

SUMMARY

Technical Problem

It is desired in such a field to improve precision of target sound extraction.

The present technology has been made in view of such a situation, and an object thereof is to make it possible to improve precision of target sound extraction.

Solution to Problem

A signal processing apparatus according to a first aspect of the present technology includes a reference signal generating section that generates a reference signal corresponding to a target sound on the basis of a mixed sound signal which is recorded with multiple microphones arranged at different positions and is a mixture of the target sound and a non-target sound, and a sound source extracting section that extracts, from the mixed sound signal of one frame or multiple frames, a signal of one frame which is similar to the reference signal and in which the target sound is more enhanced.

A signal processing method or program according to the first aspect of the present technology includes steps of generating a reference signal corresponding to a target sound on the basis of a mixed sound signal which is recorded with multiple microphones arranged at different positions and is a mixture of the target sound and a non-target sound, and extracting, from the mixed sound signal of one frame or multiple frames, a signal of one frame which is similar to the reference signal and in which the target sound is more enhanced.

In the first aspect of the present technology, a reference signal corresponding to a target sound is generated on the basis of a mixed sound signal which is recorded with multiple microphones arranged at different positions and is a mixture of the target sound and a non-target sound, and a signal of one frame which is similar to the reference signal and in which the target sound is more enhanced is extracted from the mixed sound signal of one frame or multiple frames.

A signal processing apparatus according to a second aspect of the present technology includes a reference signal generating section that generates a reference signal corresponding to a target sound on the basis of a mixed sound signal which is recorded with multiple microphones arranged at different positions and is a mixture of the target sound and a non-target sound, and a sound source extracting section that extracts, from the mixed sound signal, a signal which is similar to the reference signal and in which the target sound is more enhanced. In a case where a process of generating the reference signal and a process of extracting the signal from the mixed sound signal are performed iteratively, the reference signal generating section generates a new reference signal on the basis of the signal extracted from the mixed sound signal, and the sound source extracting section extracts the signal from the mixed sound signal on the basis of the new reference signal.

A signal processing method or program according to the second aspect of the present technology includes performing a process of generating a reference signal corresponding to a target sound on the basis of a mixed sound signal which is recorded with multiple microphones arranged at different positions and is a mixture of the target sound and a non-target sound and a process of extracting, from the mixed sound signal, a signal which is similar to the reference signal and in which the target sound is more enhanced. In a case where the process of generating the reference signal and the process of extracting the signal from the mixed sound signal are performed iteratively, the signal processing method or program includes steps of generating a new reference signal on the basis of the signal extracted from the mixed sound signal, and extracting the signal from the mixed sound signal on the basis of the new reference signal.

In the second aspect of the present technology, a process of generating a reference signal corresponding to a target sound on the basis of a mixed sound signal which is recorded with multiple microphones arranged at different positions and is a mixture of the target sound and a non-target sound and a process of extracting, from the mixed sound signal, a signal which is similar to the reference signal and in which the target sound is more enhanced are performed. In a case where the process of generating the reference signal and the process of extracting the signal from the mixed sound signal are performed iteratively, a new reference signal is generated on the basis of the signal extracted from the mixed sound signal, and the signal is extracted from the mixed sound signal on the basis of the new reference signal.

A signal processing apparatus according to a third aspect of the present technology includes a reference signal generating section that generates a reference signal corresponding to a target sound on the basis of a mixed sound signal which is recorded with multiple microphones arranged at different positions and is a mixture of the target sound and a non-target sound, and a sound source extracting section that estimates an extraction filter as a solution that optimizes an objective function that includes an extraction result being a signal which is similar to the reference signal and in which the target sound is more enhanced by the extraction filter, and an adjustable parameter of a sound source model representing similarity between the extraction result and the reference signal, the objective function reflecting independence and the similarity between the extraction result and a separation result of another imaginary sound source, and extracts the signal from the mixed sound signal on the basis of the estimated extraction filter.

A signal processing method or program according to the third aspect of the present technology includes steps of generating a reference signal corresponding to a target sound on the basis of a mixed sound signal which is recorded with multiple microphones arranged at different positions and is a mixture of the target sound and a non-target sound, estimating an extraction filter as a solution that optimizes an objective function that includes an extraction result being a signal which is similar to the reference signal and in which the target sound is more enhanced by the extraction filter, and an adjustable parameter of a sound source model representing similarity between the extraction result and the reference signal, the objective function reflecting independence and the similarity between the extraction result and a separation result of another imaginary sound source, and extracting the signal from the mixed sound signal on the basis of the estimated extraction filter.

In the third aspect of the present technology, a reference signal corresponding to a target sound is generated on the basis of a mixed sound signal which is recorded with multiple microphones arranged at different positions and is a mixture of the target sound and a non-target sound. An extraction filter is extracted as a solution that optimizes an objective function that includes an extraction result being a signal which is similar to the reference signal and in which the target sound is more enhanced by the extraction filter, and an adjustable parameter of a sound source model representing similarity between the extraction result and the reference signal, the objective function reflecting independence and the similarity between the extraction result and a separation result of another imaginary sound source. The signal is extracted from the mixed sound signal on the basis of the estimated extraction filter.

DESCRIPTION OF EMBODIMENT

[Notation in Present Specification]

(Notation of Formulae)

Figure 1:
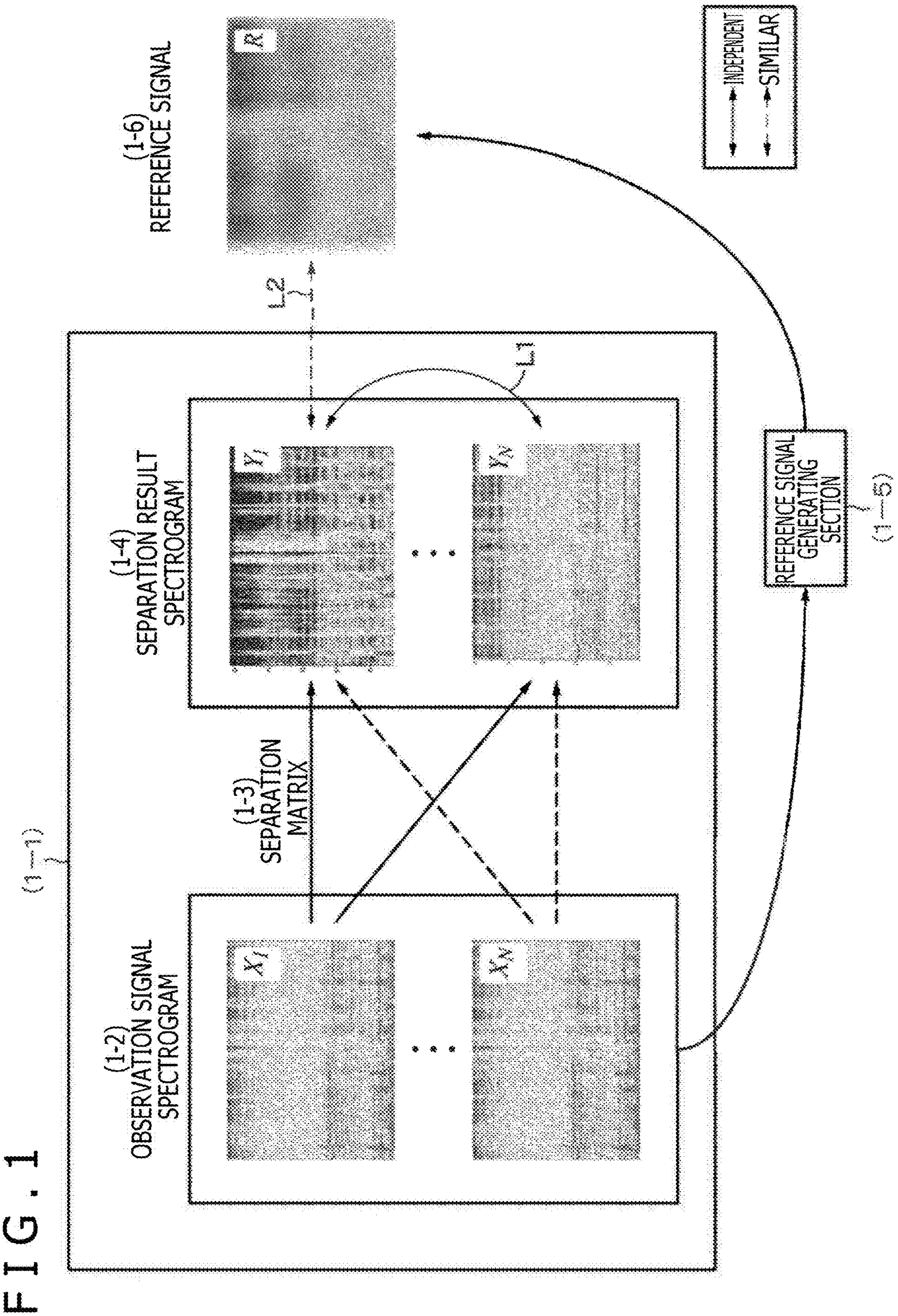
FIG. 1 is a figure for explaining an example of a sound source separation procedure according to the present disclosure.

Note that formulae are explained hereinbelow in accordance with the notation described below.

- conj(X) represents the complex conjugate of a complex number X. In formulae, the complex conjugate of X is represented by X with a line over it.
- Assignments of values are represented by "=" or "←." In particular, an operation in which the equality between both sides does not hold true (e.g., "x←x+1") is always represented by "←."
- Matrices are represented by capital letters, and vectors and scalars are represented by lowercase letters. In addition, in formulae, matrices and vectors are represented by thick letters, and scalars are represented by italics.

Definitions of Terms

In the present specification, "sounds (sound signals)" and "voices (voice signals)" are used with different meanings. "Sounds" are used as a term having a typical meaning such as sounds or audio, and "voices" are used as a term representing voices or speeches.

In addition, "separation" and "extraction" are used with different meanings as follows. "Separation" is the opposite of mixing, and is used as a term meaning dividing a signal which is a mixture of multiple raw signals into the respective raw signals (there are both multiple inputs and multiple outputs). "Extraction" is used as a term meaning taking out one raw signal from a signal which is a mixture of multiple raw signals (there are multiple inputs, but there is one output).

"Applying a filter" and "filtering" have the same meaning, and similarly, "applying a mask" and "masking" have the same meaning.

Overview and Background of Present Disclosure and Problems that should be Considered To start with, in order to facilitate understanding of the present disclosure, an overview and the background of the present disclosure and problems that should be considered in the present disclosure are explained.

Overview of Present Disclosure

The present disclosure relates to sound source extraction using reference signals (references). In addition to recording, with multiple microphones, of a signal which is a mixture of a sound that is desired to be extracted (target sound) and a sound that is desired to be eliminated (interfering sound), a signal processing apparatus generates a "rough" amplitude spectrogram corresponding to the target sound, and uses the amplitude spectrogram as a reference signal to thereby generate an extraction result which is similar to and more precise than the reference signal. That is, an embodiment of the present disclosure is a signal processing apparatus that extracts, from the mixed sound signal, a signal which is similar to the reference signal and in which the target sound is more enhanced.

In a process performed at the signal processing apparatus, an objective function reflecting both the similarity between the reference signal and the extraction result and the independence between the extraction result and another imaginary separation result is prepared, and an extraction filter is determined as a solution that optimizes the objective function. With use of a deflation method used in blind sound source separation, a signal to be output can be a signal of only one sound source corresponding to the reference signal. Since it can be regarded as a beamformer considering both the similarity and the independence, it is referred to as a Similarity-and-Independence-aware Beamformer (SIBF) as appropriate hereinbelow.

BACKGROUND

The present disclosure relates to sound source extraction using reference signals (references). In addition to recording, with multiple microphones, of a signal which is a mixture of a sound that is desired to be extracted (target sound) and a sound that is desired to be eliminated (interfering sound), a "rough" amplitude spectrogram corresponding to the target sound is acquired or generated, and the amplitude spectrogram is used as a reference signal to thereby generate an extraction result which is similar to and more precise than the reference signal.

It is assumed that assumed situations where the present disclosure is used satisfy all of conditions (1) to (3) described below, for example.

(1) An observation signal is recorded synchronously with multiple microphones.

(2) It is assumed that a zone, that is, a time range, in which a target sound is being produced is known, and the observation signal described before includes at least the zone.

(3) It is assumed that, as a reference signal, a rough amplitude spectrogram (rough target sound spectrogram) corresponding to the target sound has been acquired or can be generated from the observation signal described before.

Each of the conditions described above is explained supplementarily.

Regarding the condition (1) described above, the microphones may be or may not be fixed, and in either case, the positions of the microphones and sound sources may be unknown. Examples of fixed microphones include a microphone array, and conceivable examples of unfixed microphones include pin microphones or the like that are worn by speakers.

Regarding the condition (2) described above, the zone in which the target sound is being produced is an utterance zone in a case where, for example, a voice of a particular speaker is to be extracted. It is assumed that, while the zone is known, it is unknown whether or not the target sound is being produced outside the zone. That is, the hypothesis that there is no target sound outside the zone does not hold true in some cases.

Regarding (3) described above, the rough target sound spectrogram means a spectrogram that has deteriorated as compared with the true target sound spectrogram since the spectrogram meets one or more of the following conditions a) to f).

a) It is data of real numbers not including phase information.

b) The target sound is dominant, but an interfering sound is also included.

c) The interfering sound has mostly been removed, but the sound is distorted as a side effect of the removal.

d) In the time direction and/or frequency direction, the resolution has deteriorated as compared with the true target sound spectrogram.

e) Unlike the observation signal, magnitude comparison of the scales of amplitude of the spectrograms is meaningless. For example, even if the amplitude of the rough target sound spectrogram is half the amplitude of an observation signal spectrogram, this does not necessarily mean that the target sound and the interfering sound are included in the observation signal at equal magnitude.

f) It is an amplitude spectrogram generated from a non-sound signal.

The rough target sound spectrogram described above is acquired or generated by a method like the ones below, for example.

- A sound is recorded with a microphone placed near the target sound (e.g., a pin microphone worn by a speaker), and an amplitude spectrogram is determined from the recorded sound (this corresponds to the example of b described above).
- A neural network (NN) to extract a particular type of sound in the amplitude spectrogram domain is trained in advance, and the observation signal is input to the neural network (this corresponds to a, c, and e described above).
- An amplitude spectrogram is determined from a signal acquired with a sensor such as a bone conduction microphone that is different from a typically used air conduction microphone (this corresponds to c described above).
- A linear frequency-domain spectrogram is generated by applying a predetermined transform on data equivalent to a spectrogram calculated in a non-linear frequency domain such as the Mel frequency domain (this corresponds to a, d, and e described above).
- Instead of a microphone, a sensor that can observe vibrations of the skin surface near the mouth or throat of a speaker is used to determine an amplitude spectrogram from a signal acquired with the sensor (this corresponds to d, e, and f described above).

One object of the present disclosure is to use, as a reference signal, a rough target sound spectrogram acquired/generated in the manner described above and generate an extraction result which is more precise than the reference signal (and is closer to a true target sound). More specifically, in a sound source extraction process in which a linear filter is applied to a multi-channel observation signal to generate an extraction result, a linear filter to generate an extraction result which is more precise than a reference signal (closer to a true target sound) is estimated.

A linear filter for the sound source extraction process is estimated in the present disclosure for enjoying the following merits that the linear filter provides.

Merit 1: It provides a less distorted extraction result as compared with a non-linear extraction process. Accordingly, in a case where it is combined with voice recognition or the like, deterioration of the recognition precision due to distortions can be avoided.

Merit 2: The phase of the extraction result can be estimated appropriately by a rescaling process described later. Accordingly, in a case where it is combined with post-processing dependent on the phase (also including cases where the extraction result is reproduced as a sound and humans listen to it), it is possible to avoid problems attributable to an inappropriate phase.

Merit 3: The extraction precision can be improved easily by increasing the number of microphones.

Problems that should be Considered in Present Disclosure

One of objects of the present disclosure is restated as follows.

Object: Assuming that the following conditions a) to c) are satisfied, a linear filter for generating an extraction result which is more precise than a signal of c) is estimated.

a) There is a signal recorded with multi-channel microphones. The arrangement of the microphones and the position of each sound source may be unknown.

b) A zone in which a target sound (sound that is desired to be kept) is being produced is known. Note that it is unknown whether or not there is a target sound also outside the zone.

c) A rough amplitude spectrogram of the target sound (or data similar to it) has been acquired or can be generated. The amplitude spectrogram includes real numbers, and the phase cannot be known.

However, conventionally there have been no linear filtering schemes that satisfy all of the three conditions described above. There are mainly the following three types of known typical linear filtering schemes.

Adaptive beamformers

Blind sound source separation

Existing linear filtering processes using reference signals

The following explains problems of the schemes.

(Problems of Adaptive Beamformers)

Adaptive beamformers described here are schemes in which a linear filter for extracting a target sound is adaptively estimated with use of a signal observed with multiple microphones and information representing which sound source is to be extracted as a target sound. Adaptive beamformers include schemes described in Japanese Patent Laid-open No. 2012-234150 and Japanese Patent Laid-open No. 2006-072163, for example.

The following explains an S/N ratio (Signal to Noise Ratio) maximizing beamformer (also called a GEV beamformer) as an adaptive beamformer that can be used even in a case where the arrangement of microphones, the direction of a target sound, and the like are unknown.

The S/N ratio maximizing beamformer (maximum SNR beamformer) is a scheme to determine a linear filter that maximizes the ratio $V_s/V_n$ between the following a) and b).

a) A variance $V_s$ of a processing result obtained by applying a predetermined linear filter to a zone in which only a target sound is being produced.

b) A variance $V_n$ of a processing result obtained by applying the same linear filter to a zone in which only an interfering sound is being produced.

This scheme can estimate a linear filter if the respective zones can be detected, and does not require the arrangement of microphones or the direction of the target sound.

However, in assumed situations where the present disclosure can be applied, the only known zone is a timing at which the target sound is being produced. Since there are both the target sound and the interfering sound in the zone, the zone cannot be used as none of the zones in a) and b) described above. Regarding other adaptive beamformer schemes also, for a reason that the zone in b) described above is separately necessary, for a reason that the direction of the target sound needs to be known, or for other reasons, it is difficult to use the schemes in situations where the present disclosure can be applied.

(Problems of Blind Sound Source Separation)

Blind sound source separation is a technology to estimate each sound source from a signal which is a mixture of multiple sound sources, by using only the signal observed with multiple microphones (without using information such as the directions of sound sources or the arrangement of the microphones). Examples of such a technology include the technology of Japanese Patent No. 4449871. The technology of Japanese Patent No. 4449871 is an example of technologies called independent component analysis (Independent Component Analysis; hereinbelow, referred to as ICA as appropriate), and ICA decomposes a signal observed with N microphones into N sound sources. It is sufficient if the observation signal used at that time includes a zone in which a target sound is being produced, and information regarding a zone in which only the target sound is being produced or only an interfering sound is being produced is unnecessary.

Accordingly, ICA can be used in situations where the present disclosure can be applied, by decomposing an observation signal of a zone in which a target sound is being produced into N components by applying ICA, and thereafter selecting only one component which is the most similar to a rough target sound spectrogram which is a reference signal. As a method for assessing whether or not a component is similar to the rough target sound spectrogram, it is sufficient if each separation result is transformed into an amplitude spectrogram, then the square error (Euclidean distance) between each amplitude spectrogram and the reference signal is calculated, and a separation result corresponding to an amplitude spectrogram that gives the minimum error is adopted.

However, the method of performing the selection after the separation in such a manner has the following problems.

1) Despite the fact that a sound source that is desired to be obtained is only one sound source, the N sound sources are generated in an intermediate step, and accordingly, this is disadvantageous in terms of calculation costs and memory usage.

2) The rough target sound spectrogram, which is the reference signal, is used only in the step of selecting one sound source from the N sound sources, but is not used in the step separating into the N sound sources. Accordingly, the reference signal does not contribute to improvement of extraction precision.

(Problems of Existing Linear Filtering Processes Using Reference Signals)

There have conventionally also been several schemes to estimate linear filters by using reference signals. Here, the following a) and b) are described as such technologies.

a) Independent deeply learned matrix analysis b) Sound source extraction using time envelopes as reference signals Independent deeply learned matrix analysis (hereinbelow, referred to as IDLMA as appropriate) is a developed form of independent component analysis. For details, refer to the following Document 1.

"(Document 1)

N. Makishima et al.,

"Independent Deeply Learned Matrix Analysis for Determined Audio Source Separation,"

in IEEE/ACM Transactions on Audio, Speech, and Language Processing, vol. 27, no. 10, pp. 1601-1615, October 2019.

doi: 10.1109/TASLP.2019.2925450"

A feature of IDLMA is that a neural network (NN) to generate a power spectrogram (the square of an amplitude spectrogram) of each sound source that is desired to be separated is trained in advance. For example, in a case where it is desired to separate the part of each musical instrument from music including simultaneous performance of multiple musical instruments, NNs each of which outputs a musical instrument sound by receiving an input of music is trained in advance. At a time of separation, the separation is performed by inputting an observation signal to each NN, and using, as a reference signal, a power spectrogram which is an output therefrom. Accordingly, as compared with a completely blind separation process, improvement of the separation precision by a degree corresponding to the use of reference signals can be expected. Further, it has been reported also that, by re-inputting a separation result generated once to each NN, a power spectrum which is more precise than that of the initial generation is generated, and by performing separation with use of the power spectrum as a reference signal, a separation result which is more precise than the initial separation is obtained.

However, for the following reason, it is difficult to use IDLMA in situations where the present disclosure can be applied.

In IDLMA, generation of N separation results requires N different power spectrograms as reference signals. Accordingly, even if there is only one sound source of interest and other sound sources are unnecessary, reference signals need to be prepared for all the sound sources. However, in reality, this is difficult in some cases. In addition, Document 1 described above mentions only regarding a case where the number of microphones and the number of sound sources match, and does not mention how many reference signals have to be prepared in a case where the number of microphones and the number of sound sources do not match. In addition, since IDLMA is a sound source separation method, the use of IDLMA for the purpose of sound source extraction requires a step of keeping a separation result of only one sound source after N separation results are generated once. Accordingly, the problem of sound source separation that there is waste in terms of calculation costs and memory usage still remains.

Examples of sound source extraction that uses time envelopes as reference signals include, for example, a technology described in Japanese Patent Laid-open No. 2014-219467 proposed by the present inventor or other technologies. As in the present disclosure, this scheme estimates a linear filter by using a reference signal and a multi-channel observation signal. Note that there are differences in the following respects.

The reference signal is not a spectrogram, but a time envelope. This is equivalent to one that is obtained by making a rough target sound spectrogram uniform by applying an operation of averaging or the like on the rough target sound spectrogram in the frequency direction. Accordingly, in a case where changes of a target sound in the time direction have a feature that they are different among different frequencies, the reference signal cannot express the feature appropriately; as a result, there is a possibility that the extraction precision deteriorates.

The reference signal is reflected only as an initial value in an iteration process for determining an extraction filter. Since the second and subsequent iterations are not constrained by the reference signal, there is a possibility that another sound source different from the reference signal is extracted. For example, in a case where there is a sound that is generated only momentarily in a zone, it is optimum for an objective function to extract that sound, and accordingly, there is a possibility that an undesired sound is extracted depending on the number of times of iterations.

As described above, there has been a problem that it is difficult to use the technologies described above in situations where the present disclosure can be applied or sufficiently precise extraction results cannot be obtained.

Technology Used in Present Disclosure

Next, the technology used in the present disclosure is explained. The sound source extraction technology that meets the object of the present disclosure can be realized by introducing the following elements together to the technique of blind sound source separation based on independent component analysis.

Element 1: In a separation procedure, an objective function that reflects not only the independence among separation results but also the similarity between one of the separation results and a reference signal is prepared, and is optimized.

Element 2: Also in the separation procedure, a technique called a deflation method of separating sound sources one at a time is introduced. Then, the separation process is exited at a time point when the first sound source has been separated.

The sound source extraction technology according to the present disclosure extracts one desired sound source by applying an extraction filter which is a linear filter from a multi-channel observation signal observed with multiple microphones. Accordingly, it can be regarded as one type of beamformer (BF). Both the similarity between a reference signal and an extraction result and the independence between the extraction result and another separation result are reflected in an extraction procedure. In view of this, the sound source extraction scheme according to the present disclosure is referred to as a Similarity-and-Independence-aware Beamformer (SIBF) as appropriate.

The separation procedure according to the present disclosure is explained with use of FIG. 1. The frame which is given (1-1) surrounds a separation procedure that is assumed to be performed in conventional time-frequency-domain independent component analysis (Japanese Patent No. 4449871, etc.), and (1-5) and (1-6) outside the frame are elements that are added according to the present disclosure. Hereinbelow, conventional time-frequency-domain blind sound source separation is explained with use of the separation procedure surrounded by the frame (1-1) first, and the separation procedure according to the present disclosure is explained next.

In FIG. 1, $X_1$ to $X_N$ are observation signal spectrograms (1-2) each corresponding to one of N microphones. These are complex number data, and are generated by applying the short-time Fourier transform described later to the waveform of a sound observed with each microphone. In each spectrogram, the vertical axis represents frequency, and the horizontal axis represents time. It is assumed that the time length is the same as or longer than the length of time in which a target sound that is desired to be extracted is being produced.

In the independent component analysis, separation result spectrograms $Y_1$ to $Y_N$ (1-4) are generated by multiplying the observation signal spectrograms by a predetermined square matrix called a separation matrix which is given (1-3). The number of the separation result spectrograms is N, and is the same as the number of the microphones. In the separation, values of the separation matrix are decided such that $Y_1$ to $Y_N$ become statistically independent (i.e., differences among $Y_1$ to $Y_N$ are maximized). Since such a matrix cannot be determined with a single operation, an objective function reflecting the independence among the separation result spectrograms is prepared, and such a separation matrix that the function is optimized (maximized or minimized depending on the property of the objective function) is determined iteratively. After the separation matrix and results of the separation result spectrograms are determined, the inverse Fourier transform is applied to each of the separation result spectrograms to generate a waveform which is a signal representing a corresponding estimated sound source before being mixed.

The separation procedure of conventional time-frequency-domain independent component analysis has been explained thus far. According to the present disclosure, the two elements described before are added to the separation process.

One of the additional element is the similarity with a reference signal. The reference signal is a rough amplitude spectrogram of a target sound, and is generated by a reference signal generating section which is given (1-5). In the separation procedure, in addition to the independence among the separation result spectrograms, the separation matrix is decided by taking into consideration also the similarity between $Y_1$, which is one of the separation result spectrograms, and a reference signal R. That is, the objective function is prepared to reflect both of the following, and a separation matrix that optimizes the function is determined.

a) The independence among $Y_1$ to $Y_N$ (solid line L1)

b) The similarity between $Y_1$ and R (dotted line L2) A specific formula of the objective function is described later.

By preparing the objective function to reflect both the independence and the similarity, the following merits can be attained.

Merit 1: It is indefinite in typical time-frequency-domain independent component analysis at which position of the separation result spectrograms which raw signal appears, and this changes depending on initial values of the separation matrix, the degrees of mixture of observation signals (signals corresponding to a mixed sound signal described later), differences between algorithms to determine separation matrices, and the like. In contrast, since the similarity between the separation result $Y_1$ and the reference signal R also is taken into consideration in addition to the independence in the present disclosure, a spectrogram similar to R can be caused to always appear in $Y_1$.

Merit 2: Merely solving a problem of simply making $Y_1$, which is one of separation results, similar to the reference signal R can make $Y_1$ closer to R, but cannot make $Y_1$ superior to the reference signal R (make $Y_1$ closer to a target sound) in terms of extraction precision. In contrast, since the independence among separation results also is taken into consideration in the present disclosure, the extraction precision of the separation result $Y_1$ can be made superior to the reference signal.

However, even if the similarity with the reference signal is introduced in time-frequency-domain independent component analysis, the number of signals to be generated is N since it is still a separation technique. That is, even if the desired sound source is only $Y_1$, (N−1) signals are simultaneously generated undesirably despite the fact they are unnecessary.

In view of this, as still another additional element, a deflation method is introduced. The deflation method is a scheme to estimate raw signals one at a time, instead of simultaneous separation of all sound sources. For a general explanation regarding the deflation method, refer to Chapter 8 of the following Document 2, for example.

"(Document 2)

Detailed Explanation: Independent Component Analysis—New World of Signal Analysis Aapo Hyv"arinen (Author), Erkki Oja (Author), Juha Karhunen (Author), Aapo Hyv"arinen (Author), Erkki Oja (Author), Juha Karhunen (Author), Nemoto Iku (Translator), Kawakatsu Masaki (Translator) (Original Title)

Independent Component Analysis

Aapo Hyvarinen (Author), Juha Karhunen (Author), Erkki Oja (Author)"

Since the order of separation results is typically indefinite even in the deflation method, it is indefinite at which position a desired sound source appears. However, by applying the deflation method to sound source separation using an objective function reflecting both the independence and the similarity as described above, it becomes possible to cause a separation result similar to a reference signal to appear always at the first position. That is, it is sufficient if the separation process is exited at a time point when the first one sound source has been separated (estimated), and it becomes unnecessary to generate unnecessary (N−1) separation results. In addition, it is unnecessary to estimate all elements of the separation matrix, and it is sufficient if only elements that are necessary for generating $Y_1$ among all the elements are estimated.

In the deflation method in which only one sound source is estimated, separation results (i.e., $Y_2$ to $Y_N$) other than $Y_1$ among separation results which are given (1-4) in FIG. 1 are imaginary separation results, and are not actually generated. However, for a calculation of the independence, a calculation which is equivalent to one that is performed by using all the separation results, $Y_1$ to $Y_N$, is performed. Accordingly, while a merit of sound source separation which can make $Y_1$ more precise than R can be attained by taking the independence into consideration, it is also possible to avoid a wasteful task of generating unnecessary separation results, $Y_2$ to $Y_N$.

The deflation method is one of schemes for separation (estimation of all sound sources before mixing), but in a case where separation is suspended at a time point when one sound source has been estimated, it can be used as a scheme for extraction (estimation of one desired sound source). In view of this, in the following explanation, an operation to estimate only the separation result $Y_1$ is called "extraction," and $Y_1$ is referred to as a "(target sound) extraction result" as appropriate. Further, each separation result is generated from a vector included in the separation matrix which is given (1-3). This vector is referred to as an "extraction filter" as appropriate.

Figure 2:
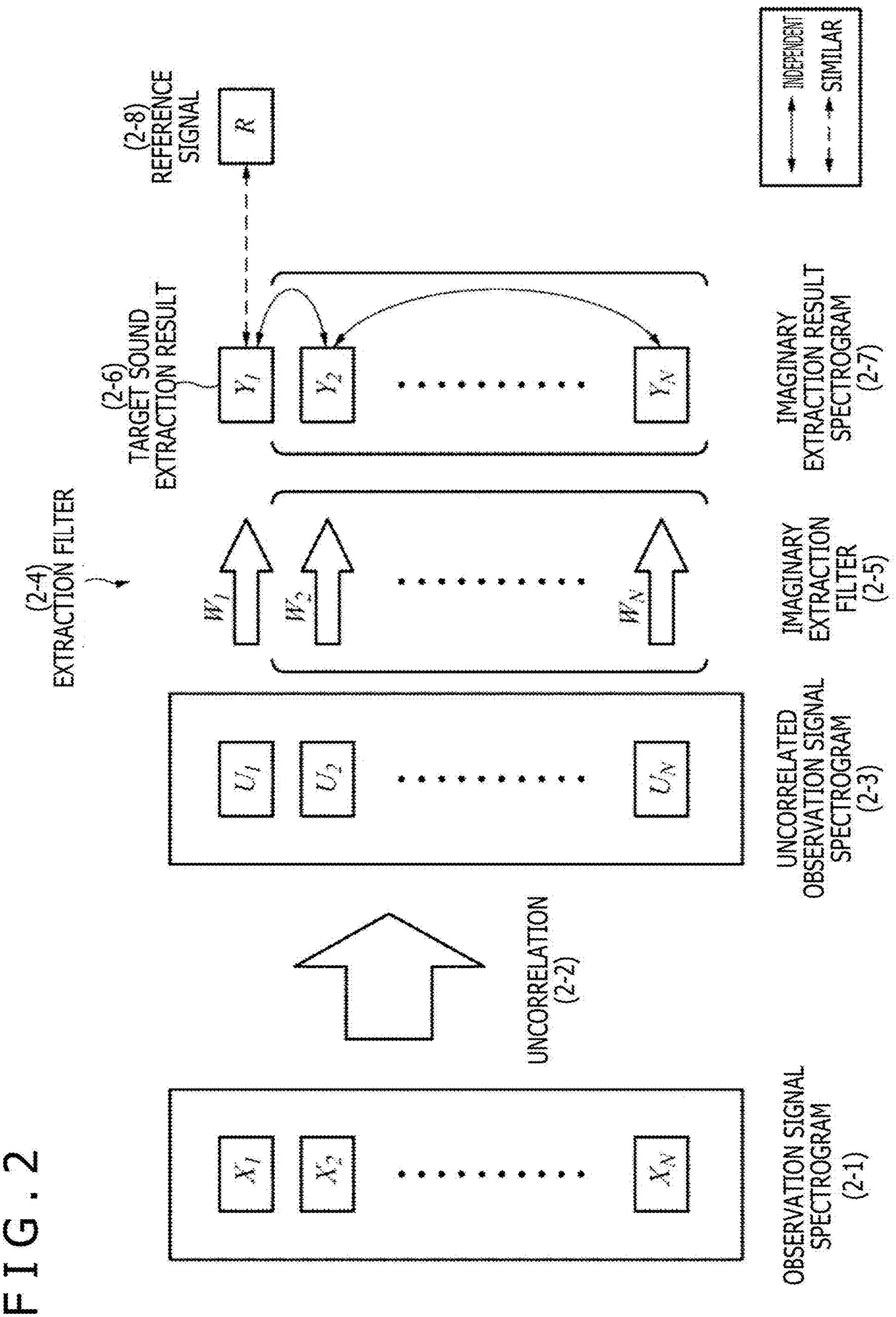
FIG. 2 is a figure for explaining an example of a sound source extraction scheme that is based on a deflation method and that uses a reference signal.

A sound source extraction scheme using a reference signal based on the deflation method is explained with use of FIG. 2. FIG. 2 depicts details of FIG. 1, and elements necessary for the application of the deflation method are added.

Observation signal spectrograms which are given (2-1) in FIG. 2 are identical to (1-2) in FIG. 1, and are generated by applying the short-time Fourier transform to a time-domain signal observed with N microphones. By applying a process called uncorrelation which is given (2-2) to the observation signal spectrograms, uncorrelated observation signal spectrograms which are given (2-3) are generated. Uncorrelation is also called whitening, and is a transform to make signals that are observed with the microphones uncorrelated. Specific formulae used in the process are described later. By performing uncorrelation as pre-processing of separation, it becomes possible to apply, in the separation, an efficient algorithm using the property of uncorrelated signals. The deflation method is one of such algorithms.

The number of the uncorrelated observation signal spectrograms is the same as the number of the microphones, and the uncorrelated observation signal spectrograms are denoted by $U_1$ to $U_N$. It is sufficient if the generation of the uncorrelated observation signal spectrograms is performed once as a process performed before determining an extraction filter. As explained with reference to FIG. 1, in the deflation method, filters to generate the separation results $Y_1$ to $Y_N$ are estimated one at a time, instead of estimation of a matrix to generate the separation results simultaneously. Since only $Y_1$ is generated in the present disclosure, a filter to be estimated is only $w_1$ having the function of generating $Y_1$ by receiving an input of $U_1$ to $U_N$, and $Y_2$ to $Y_N$ and $w_2$ to $w_N$ are imaginary ones that are not actually generated.

A reference signal R which is given (2-8) is identical to (1-6) in FIG. 1. As described before, in the estimation of the filter $w_1$, both the independence among $Y_1$ to $Y_N$ and the similarity between R and $Y_1$ are taken into consideration.

In the sound source extraction method according to the present disclosure, only one sound source is estimated (extracted) for one zone. Accordingly, in a case where there are multiple sound sources that are desired to be extracted, that is, target sounds, and moreover there are overlapping zones in which the target sounds are being produced, each of the overlapping zones is detected, a reference signal is generated for each of the zones, and sound source extraction is then performed. This is explained with use of FIG. 3.

Figure 3:
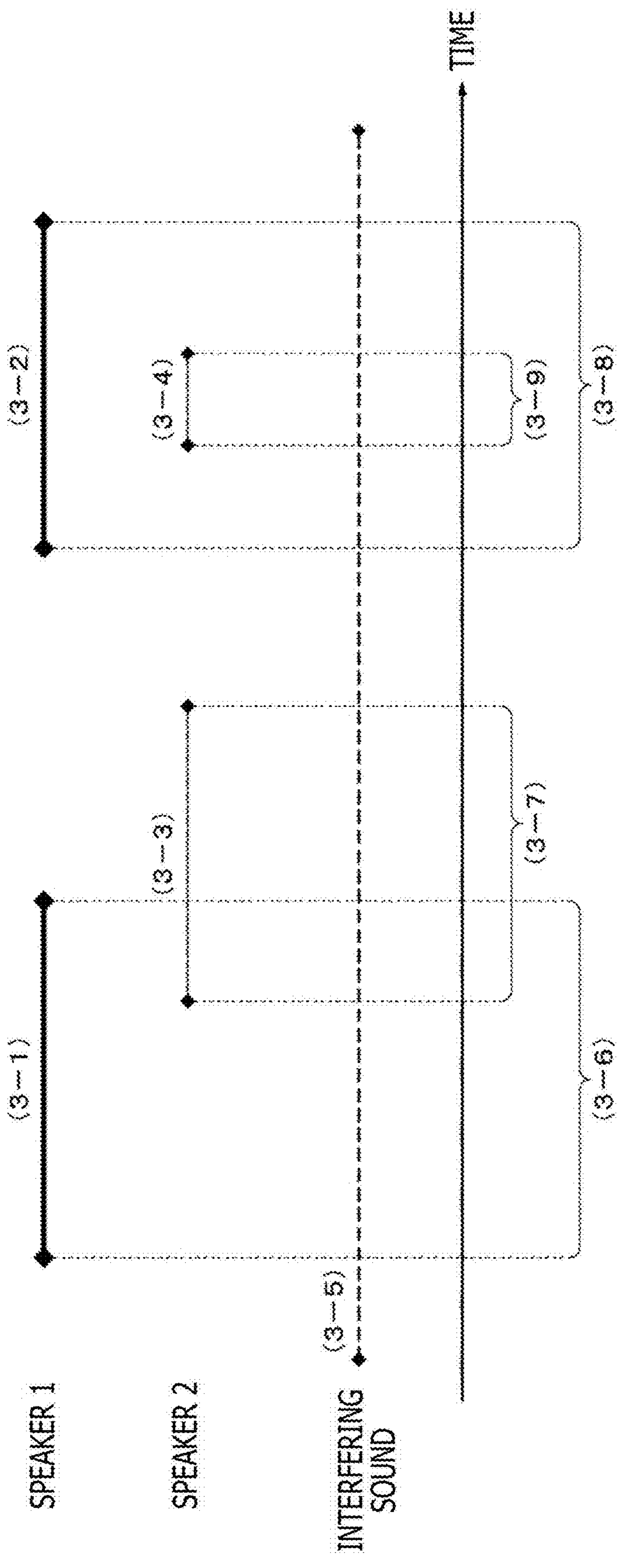
FIG. 3 is a figure to be referred to in the explanation of a process of performing sound source extraction after a reference signal is generated for each zone.

In an example depicted in FIG. 3, target sounds are human voices, and the number of sound sources of the target sounds, that is, the number of speakers, is two. Needless to say, target sounds may be any type of voice, and the number of sound sources also is not limited to two. In addition, it is assumed that there are zero or more interfering sounds which are not treated as the subject of extraction. It is assumed that a non-voice signal is an interfering sound but a sound output from equipment such as a speaker unit is treated as an interfering sound even if it is a voice.

The two speakers are defined as a speaker 1 and a speaker 2. In addition, an utterance which is given (3-1) and an utterance which is given (3-2) in FIG. 3 are utterances by the speaker 1. In addition, an utterance which is given (3-3) and an utterance which is given (3-4) in FIG. 3 are utterances by the speaker 2. (3-5) represents an interfering sound. In FIG. 3, the vertical axis represents differences of the positions of the sound sources, and the horizontal axis represents time. The utterances (3-1) and (3-3) have partially overlapping utterance zones. For example, this corresponds to a case where the speaker 2 starts uttering immediately before the speaker 1 finishes speaking. The utterances (3-2) and (3-4) also have overlapping zones, and, for example, this corresponds to a case where the speaker 2 makes a short utterance such as a quick response while the speaker 1 is making a long utterance. Both are phenomena that occur frequently in human conversations.

First, extraction of the utterance (3-1) is considered. In a time range (3-6) in which the utterance (3-1) is being made, there are a total of three sound sources which are a part of the utterance (3-3) by the speaker 2 and a part of the interfering sound (3-5) in addition to the utterance (3-1) by the speaker 1. Extraction of the utterance (3-1) in the present disclosure is to generate (estimate) a signal which is as close as possible to a clean sound (including only the voice of the speaker 1 and not including other sound sources), by using a reference signal, that is, a rough amplitude spectrogram, corresponding to the utterance (3-1), and an observation signal in the time range (3-6) (a mixture of the three sound sources).

Similarly, extraction of the utterance (3-3) by the speaker 2 is estimation of a signal close to a clean sound of the speaker 2 by using a reference signal corresponding to (3-3) and an observation signal in a time range (3-7). In such a manner, even if utterance zones overlap, different extraction results can be generated according to the present disclosure, provided that reference signals corresponding to the respective target sounds can be prepared.

Likewise, the time range of the utterance (3-4) by the speaker 2 is covered completely by the time range of the utterance (3-2) by the speaker 1, but different extraction results can be generated by preparing different reference signals therefor. That is, in order to extract the utterance (3-2), a reference signal corresponding to the utterance (3-2) and an observation signal of the time range (3-8) are used, and in order to extract the utterance (3-4), a reference signal corresponding to the utterance (3-4) and an observation signal of the time range (3-9) are used.

Next, an objective function to be used for estimation of a filter and an algorithm that optimizes the objective function are explained with use of formulae.

An observation signal spectrogram $X_k$ corresponding to a k-th microphone is represented by a matrix having, as its elements, $X_k(f,t)$ as represented by the following Formula (1).

[Math. 1]

$$x_k = \begin{bmatrix} x_k(1,1) & \dots & x_k(1,T) \\ \vdots & \ddots & \vdots \\ x_k(F,1) & \dots & x_k(F,T) \end{bmatrix} \quad (1)$$

In Formula (1), f means a frequency bin number, t means a frame number, and both f and t are indexes that appear by the short-time Fourier transform. Hereinbelow, changing f is expressed as a "frequency direction," and changing t is expressed as a "time direction."

An uncorrelated observation signal spectrogram $U_k$ and a separation result spectrogram $Y_k$ also are similarly expressed as matrices having, as their elements, $U_k(f,t)$ and $Y_k(f,t)$, respectively (descriptions of the formulae are omitted).

In addition, a vector x(f,t) having, as its elements, observation signals of all microphones (all channels) with particular f and t is represented by the following Formula (2).

[Math. 2]

$$x_k = \begin{bmatrix} x_1(f,t) \\ \vdots \\ x_N(f,t) \end{bmatrix} \quad (2)$$

Regarding an uncorrelated observation signal and a separation result also, vectors, u(f,t) and y(f,t), having the same shape are prepared (descriptions of the formulae are omitted).

The following Formula (3) is a formula for determining the vector u(f,t) of the uncorrelated observation signal.

[Math. 3]

$$u(f,t)=P(f)x(f,t) \quad (3)$$

This vector is generated by the product of P(f) called an uncorrelation matrix and the observation signal vector x(f,t). The uncorrelation matrix P(f) is calculated by the following Formula (4) to Formula (6).

[Math. 4]

$$R_{xx}(f) = \langle x(f,t)x(f,t)^H \rangle_t \quad (4)$$

[Math. 5]

$$R_{xx}(f) = V(f)D(f)V(f)^H \quad (5)$$

[Math. 6]

$$P(f) = D(f)^{-\frac{1}{2}}V(f)^H \quad (6)$$

Formula (4) described above is a formula for determining a covariance matrix $R_{xx}(f)$ of an observation signal at an f-th frequency bin. $\langle \bullet \rangle_t$ of the right side represents an operation to calculate the average at t (frame number) in a predetermined range. In the present disclosure, the range of t is a time length of a spectrogram, that is, a zone in which a target sound is being produced (or a range including the zone). In addition, the superscript H represents the Hermitian transpose (complex conjugate transpose).

Eigen decomposition is applied to the covariance matrix $R_{xx}(f)$, and the covariance matrix $R_{xx}(f)$ is decomposed into the product of three terms like the right side of Formula (5). V(f) is a matrix including eigenvectors, and D(f) is a diagonal matrix including eigenvalues. V(f) is a Hermitian matrix, and the inverse matrix of V(f) and the Hermitian transpose of V(f) are identical.

The uncorrelation matrix P(f) is calculated in accordance with Formula (6). Since D(f) is a diagonal matrix, the −½th power of D(f) is determined by raising each diagonal element to the −½th power.

Since the thus-determined uncorrelated observation signal u(f,t) has elements that are uncorrelated with each other, values of a covariance matrix calculated in accordance with the following Formula (7) are an identity matrix I.

[Math. 7]

$$\langle u(f,t)u(f,t)^H \rangle_t=I \quad (7)$$

The following Formula (8) is a formula for generating a separation result y(f,t) for all channels at f and t, and is determined as the product of a separation matrix W(f) and u(f,t). A method to determine W(f) is described later.

[Math. 8]

$$y(f,t)=W(f)u(f,t)=W(f)P(f)x(f,t) \quad (8)$$

Formula (9) is a formula for generating only a k-th separation result, and $w_k(f)$ is a k-th row vector of the separation matrix W(f). Since only $Y_1$ is generated as an extraction result in the present disclosure, Formula (9) is basically used only with k=1.

[Math. 9]

$$y_k(f,t)=w_k(f)u(f,t)=w_k(f)P(f)x(f,t) \quad (9)$$

It has been proven that it is sufficient if, in a case where uncorrelation is performed as pre-processing of the separation, the separation matrix W(f) is found from a unitary matrix. In a case where the separation matrix W(f) is a unitary matrix, the following Formula (10) is satisfied, and also the row vector $w_k(f)$ included in W(f) satisfies the following Formula (11). By using this feature, separation by the deflation method becomes possible (similarly to Formula (9), Formula (11) is basically used only with k=1).

[Math. 10]

$$W(f)W(f)^H=I \quad (10)$$

[Math. 11]

$$w_k(f)w_k(f)^H=1 \quad (11)$$

The reference signal R is represented by a matrix having, as its elements, r(f,t) as in Formula (12). The shape itself is the same as the observation signal spectrogram $X_k$, but elements r(f,t) of R are non-negative real numbers while elements $X_k(f,t)$ of $X_k$ are complex number values.

[Math. 12]

$$R = \begin{bmatrix} r(1,1) & \dots & r(1,T) \\ \vdots & \ddots & \vdots \\ r(F,1) & \dots & r(F,T) \end{bmatrix} \quad (12)$$

According to the present disclosure, instead of estimation of all elements of the separation matrix W(f), only $w_1(f)$ is estimated. That is, only an element used in generation of the first separation result (target sound extraction result) is estimated. Hereinbelow, derivation of a formula for estimating $w_1(f)$ is explained. The derivation of the formula includes the following three points, and these are explained in order.

(1) Objective Function
(2) Sound Source Model
(3) Update Formula (1) Objective Function An objective function used in the present disclosure is a negative log likelihood, and is basically the same as the one used in Document 1 or the like. This objective function gives the minimum value when separation results are mutually independent. Note that, since the objective function is prepared to reflect also the similarity between an extraction result and a reference signal in the present disclosure, the objective function is derived as follows.

In order to prepare the objective function to reflect the similarity described above, formulae for uncorrelation and separation (extraction) are revised slightly. Formula (13) is a revised version of Formula (3), which is a formula for uncorrelation, and Formula (14) is a revised version of Formula (8), which is a formula for separation. In both of them, the reference signal r(f,t) is added to vectors on both sides, and an element 1 representing the "pass-through of the reference signal" is added to the matrix of the right side. The matrices and vectors having these additional elements are expressed with a prime symbol given to the original matrices and vectors.

[Math. 13]

$$\begin{bmatrix} r(f,t) \\ u(f,t) \end{bmatrix} = \begin{bmatrix} 1 & 0 \\ 0 & P(f) \end{bmatrix} \begin{bmatrix} r(f,t) \\ x(f,t) \end{bmatrix} \tag{13}$$

$$\Leftrightarrow u'(f,t) = P'(f)x'(f,t)$$

[Math. 14]

$$\begin{bmatrix} r(f,t) \\ y(f,t) \end{bmatrix} = \begin{bmatrix} 1 & 0 \\ 0 & W(f) \end{bmatrix} \begin{bmatrix} r(f,t) \\ u(f,t) \end{bmatrix} \tag{14}$$

$$\Leftrightarrow y'(f,t) = W'(f)u'(f,t) = W'(f)P'(f)x'(f,t)$$

As the objective function, a negative log likelihood L of a reference signal and an observation signal represented by the following Formula (15) is used.

[Math. 15]

$$L = -\log p(R, X_1, \ldots, X_N | W') \tag{15}$$

In this Formula (15), W' represents a set including W'(f) of all frequency bins. That is, it is a set including all parameters to be estimated. In addition, p(•) is a conditional probability density function (hereinbelow, referred to as a pdf as appropriate), and represents a probability that the reference signal R and the observation signal spectrograms $X_1$ to $X_N$ occur simultaneously when W' is given. In the following explanation also, in a case where multiple elements are written between the parentheses of a pdf (a case where multiple variables are written or a case where a matrix or a vector is written), it represents a probability that those elements occur simultaneously.

For optimization (minimization in this case) of the extraction filter $w_1(f)$, the negative log likelihood L needs to be transformed such that $w_1(f)$ is included. For this purpose, the following hypotheses are made regarding an observation signal and a separation result.

Hypothesis 1: Observation signal spectrograms have similarity in the channel direction (i.e., spectrograms corresponding to microphones resemble each other), but are independent in the time direction and frequency direction. That is, in one spectrogram, components included at points occur mutually independent, and are not influenced by other factors such as time and frequency.

Hypothesis 2: In addition to the time direction and frequency direction, separation result spectrograms are independent also in the channel direction. That is, separation-result spectrograms do not resemble each other.

Hypothesis 3: $Y_1$, which is a separation result spectrogram, and a reference signal have similarity. That is, both have resembling spectrograms.

A procedure of transformation of $p(R, X_1, \ldots, X_N|W')$ is represented by Formula (16) to Formula (21).

[Math. 16]

$$p(R, X_1, \ldots, X_N | W') = \prod_f \prod_t p(r(f,t), x_1(f,t), \ldots, x_N(f,t) | W'(f)) \tag{16}$$

[Math. 17]

$$= \prod_f \prod_t p(x'(f,t) | W'(f)) \tag{17}$$

[Math. 18]

$$= \prod_f \prod_t p(u'(f,t) | W'(f)) |\det(P'(f))|^2 \tag{18}$$

[Math. 19]

$$= \prod_f \prod_t p(y'(f,t) |\det(W'(f))|^2 |\det(P'(f))|^2 \tag{19}$$

[Math. 20]

$$= \prod_f \prod_t p(y'(f,t)) \cdot const. \tag{20}$$

[Math. 21]

$$= \prod_f \prod_t \left\{ p(r(f,t), y_1(f,t)) \prod_{k \geq 2} p(y_k(f,t)) \right\} \cdot const. \tag{21}$$

In each formula described above, p(•) represents the probability density function of a variable between the parentheses, and, in a case where multiple elements are written, represents the joint probability of those elements. Even if the same letter p is used, different probability distributions are represented if variables between the parentheses are different, and accordingly, p(R) and $p(Y_1)$ are different functions, for example. Since the joint probability of independent variables can be decomposed into the product of respective pdf's, the left side of Formula (16) is transformed into the right side in accordance with Hypothesis 1. The terms between the parentheses of the right side are represented by Formula (17) by using x'(f,t) introduced into Formula (13).

Formula (17) is transformed into Formula (18) and Formula (19) by using the relation in the lower line of Formula (14). In these formulae, det(•) represents the determinant of a matrix between the parentheses.

Formula (20) is an important transformation in the deflation method. Since the matrix W(f)' is a unitary matrix similarly to the separation matrix W(f), its determinant is 1. In addition, since the matrix P'(f) does not change during the separation, the determinant is a constant. Accordingly, both the determinants can be written together as const (constant).

Formula (21) is a transformation unique to the present disclosure. Whereas components of y'(f,t) are r(f,t) and $y_1(f,t)$ to $y_N(f,t)$, in accordance with Hypothesis 2 and Hypothesis 3, the probability density function that includes these variables as arguments is decomposed into the product of $p(r(f,t), y_1(f,t))$, which is the joint probability of r(f,t) and $y_1(f,t)$, and each of $p(y_2(f,t))$ to $p(y_N(f,t))$, which are the probability density functions of $y_2(f,t)$ to $y_N(f,t)$.

Assigning Formula (21) to Formula (15) gives Formula (22).

[Math. 22]

$$L=-\sum_f\sum_t\left\{\log p(r(f,t),y_1(f,t))+\sum_{k\geq 2}\log p(y_k(f,t))\right\}+const. \tag{22}$$

The extraction filter $w_1(f)$ is a subset of arguments with which Formula (22) gives the minimum value. Since the only term in the terms of Formula (22) that includes $w_1(f)$ is $y_1(f,t)$ at a particular f, $w_1(f)$ is determined as the minimum solution of the following Formula (23). Note that, in order to eliminate $w_1(f)=0$, which is a self-evident solution, a constraint represented by Formula (11) that the norm of a vector is 1 is placed.

[Math. 23]

$$w_1(f)=\arg\min_{w_1(f)}L=\arg\min_{w_1(f)}\left\{-\sum_t\log p(r(f,t)y_1(f,t))\right\} \tag{23}$$

In a case where the extraction filter on which the constraint that the norm is 1 is placed is applied to an uncorrelated observation signal, the scale of each frequency bin of an extraction result to be generated is different from the scale of a true target sound. Accordingly, after a filter is estimated, an extraction filter and an extraction result are corrected for each frequency bin. Such post-processing is called rescaling. Specific formulae of the rescaling are described later.

In order to solve the minimization problem of Formula (23), the following two points need to be clarified.

What type of formula is allocated as $p(r(f,t),y_1(f,t))$, which is the joint probability of r(f,t) and $y_1(f,t)$. This probability density function is called a sound source model.

What type of algorithm is used to determine the minimum solution $w_1(f)$. Basically, $w_1(f)$ cannot be determined with a single operation, and needs to be updated iteratively. A formula for updating $w_1(f)$ is called an update formula. Hereinbelow, each of these is explained.

(2) Sound Source Model

The sound source model $p(r(f,t),y_1(f,t))$ is a pdf having, as its arguments, two variables which are the reference signal r(f,t) and the extraction result $y_1(f,t)$, and represents the similarity of the two variables. Sound source models can be formulated on the basis of various concepts. The following three manners are used in the present disclosure.

a) Bivariate Spherical Distribution b) Model Based on Divergence c) Time-Frequency-Varying Variance Model Hereinbelow, each of these is explained.

a) Bivariate Spherical Distribution

Spherical distributions are a type of multi-variate pdf. Multiple arguments of a pdf are regarded as a vector, and by assigning the norm of the vector (L2 norm) to a univariate (univariate) pdf, a multi-variate pdf is formed. If spherical distributions are used in independent component analysis, an advantage of making variables that are used in arguments similar to each other is attained. For example, the technology described in Japanese Patent No. 4449871 uses this property to solve a problem called the frequency permutation problem that "sound sources to appear in k-th separation results differ between different frequency bins."

If a spherical distribution having, as its arguments, a reference signal and an extraction result is used as a sound source model according to the present disclosure, it is possible to make both of them similar to each other. The spherical distribution used here can be represented by a general form as in the following Formula (24). In this formula, a function F is any univariate pdf. In addition, $c_1$ and $c_2$ are positive constants, and by changing these values, it is possible to adjust the influence of the reference signal on an extraction result. If a Laplace distribution is used as a univariate pdf similarly to Japanese Patent No. 4449871, the following Formula (25) is obtained. Hereinafter, this formula is called a bivariate Laplace distribution.

[Math. 24]

$$p(r(f,t),y_1(f,t))\propto F\sqrt{(c_1r(f,t)^2+c_2|y_1(f,t)|^2)} \tag{24}$$

[Math. 25]

$$p(r(f,t),y_1(f,t))\propto \exp(-\sqrt{c_1r(f,t)^2+c_2|y_1(f,t)|^2}) \tag{25}$$

b) Model Based on Divergence

Another type of sound source model is pdf's based on divergence, which is a superordinate concept of distance scale, and is represented in the form of the following Formula (26). In this formula, divergence(r(f,t), $|y_1(f,t)|$) represents any divergence between r(f,t), which is a reference signal, and $|y_1(f,t)|$, which is the amplitude of an extraction result.

[Math. 26]

$$p(r(f,t),y_1(f,t))\propto \exp(-\alpha\cdot \mathrm{divergence}(r(f,t),|y_1(f,t)|)) \tag{26}$$

In addition, $\alpha$ is a positive constant, and is a correction term for making the right side of Formula (26) satisfy conditions of a pdf, and there are no problems even if $\alpha=1$ since the value of $\alpha$ is unrelated in the minimization problem of Formula (23). When this pdf is assigned to Formula (23), the formula becomes equivalent to the problem of minimizing the divergence between r(f,t) and $|y_1(f,t)|$, and accordingly, both of them are necessarily similar to each other.

In a case where the Euclidean distance is used as a divergence, the following Formula (27) is obtained. In addition, in a case where the Itakura-Saito divergence is used, the following Formula (28) is obtained. Since the Itakura-Saito divergence is the distance scale between power spectrums, squared values are used for both r(f,t) and $|y_1(f,t)|$. On the other hand, a distance scale similar to the Itakura-Saito divergence may be calculated for amplitude spectrums, and in that case, the following Formula (29) is obtained.

[Math. 27]

$$p(r(f,t),y_1(f,t))\propto \exp\left\{-(r(f,t)-|y_1(f,t)|^2\right\} \tag{27}$$

[Math. 28]

$$p(r(f,t),y_1(f,t))\propto \exp\left\{-\left(\frac{|y_1(f,t)|^2}{r(f,t)^2}-\log\frac{|y_1(f,t)|^2}{r(f,t)^2}-1\right)\right\} \tag{28}$$

[Math. 29]

$$p(r(f,t),y_1(f,t))\propto \exp\left\{-\left(\frac{|y_1(f,t)|}{r(f,t)}-\log\frac{|y_1(f,t)|}{r(f,t)}-1\right)\right\} \tag{29}$$

The following Formula (30) is another pdf based on divergence. Since the ratio approaches 1 as the similarity between r(f,t) and $|y_1(f,t)|$ increases, the square error between the ratio and 1 functions as a divergence.

[Math. 30]

$$p(r(f,t),y_1(f,t)) \propto \exp\left\{-\left(\frac{|y_1(f,t)|}{r(f,t)}-1\right)^2\right\} \tag{30}$$

C) Time-Frequency-Varying Variance Model

As another sound source model, the time-frequency-varying variance (TFVV) model also is possible. This is a model in which points included in a spectrogram have different variances or standard deviations for different times and frequencies. Then, it is interpreted that a rough amplitude spectrogram which is a reference signal represents the standard deviation of each point (or some value dependent on the standard deviation).

If a Laplace distribution having time-frequency-varying variance (hereinafter, a TFVV Laplace distribution) is hypothesized as a distribution, it can be represented by the following Formula (31). In this formula, α is a correction term for making the right side satisfy conditions of a pdf similarly to Formula (26), and there are no problems even if α=1. β is a term for adjusting the magnitude of influence of a reference signal on an extraction result. A true TFVV Laplace distribution corresponds to a case where β=1, but other values such as ½ or 2 may be used.

[Math. 31]

$$p(r(f,t),y_1(f,t)) \propto \frac{1}{r(f,t)^{\beta}}\exp\left(-\alpha\frac{|y_1(f,t)|}{r(f,t)^{\beta}}\right) \tag{31}$$

Similarly, when a TFVV Gaussian distribution is hypothesized, the following Formula (32) is obtained. On the other hand, when a TFVV Student-t distribution is hypothesized, a sound source model of the following Formula (33) is obtained.

[Math. 32]

$$p(r(f,t),y_1(f,t)) \propto \frac{1}{r(f,t)^{\beta}}\exp\left(-\alpha\frac{|y_1(f,t)|^2}{r(f,t)^{2\beta}}\right) \tag{32}$$

[Math. 33]

$$p(r(f,t),y_1(f,t)) \propto \frac{1}{r(f,t)^2}\left(1+\frac{2}{\nu}\frac{|y_1(f,t)|^2}{r(f,t)^2}\right)^{-\frac{2+\nu}{2}} \tag{33}$$

ν (nu) in Formula (33) is a parameter called the degree of freedom, and the shape of the distribution can be changed by changing its value. For example, ν=1 represents a Cauchy distribution, and ν→∞ represents a Gaussian distribution.

The sound source models of Formula (32) and Formula (33) are used also in Document 1, but the present disclosure is different in that those models are used not for separation but for extraction.

(3) Update Formula

In many cases, there is no closed form solution (a solution without iteration) regarding the solution $w_1(f)$ of the minimization problem of Formula (23), and an iterative algorithm needs to be used (n.b. there is a closed form solution as described later in a case where the TFVV Gaussian distribution of Formula (32) is used as a sound source model).

A high-speed, stable algorithm called an auxiliary function method can be applied to Formula (25), Formula (31), and Formula (33). On the other hand, another algorithm called the fixed point method can be applied to Formula (27) to Formula (30).

Hereinbelow, an update formula in a case where Formula (32) is used is explained first, and update formulae using the auxiliary function method and the fixed point method are explained next.

Assigning the TFVV Gaussian distribution represented by Formula (32) to Formula (23) and further ignoring terms unrelated to minimization gives the following Formula (34).

[Math. 34]

$$w_1(f) = \underset{w_1(f)}{\arg\min}\sum_t \frac{|y_1(f,t)|^2}{r(f,t)^{2\beta}} = \underset{w_1(f)}{\arg\min}\, w_1(f)\left\{\sum_t \frac{u(f,t)u(f,t)^H}{r(f,t)^{2\beta}}\right\}w_1(f)^H \tag{34}$$

$$\text{subject to } w_1(f)w_1(f)^H = 1$$

This formula can be interpreted as a minimization problem of a weighted covariance matrix of u(f,t), and can be solved by using eigen decomposition (strictly speaking, the terms between the curly brackets of the right side of Formula (34) are not the weighted covariance matrix itself, but represents the product of the weighted covariance matrix and T; however, since the difference does not influence the solution of the minimization problem of Formula (34), the sigma between the curly brackets itself also is called a weighted covariance matrix hereinafter).

A function that has a matrix A as its argument and is for determining all eigenvectors by performing eigen decomposition on the matrix is represented by eig(A). When this function is used, the eigenvector of the weighted covariance matrix of Formula (34) can be written as the following Formula (35).

[Math. 35]

$$[a_{min}(f)\ \ldots\ a_{max}(f)] = eig\left(\sum_t \frac{u(f,t)u(f,t)^H}{r(f,t)^{2\beta}}\right) \tag{35}$$

$a_{min}(f), \ldots, a_{max}(f)$ of the left side of Formula (35) are eigenvectors. $a_{min}(f)$ corresponds to the smallest eigenvalue, and $a_{max}(f)$ corresponds to the largest eigenvalue. The norm of each eigenvector is 1, and also is orthogonal to each other. $w_1(f)$ that minimizes Formula (34) is the Hermitian transpose of the eigenvector corresponding to the smallest eigenvalue as represented by the following Formula (36).

[Math. 36]

$$w_1(f) \leftarrow a_{min}(f)^H \tag{36}$$

Next, a method of applying the auxiliary function method to Formula (25), Formula (31), and Formula (33) to derive update formulae is explained.

The auxiliary function method is one of methods to efficiently solve optimization problems, and details thereof are described in Japanese Patent Laid-open No. 2011-175114 and Japanese Patent Laid-open No. 2014-219467.

Assigning the TFVV Laplace distribution represented by Formula (31) to Formula (23) and ignoring terms unrelated to minimization gives the following Formula (37).

[Math. 37]

$$w_1(f) = \underset{w_1(f)}{\arg\min}\sum_t \frac{|y_1(f,t)|}{r(f,t)^{\beta}} \tag{37}$$

$$\text{subject to } w_1(f)w_1(f)^H = 1$$

A solution of this minimization problem cannot be determined in a closed form.

In view of this, an inequality like Formula (38) for "pressing from above" is prepared.

[Math. 38]

$$|y_1(f,t)| \le \frac{1}{2}\sum_t\left(\frac{|y_1(f,t)|^2}{b(f,t)} + b(f,t)\right) \tag{38}$$

The right side of Formula (38) is called an auxiliary function, and b(f,t) therein is called an auxiliary variable. This inequality holds true when b(f,t)=$|y_1(f,t)|$. If this inequality is applied to Formula (37), the following Formula (39) is obtained. Hereinafter, the right side of this inequality is written as G.

[Math. 39]

$$\sum_t \frac{|y_1(f,t)|}{r(f,t)^\beta} \le \frac{1}{2}\sum_t\left(\frac{|y_1(f,t)|^2}{b(f,t)r(f,t)^\beta} + \frac{b(f,t)}{r(f,t)^\beta}\right) = G \tag{39}$$

In the auxiliary function method, the following two steps are repeated alternately to thereby solve a minimization problem fast and stably.

1. As represented by the following Formula (40), $w_1(f)$ is fixed, and b(f,t) to minimize G is determined.

[Math. 40]

$$b(f,t) \leftarrow \underset{b(f,t)}{\arg\min}\, G = |y_1(f,t)| = |w_1(f)u(f,t)| \tag{40}$$

2. As depicted in the following Formula (41), b(f,t) is fixed, and $w_1(f)$ to minimize G is determined.

[Math. 41]

$$w_1(f) = \underset{w_1(f)}{\arg\min}\, G = \underset{w_1(f)}{\arg\min}\sum_t \frac{|y_1(f,t)|^2}{b(f,t)r(f,t)^\beta} = \underset{w_1(f)}{\arg\min}\, w_1(f)\left(\sum_t \frac{u(f,t)u(f,t)^H}{b(f,t)r(f,t)^\beta}\right)w_1(f)^H \tag{41}$$

$$\text{subject to } w_1(f)w_1(f)^H = 1$$

Formula (40) is minimized when the equality in Formula (38) holds true. Since the value of $y_1$(f,t) also changes every time $w_1$(f) changes, a calculation is performed by using Formula (9). Since Formula (41) is a minimization problem of a weighted covariance matrix similarly to Formula (34), it can be solved by using eigen decomposition.

When the eigenvector of the weighted covariance matrix of Formula (41) is calculated in accordance with the following Formula (42), $w_1$(f), which is a solution of Formula (41), is the Hermitian transpose of the eigenvector corresponding to the minimum value (Formula (36)).

[Math. 42]

$$[a_{min}(f) \ \dots \ a_{max}(f)] = eig\left(\sum_t \frac{u(f,t)u(f,t)^H}{b(f,t)r(f,t)^\beta}\right) \tag{42}$$

Note that, since both $w_1$(f) and $y_1$(f,t) are unknown in the initial execution of iteration, Formula (40) cannot be applied. In view of this, the initial value of the auxiliary variable b(f,t) is calculated in accordance with any one of the following methods.

a) A normalized value of a reference signal is used as the auxiliary variable. That is, b(f,t)=normalize(r(f,t)).

b) A tentative value is calculated as the separation result $y_1$(f,t), and the auxiliary variable is calculated therefrom in accordance with Formula (40).

c) A tentative value is assigned to $w_1$(f), and a calculation is performed in accordance with Formula (40).

normalize( ) of a) described above is a function defined by the following Formula (43), and s(t) in this formula represents a certain time-series signal. The function of normalize( ) is to normalize the mean square of the absolute value of a signal to 1.

[Math. 43]

$$\text{normalize}(s(t)) = \frac{s(t)}{\sqrt{\langle |s(t)|^2\rangle_t}} \tag{43}$$

Conceivable examples of operations of $y_1$(f,t) in b) described above include an operation of selecting components corresponding to one channel in an observation signal and an operation of averaging components corresponding to all channels in an observation signal. For example, in a case where a microphone placement mode as in FIG. 5 described later is used, since there is always a microphone allocated to a speaker who is making an utterance, it is better to use an observation signal of the microphone as a tentative extraction result. Assuming that a number of a microphone is k, $y_1$(f,t)=normalize ($x_k$(f,t)).

Regarding the tentative value in c) described above, in addition to a simple method in which a vector whose all elements have an identical value is used for example, it is also possible to store a value of an extraction filter estimated regarding the previous target-sound zone and use the value as the initial value of $w_1$(f) when a calculation for the next target-sound zone is performed. For example, in a case where sound source extraction is performed regarding the utterance (3-2) depicted in FIG. 3, an extraction filter estimated regarding the previous utterance (3-1) of the same speaker is used as a tentative value of $w_1$(f) in the current extraction.

Regarding the bivariate Laplace distribution represented by Formula (25) also, a solution can be obtained similarly by using an auxiliary function. Assigning Formula (25) to Formula (23) gives the following Formula (44).

[Math. 44]

$$w_1(f) = \underset{w_1(f)}{\arg\min}\sum_t \sqrt{c_1 r(f,t)^2 + c_2|y_1(f,t)|^2} \tag{44}$$

$$\text{subject to } w_1(f)w_1(f)^H = 1$$

Here, such an auxiliary function as the following Formula (45) is prepared.

[Math. 45]

$$\sqrt{c_1 r(f,t)^2 + c_2|y_1(f,t)|^2} \le \frac{1}{2}\left(\frac{c_1 r(f,t)^2 + c_2|y_1(f,t)|^2}{b(f,t)} + b(f,t)\right) \quad (45)$$

Then, the step of determining the auxiliary variable b(f,t) (corresponding to Formula (40)) can be represented as Formula (46).

[Math. 46]

$$b(f,t)=\sqrt{c_1 r(f,t)^2+c_2|y_1(f,t)|^2}=\sqrt{c_1 r(f,t)^2+c_2|w_1(f)u(f,t)|^2} \quad (46)$$

The step of determining the extraction filter $w_1(f)$ (corresponding to Formula (41)) can be represented as the following Formula (47).

[Math. 47]

$$w_1(f) = \underset{w_1(f)}{\arg\min} \sum_t \frac{|y_1(f,t)|^2}{b(f,t)} = \underset{w_1(f)}{\arg\min}\, w_1(f)\left(\sum_t \frac{u(f,t)u(f,t)^H}{b(f,t)}\right)w_1(f)^H \quad (47)$$

subject to $w_1(f)w_1(f)^H = 1$

The minimization problem can be solved by eigen decomposition of the following Formula (48).

[Math. 48]

$$[a_{min}(f)\ \dots\ a_{max}(f)] = eig\left(\sum_t \frac{u(f,t)u(f,t)^H}{b(f,t)}\right) \quad (48)$$

Next, the case of the TFVV Student-t distribution represented by Formula (33) is explained. Since an example in which the auxiliary function method is applied to the TFVV Student-t distribution is described in Document 1, only an update formula is described.

The step of determining the auxiliary variable b(f,t) is represented by the following Formula (49).

[Math. 49]

$$b(f,t) \leftarrow \frac{v}{v+2} r(f,t)^2 + \frac{2}{v+2}|y_1(f,t)|^2 = \frac{v}{v+2} r(f,t)^2 + \frac{2}{v+2}|w_1(f)u(f,t)|^2 \quad (49)$$

The degree of freedom ν functions as a parameter for adjusting the respective degrees of influence of r(f,t), which is a reference signal, and $y_1(f,t)$, which is an intermediate extraction result during iterations. In a case where ν=0, the reference signal is ignored, and in a case where ν is equal to or greater than 0 and smaller than 2, the influence of the extraction result is greater than the influence of the reference signal. In a case where ν is greater than 2, the influence of the reference signal is greater, and in a case where ν→∞, which means ν is an infinite value, the extraction result is ignored, and this is equivalent to a TFVV Gaussian distribution.

The step of determining the extraction filter $w_1(f)$ is represented by the following Formula (50).

[Math. 50]

$$w_1(f) = \underset{w_1(f)}{\arg\min} \sum_t \frac{|y_1(f,t)|^2}{b(f,t)} = \underset{w_1(f)}{\arg\min}\, w_1(f)\left(\sum_t \frac{u(f,t)u(f,t)^H}{b(f,t)}\right)w_1(f)^H \quad (50)$$

subject to $w_1(f)w_1(f)^H = 1$

Since Formula (50) is identical to Formula (47) in a case of a bivariate Laplace distribution, the extraction filter can be determined similarly in accordance with Formula (48).

Next, a method of deriving update formulae from Formula (27) to Formula (30) which is a sound source model based on divergence is explained. When these pdf's are assigned to Formula (23), a formula that minimizes the sum total of divergence at the f-th frequency bin can be obtained in any of them, but an appropriate auxiliary function for each divergence has not been found. In view of this, the fixed point method, which is another optimization algorithm, is applied.

A fixed point algorithm represents, by a formula, a condition to hold true when a parameter that is desired to be optimized (in the present disclosure, $w_1(f)$, which is an extraction filter) has converged, and an update formula is derived by transforming the formula into a fixed point format, "$w_1(f)=J(w_1(f))$." In the present disclosure, as the condition to hold true at a time of convergence, a formula in which the partial derivative of a parameter is zero is used, and partial differentiation depicted in the following Formula (51) is performed to derive a specific formula.

[Math. 51]

$$\frac{\partial L}{\partial \overline{w_1(f)}} = 0 \quad (51)$$

The left side of Formula (51) is a partial derivative according to conj($w_1(f)$). Then, Formula (51) is transformed to obtain the format of Formula (52).

[Math. 52]

$$w_1(f)=J(w_1(f)) \quad (52)$$

In the fixed point algorithm, the following Formula (53), in which the equal sign in Formula (52) is replaced with assignment, is executed iteratively. Note that, since the constraint of Formula (11) needs to be satisfied regarding $w_1(f)$ in the present disclosure, norm normalization according to Formula (54) also is performed after Formula (53).

[Math. 53]

$$w_1(f) \leftarrow J(w_1(f)) \quad (53)$$

[Math. 54]

$$w_1(f) \leftarrow \frac{w_1(f)}{\sqrt{w_1(f)w_1(f)^H}} \quad (54)$$

Hereinbelow, update formulae corresponding to Formula (27) to Formula (30) are explained. Only a formula corresponding to Formula (53) is described in any case, but in actual extraction processes, norm normalization of Formula (54) also is performed after assignment.

An update formula derived from Formula (27), which is a pdf corresponding to the Euclidean distance, is represented by the following Formula (55).

[Math. 55]

$$w_1(f) \leftarrow \sum_t \frac{y_1(f,t)r(f,t)u(f,t)^H}{|y_1(f,t)|} \tag{55}$$

$$w_1(f) \leftarrow w_1(f)\sum_t \frac{r(f,t)}{|w_1(f)u(f,t)|}u(f,t)u(f,t)^H$$

Whereas Formula (55) is written in two lines, it is assumed that the upper line is used after $y_1(f,t)$ is calculated by using Formula (9), and it is assumed that the lower line uses $w_1(f)$ and u(f,t) directly without calculating $y_1(f,t)$. This similarly applies also to Formula (56) to Formula (60) described later.

Since both the extraction filter $w_1(f)$ and the extraction result $y_1(f,t)$ are unknown only at the initial execution of iteration, $w_1(f)$ is calculated by either of the following methods.

a) A tentative value as the separation result $y_1(f,t)$ is calculated, and $w_1(f)$ is calculated therefrom in accordance with the formula in the upper line in Formula (55).

b) A tentative value is assigned to $w_1(f)$, and $w_1(f)$ is calculated therefrom in accordance with the formula in the lower line in Formula (55).

For the tentative value of $y_1(f,t)$ in a) described above, the method of b) in the explanation regarding Formula (40) can be used. Similarly, for the tentative value of $w_1(f)$ in b), the method of c) in the explanation regarding Formula (40) can be used.

Update formulae derived from Formula (28), which is a pdf corresponding to the Itakura-Saito divergence (power spectrogram version), are the following Formula (56) and Formula (57).

[Math. 56]

$$w_1(f) \leftarrow \left(\sum_t \frac{y_1(f,t)u(f,t)^H}{r(f,t)^2}\right)\left(\sum_t \frac{u(f,t)u(f,t)^H}{|y_1(f,t)|^2}\right)^{-1} \tag{56}$$

$$w_1(f) \leftarrow w_1(f)\left(\sum_t \frac{u(f,t)u(f,t)^H}{r(f,t)^2}\right)\left(\sum_t \frac{u(f,t)u(f,t)^H}{|w_1(f)u(f,t)|^2}\right)^{-1}$$

Formula (57) is described below.

[Math. 57]

$$w_1(f) \leftarrow \left(\sum_t \frac{y_1(f,t)u(f,t)^H}{|y_1(f,t)|^2}\right)\left(\sum_t \frac{u(f,t)u(f,t)^H}{r(f,t)^2}\right)^{-1} \tag{57}$$

$$w_1(f) \leftarrow w_1(f)\left(\sum_t \frac{u(f,t)u(f,t)^H}{|w_1(f)u(f,t)|^2}\right)\left(\sum_t \frac{u(f,t)u(f,t)^H}{r(f,t)^2}\right)^{-1}$$

Since there are two possible ways of transformation into the form of Formula 52, there are also two types of update formulae.

Both the second term of the right side of the lower line in Formula (56) and the third term of the right side of the lower line in Formula (57) include only u(f,t) and r(f,t), and are constant during an iteration process. Accordingly, it is sufficient if these terms are calculated only once before iterations, and it is sufficient if its inverse matrix also is calculated once in Formula (57).

Update formulae derived from Formula (29), which is a pdf corresponding to the Itakura-Saito divergence (amplitude spectrogram version), are the following Formula (58) and Formula (59). There are also two possible ways.

[Math. 58]

$$w_1(f) \leftarrow \left(\sum_t \frac{y_1(f,t)u(f,t)^H}{r(f,t)|y_1(f,t)|}\right)\left(\sum_t \frac{u(f,t)u(f,t)^H}{|y_1(f,t)|^2}\right)^{-1} \tag{58}$$

$$w_1(f) \leftarrow w_1(f)\left(\sum_t \frac{u(f,t)u(f,t)^H}{r(f,t)|w_1(f)u(f,t)|}\right)\left(\sum_t \frac{u(f,t)u(f,t)^H}{|w_1(f)u(f,t)|^2}\right)^{-1}$$

Formula (59) is described below.

[Math. 59]

$$w_1(f) \leftarrow \left(\sum_t \frac{y_1(f,t)u(f,t)^H}{|y_1(f,t)|^2}\right)\left(\sum_t \frac{u(f,t)u(f,t)^H}{r(f,t)|y_1(f,t)|}\right)^{-1} \tag{59}$$

$$w_1(f) \leftarrow w_1(f)\left(\sum_t \frac{u(f,t)u(f,t)^H}{|w_1(f)u(f,t)|^2}\right)\left(\sum_t \frac{u(f,t)u(f,t)^H}{r(f,t)|w_1(f)u(f,t)|}\right)^{-1}$$

An update formula derived from Formula (30) is represented by the following Formula (60). Regarding this formula also, it is sufficient if the last term of the right side is calculated only once before iterations.

[Math. 60]

$$w_1(f) \leftarrow \left(\sum_t \frac{y_1(f,t)u(f,t)^H}{r(f,t)|y_1(f,t)|}\right)\left(\sum_t \frac{u(f,t)u(f,t)^H}{r(f,t)^2}\right)^{-1} \tag{60}$$

$$w_1(f) \leftarrow w_1(f)\left(\sum_t \frac{u(f,t)u(f,t)^H}{r(f,t)|w_1(f)u(f,t)|}\right)\left(\sum_t \frac{u(f,t)u(f,t)^H}{r(f,t)^2}\right)^{-1}$$

The contents of processes explained thus far are applied to an embodiment of the present disclosure explained next.

EMBODIMENT

[Configuration Example of Sound Source Extracting Apparatus]

Figure 4:
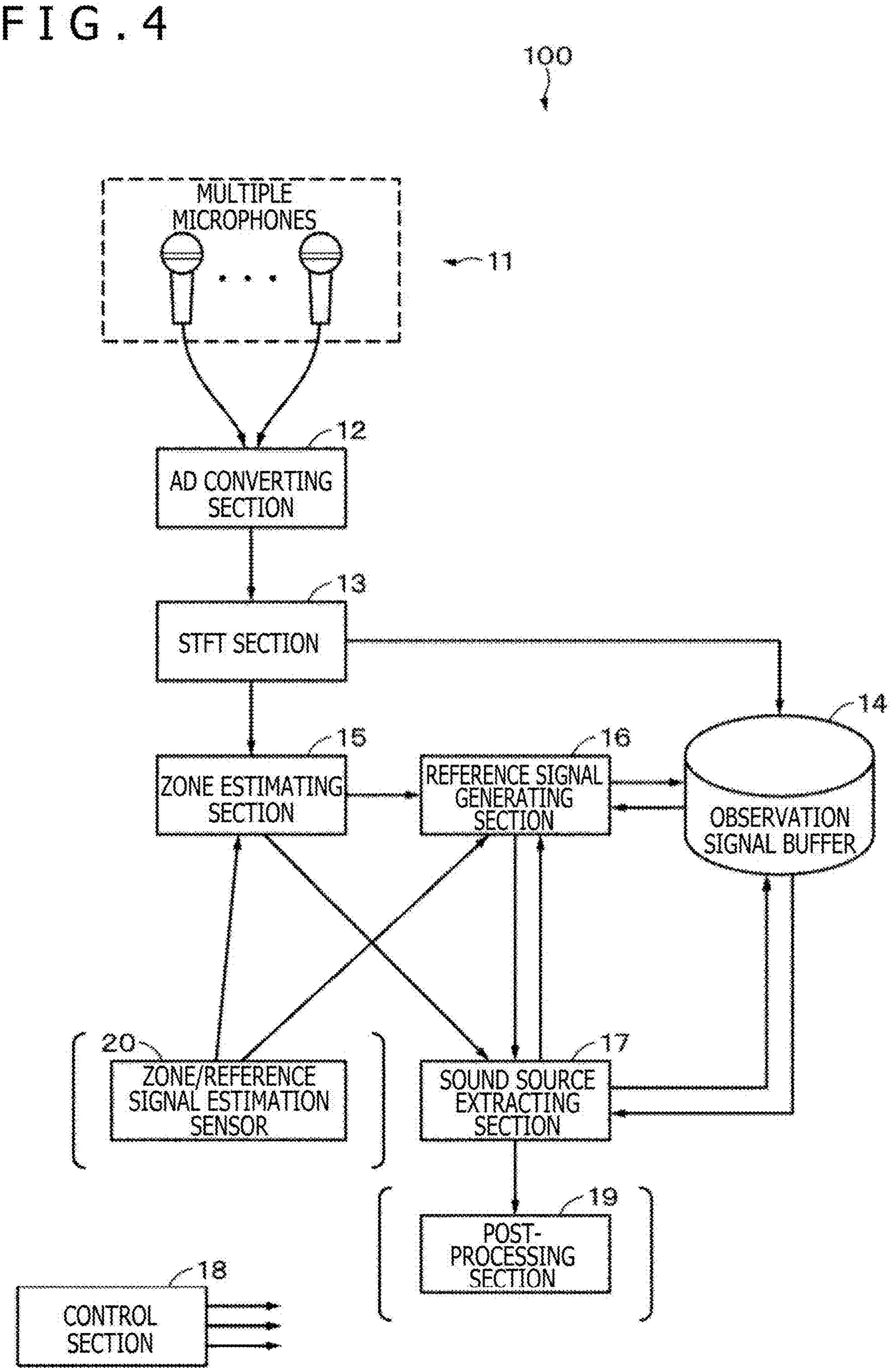
FIG. 4 is a block diagram depicting a configuration example of a sound source extracting apparatus according to one embodiment.

FIG. 4 is a figure depicting a configuration example of a sound source extracting apparatus (sound source extracting apparatus 100) which is an example of the signal processing apparatus according to the present embodiment. For example, the sound source extracting apparatus 100 has multiple microphones 11, an AD (Analog to Digital) converting section 12, an STFT (Short-Time Fourier Transform) section 13, an observation signal buffer 14, a zone estimating section 15, a reference signal generating section 16, a sound source extracting section 17, and a control section 18. As necessary, the sound source extracting apparatus 100 has a post-processing section 19 and a zone/reference signal estimation sensor 20.

The multiple microphones 11 are placed at mutually different positions. There are several variations of placement modes of the microphones as described later. A mixed sound signal which is a mixture of a target sound and non-target sounds is input (recorded) through the microphones 11.

The AD converting section 12 converts a multi-channel signal acquired at each of the microphones 11 into a digital signal for each channel. This signal is referred to as a (time-domain) observation signal as appropriate.

The STFT section 13 applies the short-time Fourier transform to the observation signals to thereby convert the observation signals into time-frequency-domain signals. The time-frequency-domain observation signals are sent to the observation signal buffer 14 and the zone estimating section 15.

The observation signal buffer 14 accumulates observation signals of a predetermined length of time (number of frames). Observation signals are stored in the unit of frames, and when a request representing an observation signal of which time range is needed is received from another module, an observation signal corresponding to the time range is returned. The signals accumulated here are used at the reference signal generating section 16 and the sound source extracting section 17.

The zone estimating section 15 detects a zone in which a target sound is included in a mixed sound signal. Specifically, the zone estimating section 15 detects a start time of the target sound (a time at which the target sound starts being produced), an end time of the target sound (a time at which the target sound finishes being produced), and the like. What type of technology is used to perform this zone estimation depends on a use scene of the present embodiment and a placement mode of the microphones, and accordingly, details are described later.

The reference signal generating section 16 generates a reference signal corresponding to a target sound on the basis of a mixed sound signal. For example, the reference signal generating section 16 estimates a rough amplitude spectrogram of the target sound. Since processes performed by the reference signal generating section 16 depend on a use scene of the present embodiment and a placement mode of the microphones, details are described later.

The sound source extracting section 17 extracts, from a mixed sound signal, a signal which is similar to a reference signal and in which a target sound is more enhanced. Specifically, the sound source extracting section 17 estimates an estimation result of a target sound by using an observation signal and a reference signal that correspond to a zone in which the target sound is being produced. Alternatively, the sound source extracting section 17 estimates an extraction filter for generating such an estimation result from an observation signal.

An output of the sound source extracting section 17 is sent to the post-processing section 19 as necessary. Examples of post-processing performed at the post-processing section 19 include voice recognition and the like. In a case where the present embodiment is combined with voice recognition, the sound source extracting section 17 outputs a time-domain extraction result, that is, a voice waveform, and a voice recognizing section (post-processing section 19) performs a recognition process on the voice waveform.

Note that, whereas voice recognition has a voice zone detection functionality in some cases, a voice zone detection functionality on the side of voice recognition can be omitted in the present embodiment since the zone estimating section 15 equivalent to one having a voice zone detection functionality is included. In addition, whereas voice recognition often includes an STFT for extracting, from a waveform, voice features necessary for recognition processes, in a case where voice recognition is combined with the present embodiment, an STFT on the side of voice recognition may be omitted. In a case where the STFT on the side of voice recognition is omitted, the sound source extracting section 17 outputs a time-frequency-domain extraction result, that is, a spectrogram, and the spectrogram is transformed into voice features on the side of voice recognition.

The control section 18 comprehensively controls each section of the sound source extracting apparatus 100. For example, the control section 18 controls operation of each section described above. Although omitted in FIG. 4, the control section 18 and each functional block described above are interlinked.

The zone/reference signal estimation sensor 20 is a sensor that is assumed to be used in zone estimation or reference signal generation, and is different from microphones in the microphones 11. Note that the post-processing section 19 and the zone/reference signal estimation sensor 20 are sandwiched by parentheses in FIG. 4, and this represents that the post-processing section 19 and the zone/reference signal estimation sensor 20 can be omitted from the sound source extracting apparatus 100. That is, if the precision of zone estimation or reference signal generation can be improved by providing a dedicated sensor different from the microphone 11, such a sensor may be used.

For example, in a case where schemes that use lip images described in Japanese Patent Laid-open No. Hei 10-51889 and the like are used as an utterance zone detection method, an imaging element (camera) can be applied as a sensor. Alternatively, the following sensor used as an auxiliary sensor in Japanese Patent Application No. 2019-073542 proposed by the present inventor may be included, and zone estimation or reference signal generation may be performed by using signals acquired with the auxiliary sensor.

- A microphone such as a bone conduction microphone or a pharyngeal microphone that is of a type used in a body-worn state.
- A sensor that can observe vibrations of the skin surface near the mouth or throat of a speaker. For example, a combination of a laser pointer and an optical sensor.

[Zone Estimation and Reference Signal Generation]

There are several conceivable variations of use scenes of the present embodiment and placement modes of the microphones 11, and what type of technology can be applied for zone estimation and reference signal generation differs for each of them. For explanation of each variation, it is necessary to clarify whether or not target-sound zones can overlap and how to cope with a case where zones of the target sounds can overlap. Hereinbelow, approximately three variations are depicted as typical use scenes and placement modes, and each of them is explained with use of a corresponding one of FIG. 5 to FIG. 7.

Figure 5:
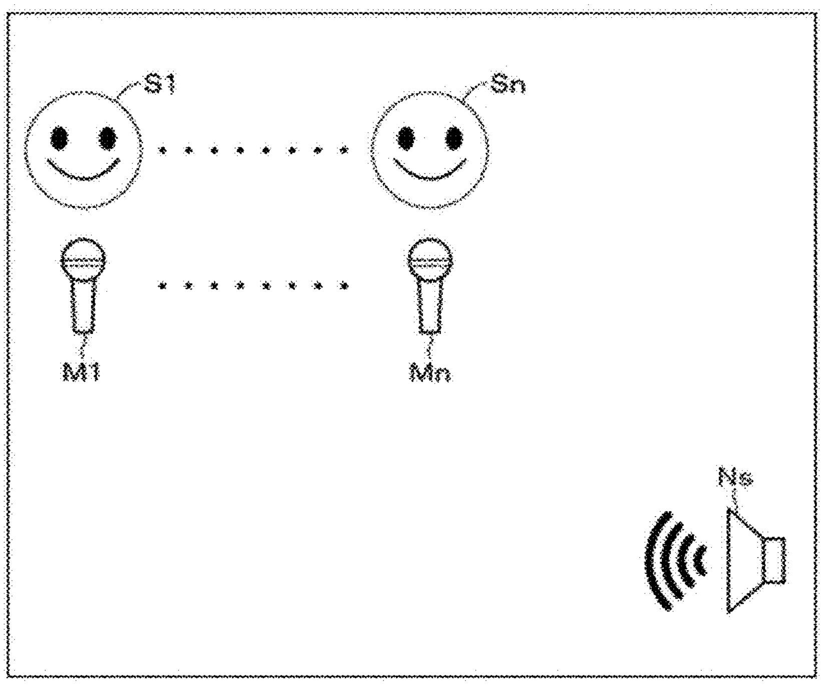
FIG. 5 is a figure to be referred to in the explanation of an example of a zone estimation/reference signal generation process.

FIG. 5 is a figure depicting an assumed situation where there are N (two or more) speakers in an environment and a microphone is allocated to each speaker. In a situation where microphones are allocated, each speaker wears a pin microphone, a headset microphone, or the like, or a microphone is placed very close to each speaker, for example. It is assumed that the N speakers are S1, S2, . . . , and Sn and the microphones allocated to the speakers are M1, M2, . . . , and Mn. In this case, for example, the microphones M1 to Mn are used as the microphones 11. Further, there are zero or more interfering-sound sound sources Ns.

Such a situation corresponds to, for example, a scene where a conference is being held in a room and voice recognition of a voice collected with a microphone of each speaker is performed in order to automatically create minutes of the conference. In this case, there is a possibility that utterances overlap, and if utterances overlap, a signal which is a mixture of voices is observed at each microphone. In addition, there can be sounds of a fan of a projector or an air conditioner, reproduced sounds emitted from equipment including a speaker unit, or the like as an interfering-sound sound source, and these sounds also are included in an observation signal of each microphone. Any of them can be a cause of erroneous recognition, but when the sound source extraction technology according to the present embodiment is used, it is possible to keep only a voice of a speaker corresponding to each microphone and remove (suppress) other sound sources (other speakers and interfering-sound sound sources), thereby making it possible to improve the voice recognition precision.

Hereinbelow, a zone detection method and a reference signal generation method that can be used in such a situation are explained. Note that, hereinafter, a voice of a corresponding (target) speaker in sounds observed with each microphone is referred to as a main voice or a main utterance, and voices of other speakers are referred to as echoes or crosstalk, as appropriate.

As a zone detection method, main utterance detection described in Japanese Patent Application No. 2019-227192 can be used. In the application, by performing training using a neural network, a detector that reacts to a main voice while ignoring crosstalk is realized. In addition, since it also copes with a situation where utterances overlap, the detector can estimate the zone and speaker of each utterance as in FIG. 3 even if utterances overlap.

There are at least two possible reference signal generation methods. In one method, a reference signal is directly generated from a signal observed with a microphone allocated to a speaker. For example, whereas a signal observed with the microphone M1 in FIG. 5 is a mixture of all sound sources, a voice of the speaker S1, who is the closest sound source, is collected as a large voice; on the other hand, as compared with the voice, sounds from other sound sources are collected as smaller sounds. Accordingly, when an amplitude spectrogram is generated by segmenting the observation signal of the microphone M1 according to an utterance zone of the speaker S1 and obtaining the absolute value after application of the short-time Fourier transform to a segment corresponding to the utterance zone, the amplitude spectrogram is a rough amplitude spectrogram of the target sound, and can be used as a reference signal in the present embodiment.

The other method uses a crosstalk reduction technology described in Japanese Patent Application No. 2019-227192 described before. In the application described above, by training a neural network, it is made possible to realize removal (reduction) of crosstalk from a signal which is a mixture of a main voice and crosstalk, keeping the main voice. An output of the neural network is an amplitude spectrogram which is a crosstalk reduction result or a time-frequency mask, and if it is the former, the output can be used as a reference signal with no changes being made thereto. Even if the output is the latter, an amplitude spectrogram which is a crosstalk removal result can be generated by applying the time-frequency mask to the amplitude spectrogram of an observation signal, and accordingly, the amplitude spectrogram can be used as a reference signal.

Figure 6:
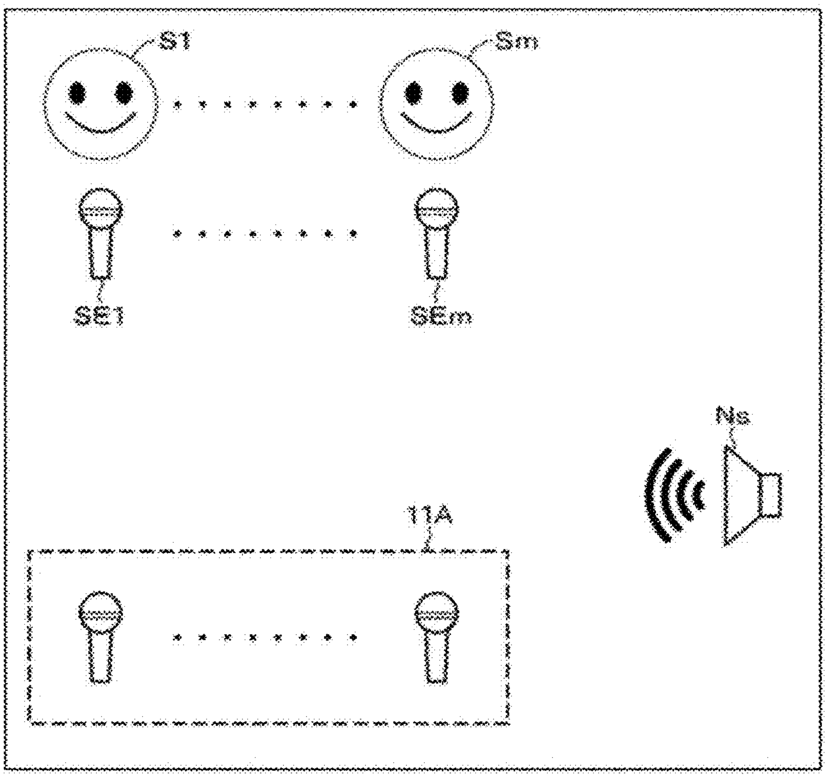
FIG. 6 is a figure to be referred to in the explanation of another example of the zone estimation/reference signal generation process.

Next, a reference signal generation process and the like in a use scene different from that in FIG. 5 are explained with use of FIG. 6. The example depicted in FIG. 6 represents an assumed environment where there are one or more speakers and one or more interfering-sound sound sources. Whereas FIG. 5 mainly focuses more on overlapping utterances than on the presence of the interfering-sound sound sources Ns, the example depicted in FIG. 6 mainly focuses on acquisition of a clean voice in a noisy environment where there are large interfering sounds. Note that, in a case where there are two or more speakers, overlapping utterances also are a problem.

It is assumed that there are m speakers, and the speakers are a speaker S1 to a speaker Sm. m is equal to or greater than one. Whereas FIG. 6 depicts only one interfering-sound sound source Ns, but the number of interfering-sound sound sources Ns can be any number.

There are two types of sensors to be used. One of them is sensors worn by the speakers or sensors placed very close to the speakers (sensors corresponding to the zone/reference signal estimation sensor 20), and are hereinbelow referred to as sensors SE (sensors SE1, SE2, . . . , and SEm) as appropriate. The other of them is a microphone array 11A including multiple microphones 11 whose positions are fixed.

The zone/reference signal estimation sensor 20 used may be of a type similar to the microphones in FIG. 5 (a type of microphone that is called an air conduction microphone and collects sounds propagated through the atmospheric air), but other than this, as explained with reference to FIG. 4, a type of microphone such as a bone conduction microphone or a pharyngeal microphone that is of a type used in a body-worn state or a sensor that can observe vibrations of the skin surface near the mouth or throat of a speaker may be used. In any case, since each sensor SE is nearer to the corresponding speaker than the microphone array 11A is or is worn on the body of the speaker, the sensor SE can record an utterance by the speaker corresponding to the sensor at a high S/N ratio.

Possible placement modes of the microphone array 11A include also a mode in which microphones are placed at multiple locations in a space which mode is called distributed microphones, in addition to a mode in which multiple microphones are placed in one apparatus. Conceivable examples of the mode of distributed microphones include a mode in which microphones are placed on the wall surface and ceiling surface of a room, a mode in which microphones are placed on the seat, wall surface, ceiling, dashboard, and the like in an automobile, and other modes.

In the present example, signals acquired with the sensors SE1 to SEm corresponding to the zone/reference signal estimation sensor 20 are used for zone estimation and reference signal generation, and multi-channel observation signals acquired from the microphone array 11A are used for sound source extraction. As a zone estimation method and a reference signal generation method in a case where air conduction microphones are used as the sensors SE, methods similar to the methods explained with use of FIG. 5 can be used.

On the other hand, in a case where body-worn microphones are used, in addition to methods similar to the methods depicted in FIG. 5, methods using a feature that a signal with less mixing of interfering sounds or utterances by other speakers can be acquired can also be used. For example, for zone estimation, a method of identifying a zone on the basis of a threshold regarding the power of an input signal can also be used, and an amplitude spectrogram generated from the input signal can be used as a reference signal with no changes being made thereto. Since sounds recorded with body-worn microphones have attenuated high frequencies and, moreover, include also recorded sounds such as swallowing sounds that are generated inside bodies in some cases, it is not necessarily appropriate to use the sounds as inputs for voice recognition or the like, but the sounds can be used effectively as sounds for zone estimation or reference signal generation.

In a case where sensors such as optical sensors other than microphones are used as the sensors SE, a method described in Japanese Patent Application No. 2019-227192 can be used. In this patent application, a neural network is trained in advance with the correspondence, to clean target sounds, of sounds acquired with air conduction microphones (mixtures of target sounds and interfering sounds) and signals acquired with auxiliary sensors (some signal corresponding to target sounds), and at a time of inference, signals acquired with an air conduction microphone and an auxiliary sensor are input to the neural network to thereby generate a cleaner target sound. Since an output of the neural network is an amplitude spectrogram (or a time-frequency mask), the output can be used as a reference signal (or can be used to generate a reference signal) according to the present embodiment. In addition, since a method of estimating also a zone in which a target sound is being produced simultaneously with the generation of the clean target sound is described as a modification example, it can be used also as zone detecting means.

Sound source extraction is basically performed by using observation signals acquired with the microphone array 11A. Note that, in a case where air conduction microphones are used as the sensors SE, it is also possible to add observation signals acquired with the air conduction microphones. That is, if the microphone array 11A includes N microphones, sound source extraction may be performed by using observation signals of (N+m) channels additionally including signals from the m zone/reference signal estimation sensors. In addition, since, in that case, there are multiple air conduction microphones even if N=1, a single microphone may be used instead of the microphone array 11A.

Similarly, in addition to signals from the sensors SE, signals acquired with the microphone array may be used also for zone estimation or reference signal generation. Since the microphone array 11A is apart from any speakers, utterances by the speakers are always observed as crosstalk. By comparing the signals of the microphone array 11A and signals of the microphones for zone/reference signal estimation, it can be expected that the zone estimation precision, in particular, the zone estimation precision when utterances overlap, is improved.

Figure 7:
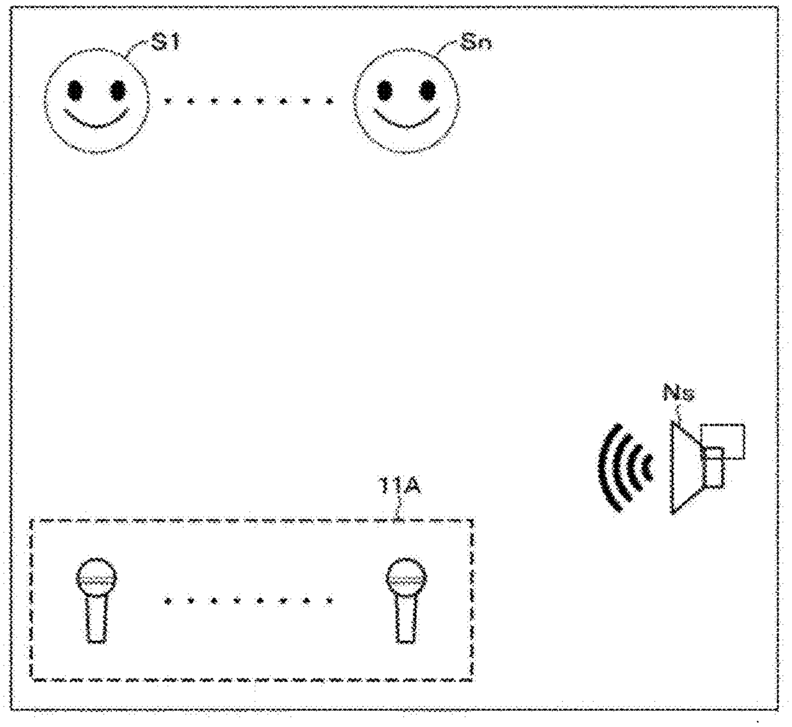
FIG. 7 is a figure to be referred to in the explanation of another example of the zone estimation/reference signal generation process.

FIG. 7 depicts a microphone placement mode different from that in FIG. 6. The microphone placement mode is the same as that in FIG. 6 in that there are one or more speakers and one or more interfering-sound sound sources in the assumed environment, but the microphone array 11A is the only microphone to be used, and there are no sensors placed very close to speakers. Examples of the mode of the microphone array 11A that can be applied include, similarly to FIG. 6, multiple microphones placed in one apparatus, multiple microphones (distributed microphones) placed in a space, and other modes.

The problem in such a situation is how utterance zone estimation and reference signal estimation, which are a premise of sound source extraction according to the present disclosure, are performed, and technologies that can be applied differ depending on whether the frequency of occurrence of mixing of voices is low or high. Hereinbelow, each of them is explained.

Cases where the frequency of occurrence of mixing of voices is low include a case where there is only one speaker in an environment (i.e., only the speaker S1) and the interfering-sound sound sources Ns can be regarded as non-voice sound sources. In that case, as a zone estimation method, a voice zone detection technology paying attention to “voiciness” described in Japanese Patent No. 4182444 or the like can be applied. That is, in a case where it is considered that the only “voicy” signal is a signal of an utterance by the speaker S1 in the environment depicted in FIG. 7, non-voice signals are ignored, and a portion (timing) including the voicy signal is detected as a target-sound zone.

As a reference signal generation method, a technique called denoising (denoise) described in Document 3, that is, a process in which a signal which is a mixture of a voice and a non-voice sound is input, the non-voice sound is removed, and the voice is kept, can be applied. Whereas a wide variety of methods can be applied as denoising, for example, the following method uses a neural network, and its outputs can be used as reference signals with no changes being made thereto since its outputs are amplitude spectrograms.

“Document 3

Liu, D. & Smaragdis, P. & Kim, M. (2014).

“Experiments on deep learning for speech denoising,”

Proceedings of the Annual Conference of the International Speech Communication Association, INTERSPEECH. 2685-2689.”

On the other hand, cases where the frequency of occurrence of mixing of voices is high include a case where multiple speakers are having a conversation in an environment and their utterances overlap and a case where interfering-sound sound sources produce voices even if there is only one speaker, for example. Examples of the latter case include a case where voices are output from speaker units of a television, a radio, or the like and other cases. In such a case, a scheme that can be applied also to a mixture of voices needs to be used for utterance zone detection. For example, technologies like the ones below can be applied.

a) Voice zone detection using sound source direction estimation (e.g., methods described in Japanese Patent Laid-open No. 2010-121975 and Japanese Patent Laid-open No. 2012-150237)

b) Voice zone detection using facial images (lip images)

(e.g., methods described in Japanese Patent Laid-open No. Hei 10-51889 and Japanese Patent Laid-open No. 2011-191423)

Since there is the microphone array in the microphone placement mode depicted in FIG. 7, sound source direction estimation which is a premise of a) can be applied. In addition, when an imaging element (camera) is used as the zone/reference signal estimation sensor 20 in the example depicted in FIG. 4, b) can also be applied. Since, in either scheme, the direction of an utterance also can be known at a time point when an utterance zone of the utterance is detected (in the method of b) described above, an utterance direction can be calculated from the position of a lip in an image), the value of the direction can be used for reference signal generation. Hereinbelow, a sound source direction estimated in utterance zone estimation is referred to as θ as appropriate.

A reference signal generation method also needs to cope with mixing of voices, and the following can be applied as such a technology.

a) Time Frequency Mask Using Sound Source Direction

This is a reference signal generation method used in Japanese Patent Laid-open No. 2014-219467. Calculating a steering vector corresponding to the sound source direction θ and calculating a cosine similarity between the steering vector and an observation signal vector (Formula (2) described above) give a mask to keep a sound arriving from the direction θ and attenuate sounds arriving from other directions. The mask is applied to the amplitude spectrogram of an observation signal, and a signal generated thereby is used as a reference signal.

b) Neural-Network-Based Selective Listening Technologies Such as Speaker Beam or Voice Filter Selective listening technologies described here are technologies to extract a human voice of one specified person, from a monaural signal which is a mixture of multiple voices. Clean voices (which may be utterance contents different from mixed voices), not mixed with voices of other speakers, of a speaker whose voice is desired to be extracted are recorded in advance, and when both a mixed signal and a clean voice are input to a neural network, a voice of a specified speaker included in the mixed signal is output. To be precise, a time-frequency mask for generating such a spectrogram is output. If the thus-output mask is applied to the amplitude spectrogram of an observation signal, a signal generated thereby can be used as a reference signal according to the present embodiment. Note that details of Speaker Beam and Voice Filter are described in the following Document 4 and Document 5, respectively.

"Document 4:

M. Delcroix, K. Zmolikova, K. Kinoshita, A. Ogawa and T. Nakatani,

"Single channel target speaker extraction and recognition with speaker beam," IEEE International Conference on Acoustics, Speech and Signal Processing (ICASSP), 2018."

"Document 5:

Author: Quan Wang, Hannah Muckenhire, Kevin Wilson, Prashant Sridhar, Zelin Wu, John Hershey, Rif A. Saurous, Ron J. Weiss, Ye Jia, Ignacio Lopez Moreno "VOICEFILTER: Targeted Voice Separation by Speaker-Conditioned Spectrogram Masking," arXiv:1810.04826v3 [eess.AS]27 Oct. 2018 https://arxiv.org/abs/1810.04826"

(Details of Sound Source Extracting Section)

Figure 8:
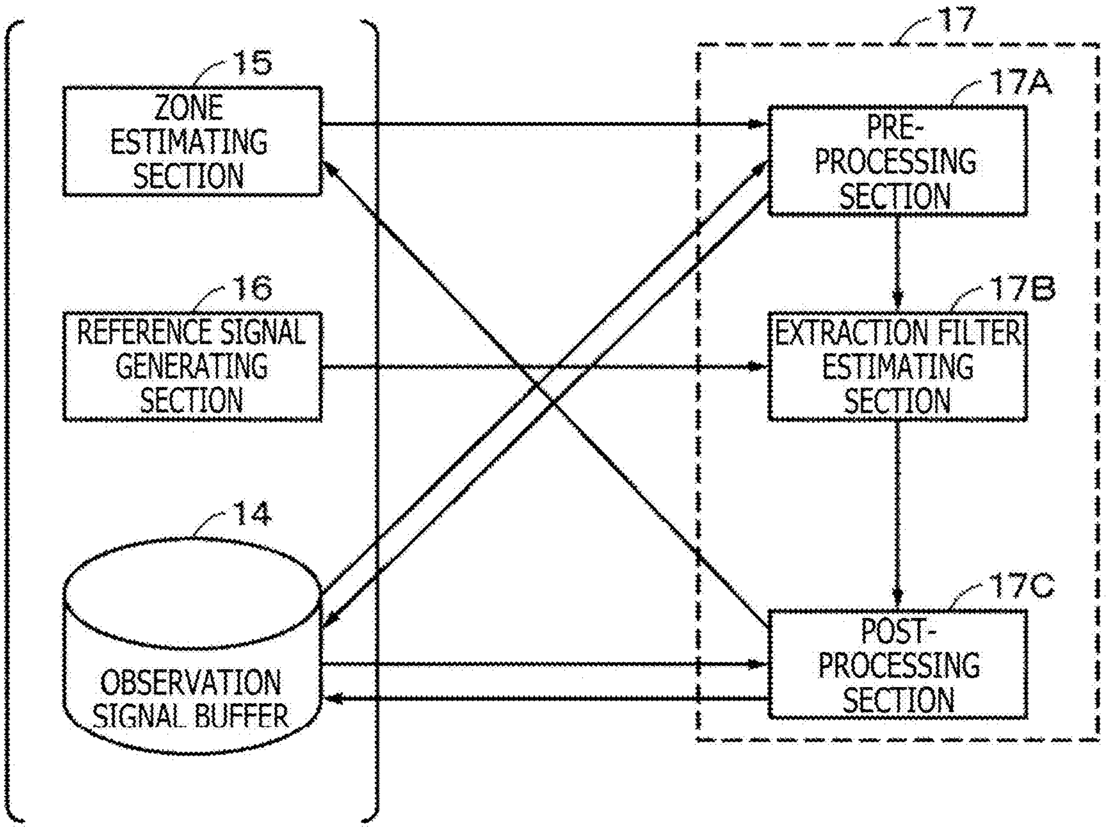
FIG. 8 is a figure to be referred to in the explanation of details of a sound source extracting section according to the embodiment.

Next, details of the sound source extracting section 17 are explained with use of FIG. 8. The sound source extracting section 17 has a pre-processing section 17A, an extraction filter estimating section 17B, and a post-processing section 17C, for example.

The pre-processing section 17A performs the uncorrelation process represented in Formula (3) to Formula (7), that is, performs the uncorrelation process or the like on a time-frequency-domain observation signal.

The extraction filter estimating section 17B estimates a filter that extracts a signal in which a target sound is more enhanced. Specifically, the extraction filter estimating section 17B performs extraction filter estimation and extraction result generation for sound source extraction. More specifically, the extraction filter estimating section 17B estimates an extraction filter as a solution that optimizes an objective function reflecting the similarity between a reference signal and an extraction result from the extraction filter and the independence between the extraction result and a separation result of another imaginary sound source.

As described above, as a sound source model that is included in the objective function and that represents the similarity between the reference signal and the extraction result, the extraction filter estimating section 17B uses any one of:

- a bivariate spherical distribution of the extraction result and the reference signal,
- a time-frequency-varying variance model that regards the reference signal as a value corresponding to the variance of each time frequency, and
- a model using a divergence between the absolute value of the extraction result and the reference signal. In addition, the bivariate Laplace distribution may be used as the bivariate spherical distribution. In addition, any one of a time-frequency-varying variance Gaussian distribution, a time-frequency-varying variance Laplace distribution, and a time-frequency-varying variance Student-t distribution may be used as the time-frequency-varying variance model. In addition, any one of the Euclidean distance or square error between the absolute value of the extraction result and the reference signal, the Itakura-Saito distance between the power spectrum of the extraction result and the power spectrum of the absolute value, the Itakura-Saito distance between the amplitude spectrum of the extraction result and the amplitude spectrum of the absolute value, the square error between the ratio between the absolute value of the extraction result and the reference signal and one may be used as the divergence of the model using divergence.

The post-processing section 17C performs at least a process of applying the extraction filter to a mixed sound signal. The post-processing section 17C may perform a process of generating an extraction-result waveform by applying the inverse Fourier transform to an extraction-result spectrogram, in addition to a rescaling process described later.

[Procedure of Processes Performed at Sound Source Extracting Apparatus]

(Overall Procedure)

Next, a procedure of processes (overall procedure) performed at the sound source extracting apparatus 100 is explained with reference to a flowchart depicted in FIG. 9. Note that the processes explained below are performed by the control section 18 unless noted otherwise.

In Step ST11, the AD converting section 12 converts an analog observation signal (mixed sound signal) input to the microphones 11 into a digital signal. The observation signal at this time point is a time-domain observation signal. Then, the process proceeds to Step ST12.

In Step ST12, the STFT section 13 applies the short-time Fourier transform (STFT) to the time-domain observation signal, and obtains a time-frequency-domain observation signal. Input may be performed from a file, a network, or the like as necessary, other than being performed through the microphones. Details of a specific process performed at the STFT section 13 are described later. Since there are multiple input channels (corresponding to the number of the microphones) in the present embodiment, the AD conversion and the STFT also are performed for all the channels. Then, the process proceeds to Step ST13.

In Step ST13, a process of accumulating (buffering) the observation signal converted into the time-frequency-domain signal by the STFT, by an amount corresponding to a predetermined length of time (a predetermined number of frames), is performed. Then, the process proceeds to Step ST14.

In Step ST14, the zone estimating section 15 estimates a start time of the target sound (a time at which the target sound starts being produced) and an end time of the target sound (a time at which the target sound finishes being produced). Further, in a case of specification in an environment where utterances can overlap, information that enables identification as to which speaker's utterance an utterance is is estimated as well. For example, in the use modes depicted in FIG. 5 and FIG. 6, the number of a microphone allocated to each speaker also is estimated, and in the use mode depicted in FIG. 7, the directions of utterances also are estimated.

Sound source extraction and processes that accompany it are performed for each target-sound zone. Accordingly, it is assessed in Step ST15 whether or not a target-sound zone is detected. Then, only in a case where a zone is detected in Step ST15, the process proceeds to Step ST16, and in a case where a zone is not detected, Steps ST16 to ST19 are skipped, and the process proceeds to Step ST20.

In a case where a zone is detected in Step ST15, in Step ST16, the reference signal generating section 16 generates, as a reference signal, a rough amplitude spectrogram of a target sound that is being produced in the zone. Schemes that can be used for reference signal generation have been explained with reference to FIG. 5 to FIG. 7. The reference signal generating section 16 generates a reference signal on the basis of an observation signal supplied from the observation signal buffer 14 and a signal supplied from the zone/reference signal estimation sensor 20, and supplies the reference signal to the sound source extracting section 17. Then, the process proceeds to Step ST17.

In Step ST17, the sound source extracting section 17 generates an extraction result of the target sound by using the reference signal determined in Step ST16 and an observation signal corresponding to a time range of the target-sound zone. That is, the sound source extracting section 17 performs a sound source extraction process. Details of the process are described later.

In Step ST18, it is determined whether to or not to iterate the processes according to Step ST16 and Step ST17 a predetermined number of times. This iteration means that, when the sound source extraction process generates an extraction result which is more precise than the observation signal or the reference signal, next, by generating a reference signal again from the extraction result and executing the sound source extraction process again by using the reference signal, an extraction result which is still more precise than the previous iteration can be obtained.

For example, in a case where a reference signal is generated by inputting an observation signal to a neural network, when the first extraction result, instead of an observation signal, is input to the neural network, the possibility that an output therefrom is more precise than the first extraction result is high. Accordingly, when the second extraction result is generated with use of the reference signal generated as described above, the possibility that the second extraction result is more precise than the first extraction result is high, and by further iterations, it is also possible to obtain more precise extraction results. A feature of the present embodiment is that not a separation process but the extraction process is performed iteratively. Note that one should be careful that this iteration is different from iteration that is used to estimate a filter in the auxiliary function method or the fixed point method inside the sound source extraction process according to Step ST17. After the process according to Step ST18, the process proceeds to Step ST19. That is, in a case where it is assessed in Step ST18 that the iteration is to be performed, the process returns to Step ST16, and the processes described above are performed repeatedly. In a case where it is assessed in Step ST18 that the iteration is not to be performed, the process proceeds to Step ST19.

In Step ST19, post-processing by the post-processing section 17C is performed by using the extraction result generated in Step ST17. Conceivable examples of the post-processing include voice recognition, response generation for a voice conversation using a recognition result of the voice recognition, and the like. Then, the process proceeds to Step ST20.

In Step ST20, it is assessed whether to or not to continue the process. In a case where the process is to be continued, the process returns to Step ST11, and in a case where the process is to be continued, the process ends.

(STFT)

Next, the short-time Fourier transform performed at the STFT section 13 is explained with reference to FIGS. 10A, 10B, and 10C. In the present embodiment, since microphone observation signals are multi-channel signals observed in multiple signals, the STFT is performed for each channel. The following is an explanation regarding the STFT for a k-th channel.

Figures 10A, 10B, 10C:
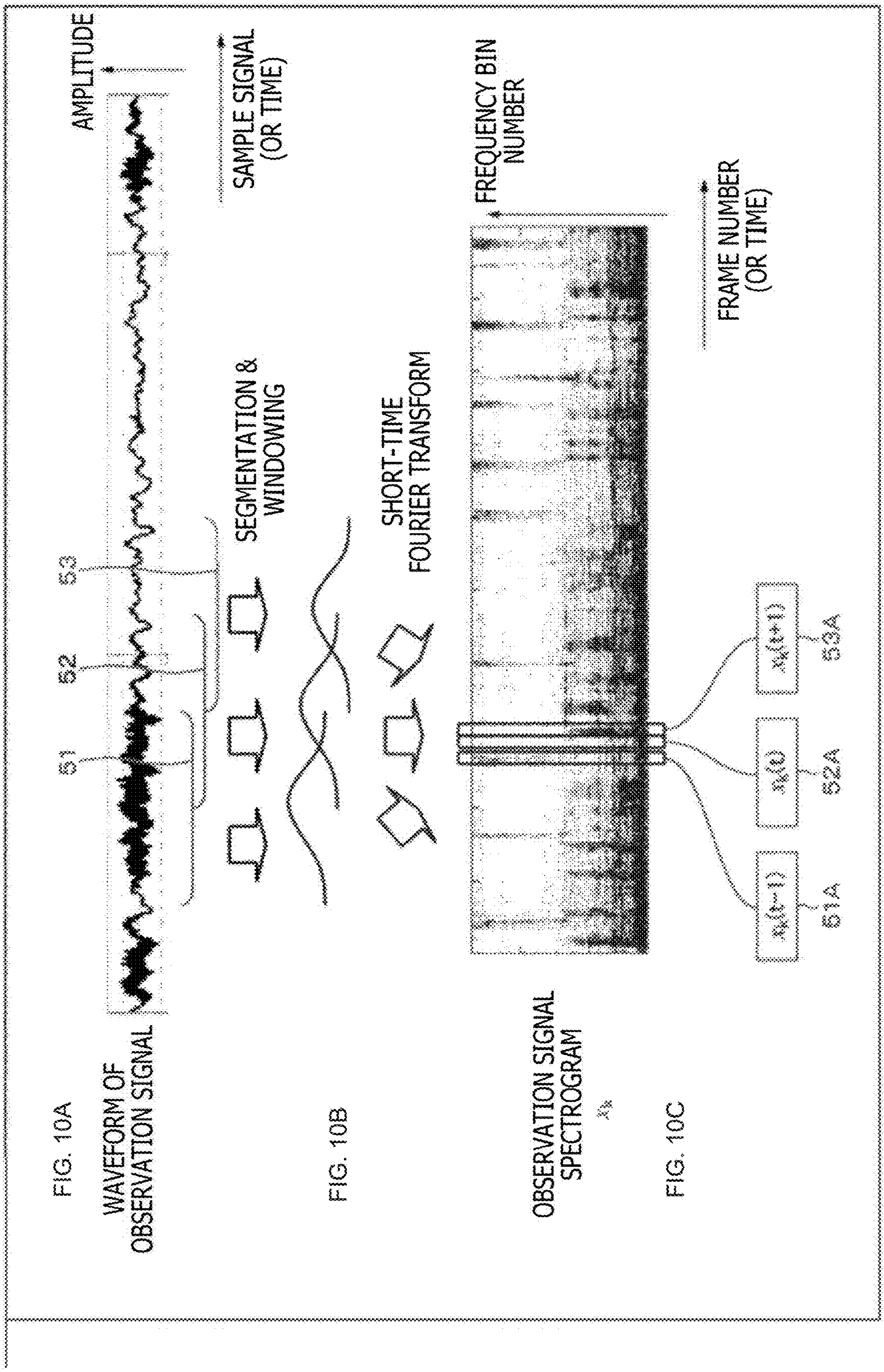
FIGS. 10A, 10B, and 10C are figures to be referred to in the explanation of a process performed at an STFT section according to the embodiment.

Waveforms with a predetermined length are obtained by segmentation of the waveform of a microphone recording signal obtained by the AD conversion process according to Step ST11, and a window function such as the Hann window or the Humming window is applied to the waveforms (see FIG. 10A). Each of these units obtained by segmentation is called a frame. By applying the short-time Fourier transform to data of one frame (see FIG. 10B), xk(1,t) to xk(F,t) are obtained as time-frequency-domain observation signals. Note that t represents a frame number and F represents the total number of frequency bins (see FIG. 10C).

Frames to be obtained by the segmentation may overlap, and by doing so, changes of time-frequency-domain signals between the consecutive frames become smooth. In FIGS. 10A, 10B, and 10C, xk(1,t) to xk(F,t) which are data of one frame are illustrated collectively as one vector xk(t) (FIG. 10C). xk(t) is called a spectrum, and a data structure formed by arranging multiple spectrums next to each other in the time direction is called a spectrogram.

In FIG. 10C, the horizontal axis represents frame numbers, and the vertical axis represents frequency bin numbers. From observation signals 51, 52, and 53 obtained by segmentation, three spectrums 51A, 52A, and 53A are generated, respectively.

(Sound Source Extraction Process)

Next, the sound source extraction process according to the present embodiment is explained with reference to a flowchart depicted in FIG. 11. The sound source extraction process explained with reference to FIG. 11 corresponds to the process in Step ST17 in FIG. 9.

In Step ST31, the pre-processing section 17A performs pre-processing. Examples of the pre-processing include the uncorrelation represented by Formula (3) to Formula (6). In addition, some special processes are performed only in the initial execution depending on update formulae used in filter estimation, and such processes also are performed as the pre-processing. For example, according to an estimation result of a target-sound zone supplied from the zone estimating section 15, the pre-processing section 17A reads out an observation signal (observation signal vector x(f,t)) of the target-sound zone from the observation signal buffer 14, and performs, as the pre-processing, an uncorrelation process or the like in accordance with the calculation of Formula (3) on the basis of the observation signal having been read out. Then, the pre-processing section 17A supplies a signal (uncorrelated observation signal u(f,t)) obtained by the pre-processing to the extraction filter estimating section 17B, and thereafter, the process proceeds to Step ST32.

In Step ST32, the extraction filter estimating section 17B performs a process of estimating an extraction filter. Then, the process proceeds to Step ST33. In Step ST33, the extraction filter estimating section 17B assesses whether or not the extraction filter has converged. In a case where it is assessed in Step ST33 that the extraction filter has not converged, the process returns to Step ST32, and the processes described above are performed repeatedly. Steps ST32 and ST33 represent iterations for estimating the extraction filter. Since the extraction filter is not determined in a closed form except for a case where the TFVV Gaussian distribution of Formula (32) is used as a sound source model, the process according to Step ST32 is repeated until the extraction filter and the extraction result converge or is repeated a predetermined number of times.

The extraction filter estimation process according to Step ST32 is a process of determining the extraction filter $w_1(f)$, and specific formulae differ between different sound source models.

For example, in a case where the TFVV Gaussian distribution of Formula (32) is used as a sound source model, the weighted covariance matrix of the right side of Formula (35) is calculated by using the reference signal r(f,t) and the uncorrelated observation signal u(f,t), and next, eigenvectors are determined by using eigen decomposition. Then, as in Formula (36), the Hermitian transpose is applied to an eigenvector corresponding to the smallest eigenvalue, and a result obtained therefrom is the extraction filter $w_1(f)$ to be determined. This process is performed for all frequency bins, that is, f=1 to F.

Similarly, in a case where the TFVV Laplace distribution of Formula (31) is used as a sound source model, first, the auxiliary variable b(f,t) is calculated by using the reference signal r(f,t) and the uncorrelated observation signal u(f,t) in accordance with Formula (40). Next, the weighted covariance matrix of the right side of Formula (42) is calculated, and eigen decomposition is applied to the weighted covariance matrix to determine eigenvectors. Last, the extraction filter $w_1(f)$ is obtained in accordance with Formula (36). Since the extraction filter $w_1(f)$ at this time point has not converged yet, the process returns to Formula (40), and a calculation of the auxiliary variable is performed again. These processes are executed for the number of times.

Similarly, also in a case where the bivariate Laplace distribution of Formula (25) is used as a sound source model, a calculation of the auxiliary variable b(f,t) (Formula (46)) and a calculation of the extraction filter (Formula (48) and Formula (36)) are performed alternately.

On the other hand, in a case where the model based on divergence represented by Formula (26) is used as a sound source model, calculations of the update formulae (Formula (55) to Formula (60)) corresponding to the respective models and a calculation of the formula (Formula (54)) to normalize the norm to 1 are performed alternately.

In a case where it is assessed in Step ST33 that the extraction filter has converged, that is, in a case where iterations have been performed until the extraction filter converges or are performed a predetermined number of times, the extraction filter estimating section 17B supplies the extraction filter or the extraction result to the post-processing section 17C, and the process proceeds to Step ST34.

In Step ST34, the post-processing section 17C performs post-processing. After the process in Step ST34 is performed, the sound source extraction process ends, and this means that the process in Step ST17 in FIG. 11 has ended. In the post-processing, rescaling of the extraction result is performed. Further, by performing the inverse Fourier transform as necessary, a time-domain waveform is generated. The rescaling is a process of adjusting the scale of each frequency bin of the extraction result. Although the constraint that the norm of a filter is 1 is placed in order to apply an efficient algorithm in the extraction filter estimation, the extraction result generated by applying the extraction filter on which the constraint has been placed has a scale different from the scale of an ideal target sound. In view of this, the post-processing section 17C adjusts the scale of the extraction result by using the observation signal (observation signal vector x(f,t)) which has not yet been subjected to uncorrelation and which is acquired from the observation signal buffer 14 or the like.

The rescaling process is as follows.

First, assuming that k=1 in Formula (9), $y_1(f,t)$, which is the extraction result before the rescaling, is calculated from the converged extraction filter $w_1(f)$. A rescaling coefficient $\gamma(f)$ can be determined as a value that minimizes the following Formula (61), and the specific formula is represented by Formula (62).

[Math. 61]

$$\gamma(f) = \arg\min_{\gamma(f)} \left\langle |x_k(f,t) - \gamma(f) y_1(f,t)|^2 \right\rangle_t \tag{61}$$

[Math. 62]

$$\gamma(f) = \left\langle x_i(f,t) \overline{y_1(f,t)} \right\rangle_t \tag{62}$$

$x_i(f,t)$ in this formula is an observation signal (which has not yet been subjected to uncorrelation) which is the target of the rescaling. The way of selection of $x_i(f,t)$ is described later. The thus-determined coefficient $\gamma(f)$ is used for multiplication of the extraction result as in the following Formula (63). The extraction result $y_1(f,t)$ after the rescaling corresponds to a component derived from a target sound in an observation signal of an i-th microphone. That is, it is equal to a signal observed with the i-th microphone in a case where there are no non-target-sound sound sources.

[Math. 63]

$$y_1(f,t) \leftarrow y(f) y_1(f,t) \tag{63}$$

Further, by applying the inverse Fourier transform to the rescaled extraction result as necessary, a waveform of the extraction result is obtained. As described before, the inverse Fourier transform can be omitted depending on the post-processing.

Here, the way of selection of the observation signal $x_i(f,t)$, which is the target of the rescaling, is explained. This depends on a placement mode of microphones. Depending on the microphone placement mode, there is a microphone that intensively collects a target sound. For example, since a microphone is allocated to each speaker in the placement mode in FIG. 5, an utterance by a speaker i is collected most intensively by a microphone i. Accordingly, the observation signal $x_i(f,t)$ of the microphone i can be used as the target of the rescaling.

Also in a case where air conduction microphones such as pin microphones are used as the sensors SE in the placement mode in FIG. 6, a method similar to that in the case of the example in FIG. 5 can be applied. On the other hand, since, in a case where body-worn microphones such as bone conduction microphones are used as the sensors SE or in a case where sensors such as optical sensors other than microphones are used, signals acquired (collected) by those microphones are inappropriate as the target of the rescaling, a method which is similar to that depicted FIG. 7 and which is to be explained is used.

Since there is no microphone allocated to each speaker in the placement mode in FIG. 7, the target of the rescaling needs to be found by another method. Hereinbelow, a case where microphones included in a microphone array are fixed to one apparatus and a case where the microphones are placed in a space (distributed microphones) are explained.

In a case where the microphones are fixed to one apparatus, it is considered that the S/N ratios of the respective microphones (the power ratios between signals of target sounds and signals of other sounds) are almost identical. In view of this, as $x_i(f,t)$, which is the target of the rescaling, an observation signal of a certain microphone may be selected.

Alternatively, rescaling using delay and sum used in a technology described in Japanese Patent Laid-open No. 2014-219467 also can be applied. In a case where the method to cope with overlapping utterances is used in a zone detection process as explained with reference to FIG. 7, in addition to an utterance zone, the utterance direction θ also is estimated simultaneously. With use of a signal observed with the microphone array and the utterance direction θ, a signal in which a sound arriving from this direction is enhanced to some extent can be generated by delay and sum. When it is assumed that a result of delay and sum on the direction θ is written as z(f,t,θ), the rescaling coefficient is calculated in accordance with the following Formula (64).

[Math. 64]

$$\gamma(f)=\left\langle z(f,t,\theta)\overline{\gamma_1(f,t)}\right\rangle_t \tag{64}$$

In a case where the microphone array is distributed microphones, another method is used. Different microphones included in the distributed microphones have different S/N ratios regarding observation signals, and it is predicted that a microphone close to a speaker has a high S/N ratio and a microphone far from the speaker has a low S/N ratio. Accordingly, it is desirable that an observation signal from a microphone close to the speaker be selected as an observation signal to be the target of the rescaling. In view of this, rescaling is performed on an observation signal of each microphone, and one with a rescaling result having the highest power is adopted.

The magnitude of the power of a rescaling result is determined only on the basis of the magnitude of the absolute value of a rescaling coefficient. In view of this, a rescaling coefficient is calculated for each microphone number i in accordance with the following Formula (65), one with the largest absolute value among them is set as $\gamma_{max}$, and rescaling is performed in accordance with the following Formula (66).

[Math. 65]

$$\gamma_i(f)=\left\langle x_i(f,t)\overline{\gamma_1(f,t)}\right\rangle_t \tag{65}$$

[Math. 66]

$$\gamma_1(f,t)\leftarrow\gamma_{max}(f)\gamma_1(f,t) \tag{66}$$

When $\gamma_{max}$ is decided, it is also found which microphone is collecting an utterance by a speaker as the largest sound. Since approximate positions of speakers in a space are found in a case where the position of each microphone is known, it is also possible to make use of the information in post-processing.

For example, in a case where post-processing is a voice conversation, that is, in a case where the technology of the present disclosure is used in a voice conversation system, it is also possible to cause a speaker unit that is estimated as being closest to a speaker to output a voice of a response emitted from the conversation system, change responses of the system depending on the positions of speakers, and so on.

Advantage Attained by Present Embodiment

According to the present embodiment, advantages described below can be attained, for example.

In sound source extraction with reference signals according to the present embodiment, by inputting a multi-channel observation signal of a zone in which a target sound is being produced and a rough amplitude spectrogram of the target sound in the zone, and using the rough amplitude spectrogram as a reference signal, an extraction result which is more precise than the reference signal, that is, closer to a true target sound, than the reference signal, is estimated.

In a process, an objective function reflecting both the similarity between the reference signal and the extraction result and the independence between the extraction result and another imaginary separation result is prepared, and an extraction filter is determined as a solution that optimizes the objective function. With use of the deflation method used in blind sound source separation, a signal to be output can be a signal of only one sound source corresponding to the reference signal.

Owing to such a feature, there are merits like the ones below as compared with conventional technologies.

(1) As Compared with Blind Sound Source Separation

As compared with a method in which blind sound source separation is applied to an observation signal to generate multiple separation results and a separation result corresponding to one sound source that is most similar to a reference signal is selected from the multiple separation results, there are the following merits.

It is not necessary to generate multiple separation results.

In principle, a reference signal is used only for selection, and does not contribute to improvement of the separation precision in the blind sound source separation, but a reference signal contributes also to improvement of the extraction precision in the sound source extraction according to the present disclosure.

(2) As Compared with Conventional Adaptive Beamformer

Extraction can be performed even if there are no observation signals outside a zone. That is, extraction can be performed without separately preparing an observation signal acquired at a timing at which only an interfering sound is being produced.

(3) As compared with reference-signal-based sound source extraction (e.g., technology described in Japanese Patent Laid-open No. 2014-219467, etc.)

Reference signals in technologies described in Japanese Patent Laid-open No. 2014-219467 and the like are time envelopes, and it is assumed that changes of a target sound in the time direction are common among all frequency bins. In contrast to this, a reference signal according to the present embodiment is an amplitude spectrogram. Accordingly, in a case where changes of a target sound in the time direction differ significantly among frequency bins, improvement of the extraction precision can be expected.

Since reference signals in the technologies described in the documents described above are used only as initial values of iterations, there is a possibility that a sound source different from a reference signal is extracted as a result of the iterations. In contrast to this, in the present embodiment, since a reference signal keeps being used during iterations as a part of a sound source model, the possibility that a sound source different from the reference signal is extracted is low.

(4) as Compared with Independent Deeply Learned Matrix Analysis (IDLMA)

Since it is necessary to prepare different reference signals for different sound sources in IDLMA, IDLMA cannot be applied to a case where there is an unknown sound source. In addition, it could be applied only to a case where the number of microphones and the number of sound sources match. In contrast to this, the present embodiment can be applied as long as a reference signal of one sound source which is desired to be extracted can be prepared.

First Modification Example

Although one embodiment of the present disclosure has been explained specifically thus far, the contents of the present disclosure are not limited to the embodiment described above, and various types of modifications based on the technical idea of the present disclosure are possible. Note that, in the explanation regarding modification examples, constituent elements that are identical or homogeneous to those in the explanation described above are given identical reference signs, and overlapping explanations are omitted as appropriate.

(Integration of Uncorrelation and Filter Estimation Process)

Regarding update formulae that are included in the update formulae of extraction filters and use eigen decomposition, uncorrelation and filter estimation can be integrated into one formula by using generalized eigen decomposition. In that case, a process corresponding to uncorrelation can be skipped.

Hereinbelow, taking the TFVV Gaussian distribution of Formula (32) as an example, a procedure of deriving a formula obtained by integrating uncorrelation and filter estimation is explained.

Formula (9) in which k=1 is rewritten into the following Formula (67).

[Math. 67]

$$y_1(f,t)=q_1(f)x(f,t) \tag{67}$$

$q_1(f)$ is a filter to directly generate an extraction result (bypassing an uncorrelated observation signal) from an observation signal that has not yet been subjected to uncorrelation. Transforming Formula (34) representing the optimization problem coping with the TFVV Gaussian distribution, by using Formula (67) and Formula (3) to Formula (6), gives Formula (68), which is the optimization problem regarding $q_1(f)$.

[Math. 68]

$$q_1(f) = \arg\min_{q_1(f)} q_1(f)\left(\sum_t \frac{x(f,t)x(f,t)^H}{r(f,t)^{2\beta}}\right)q_1(f)^H \tag{68}$$

$$\text{subject to } q_1(f)\left(\sum_t x(f,t)x(f,t)^H\right)q_1(f)^H = 1$$

This formula is a constrained minimization problem different from Formula (34), and can be solved by using the method of Lagrange multiplier. When the Lagrange multiplier is defined as X and an objective function is formed by integrating a formula that is desired to be optimized with Formula (68) and a formula representing a constraint into one, such a formula can be written as the following Formula (69).

[Math. 69]

$$H = q_1(f)\left(\sum_t \frac{x(f,t)x(f,t)^H}{r(f,t)^{2\beta}}\right)q_1(f)^H - \lambda\left\{q_1(f)\left(\sum_t x(f,t)x(f,t)^H\right)q_1(f)^H - 1\right\} \tag{69}$$

Partial differentiation of Formula (69) with $\mathrm{conj}(q_1(f))$ and transformation after addition of "=0" gives Formula (70).

[Math. 70]

$$\frac{\partial H}{\partial \overline{q_1(f)}} = 0 \Leftrightarrow \left(\sum_t \frac{x(f,t)x(f,t)^H}{r(f,t)^{2\beta}}\right)q_1(f)^H = \lambda\left(\sum_t x(f,t)x(f,t)^H\right)q_1(f)^H \tag{70}$$

Formula (70) represents the generalized eigenvalue problem, and λ is one of eigenvalues. Further, multiplication of both sides of Formula (70) by $q_1(f)$ from left gives the following Formula (71).

[Math. 71]

$$\lambda = q_1(f)\left(\sum_t \frac{x(f,t)x(f,t)^H}{r(f,t)^{2\beta}}\right)q_1(f)^H \tag{71}$$

The right side of Formula (71) is the very function that is desired to be minimized in Formula (68). Accordingly, the minimum value of Formula (71) is the smallest of eigenvalues satisfying Formula (70), and an extraction filter $q_1(f)$ to be determined is the Hermitian transpose of an eigenvector corresponding to the smallest eigenvalue.

By using two matrices A and B as arguments and solving the generalized eigenvalue problem for the two matrices, a function that returns all the eigenvectors is represented by gev(A,B). By using this function, eigenvectors of Formula (70) can be written as the following Formula (72).

[Math. 72]

$$[v_{min}(f) \ \ldots \ v_{max}(f)] = \left(\sum_t \frac{x(f,t)x(f,t)^H}{r(f,t)^{2\beta}},\ \sum_t x(f,t)x(f,t)^H\right) \tag{72}$$

As in Formula (36), $v_{min}(f)$, . . . , $v_{max}$ (f) in Formula (72) are eigenvectors, and $v_{min}(f)$ is the eigenvector corresponding to the smallest eigenvalue. The extraction filter $q_1(f)$ is the Hermitian transpose of $v_{min}(f)$ as in Formula (73).

[Math. 73]

$$q_1(f) \leftarrow v_{min}(f)^H \tag{73}$$

Similarly, in a case where the TFVV Laplace distribution of Formula (31) is used as a sound source model, Formula (74) and Formula (75) are obtained.

[Math. 74]

$$b(f,t) \leftarrow |q_1(f)x(f,t)| \tag{74}$$

[Math. 75]

$$[v_{min}(f) \ \ldots \ v_{max}(f)] = gev\left(\sum_t \frac{x(f,t)x(f,t)^H}{b(f,t)r(f,t)^\beta}, \ \sum_t x(f,t)x(f,t)^H\right) \tag{75}$$

That is, when the auxiliary variable b(f,t) is calculated in accordance with Formula (74) and eigenvectors corresponding to the two matrices are next determined in accordance with Formula (75), the extraction filter $q_1(f)$ is the Hermitian transpose of an eigenvector $v_{min}(f)$ corresponding to the smallest eigenvalue (Formula (73)). Since $q_1(f)$ does not converge with a single operation, the process of performing the calculation according to Formula (74) and Formula (75) and the calculation according to Formula (73) is executed until $q_1(f)$ converges or is executed a predetermined number of times.

Since the case where the TFVV Student-t distribution of Formula (33) is used as a sound source model and the case where the bivariate Laplace distribution of Formula (25) is used as a sound source model have parts of derived expressions in common, they are explained together. Formulae for calculation of the auxiliary variable b(f,t) are different between them. The following Formula (76) is used for the TFVV Student-t distribution, and the following Formula (77) is used for the bivariate Laplace distribution.

[Math. 76]

$$b(f,t) \leftarrow \frac{\nu}{\nu+2} r(f,t)^2 + \frac{2}{\nu+2}|q_1(f)x(f,t)|^2 \tag{76}$$

[Math. 77]

$$b(f,t) \leftarrow \sqrt{c_1 r(f,t)^2 + c_2|q_1(f)x(f,t)|^2} \tag{77}$$

On the other hand, in both of them, formulae to determine an extraction filter $q_1(f,t)$ use the following Formula (78) and Formula (73). Since the extraction filter $q_1(f,t)$ does not converge with a single operation, iterations are performed a predetermined number of times, similarly to other models.

[Math. 78]

$$[v_{min}(f) \ \ldots \ v_{max}(f)] = gev\left(\sum_t \frac{x(f,t)x(f,t)^H}{b(f,t)}, \ \sum_t x(f,t)x(f,t)^H\right) \tag{78}$$

Second Modification Example

A sound source extraction scheme called an SIBF in which amplitude spectrograms are used as reference signals (references) has been explained thus far.

Hereinbelow, a modification example of such a sound source extraction scheme (SIBF) is explained further. That is, hereinbelow, a second modification example to a sixth modification example are explained as modification examples of the SIBF.

A general overview is explained. In the second modification example and the third modification example, schemes in which the SIBF described above is modified into multitap forms (hereinafter, also called multitap SIBFs) are explained.

Whereas only one frame of an observation signal is used for generating an extraction result for one frame in the SIBF described above, in the multitap SIBFs explained in the second modification example and the third modification example, an extraction result for one frame is generated with use of observation signals of multiple frames. Hence, improvement of the extraction precision in an environment where a reverberation straddles multiple frames can be expected.

In particular, in order to easily modify the SIBF described above into the multitap forms in the second modification example and the third modification example, an operation called shift & stack also is described.

The multitap SIBFs are methods in which a spectrogram equivalent to N×L channels is generated by performing an operation (shift & stack) of stacking up observation signal spectrograms of N channels (L−1) times while shifting them, and the spectrograms are input to the SIBFs described above.

In the fourth modification example and the fifth modification example, SIBFs in which extraction results are re-input are explained.

In the fourth modification example and the fifth modification example, extraction results of the SIBFs are re-input to a DNN or the like, a more precise reference signal is generated, and the SIBFs are applied with use of the reference signal to thereby generate a more precise extraction result. Further, by combining amplitude attributable to a reference signal after the re-inputting and a phase attributable to the previous SIBF extraction result, an extraction result having merits of both non-linear processing and linear filtering is also generated.

In the sixth modification example, automatic adjustment of parameters included in a sound source model is explained.

That is, in the sixth modification example, as an objective function to be optimized, an object function including both an extraction result and a sound source model parameter is prepared. Then, optimization regarding the sound source model parameter and optimization regarding the extraction result are performed alternately to thereby estimate the sound source model parameter optimum for an observation signal.

Now, the second modification example to the sixth modification example are explained hereinbelow in more detail.

First, the second modification example is explained. As described above, in the second modification example, a multitap SIBF obtained by modifying the SIBF into a multitap form is explained.

In all of the examples having been disclosed up to this point, an extraction result for one frame is generated from an observation signal of one frame. This is represented by Formula (9) and Formula (67) described above.

In order to make a distinction, hereinafter, filtering to generate an extraction result for one frame from an observation signal of one frame is called single tap filtering, and an SIBF to estimate a filter for single tap filtering is called a single tap SIBF.

Although this is not limited to SIBFs, there are the following known problems in a case where single tap filtering is used in an environment where a reverberation straddles multiple frames.

Problem 1: In a case where an interfering sound includes a long reverberation, an incomplete extraction result is generated. That is, the ratio of an interfering sound (what is generally called an "elimination residue") included in an extraction result becomes high as compared with a case where a reverberation is short.

Problem 2: In a case where a target sound includes a long reverberation, the reverberation remains also in an extraction result. Accordingly, even if sound source extraction itself is performed perfectly and an interfering sound is not included at all, a problem attributable to the reverberation can occur. For example, in a case where post-processing is voice recognition, deterioration of the recognition precision attributable to the reverberation can occur.

In existing sound source extraction techniques or sound source separation techniques, in order to cope with the problems described above, a filter to generate an extraction result or a separation result for one frame from observation signals of multiple frames is estimated.

Hereinbelow, such a filter to generate an extraction result or a separation result for one frame from observation signals of multiple frames is called a multitap filter, and application of the multitap filter is called multitap filtering.

Hereinbelow, first, differences between single tap filtering and multitap filtering are explained with use of FIG. 12 and the like, and next, methods of modifying the SIBF according to the present disclosure into multitap forms are explained with use of FIG. 13, FIG. 14, and the like. Last, advantages of the multitap SIBFs are depicted in FIG. 15.

Figure 12:
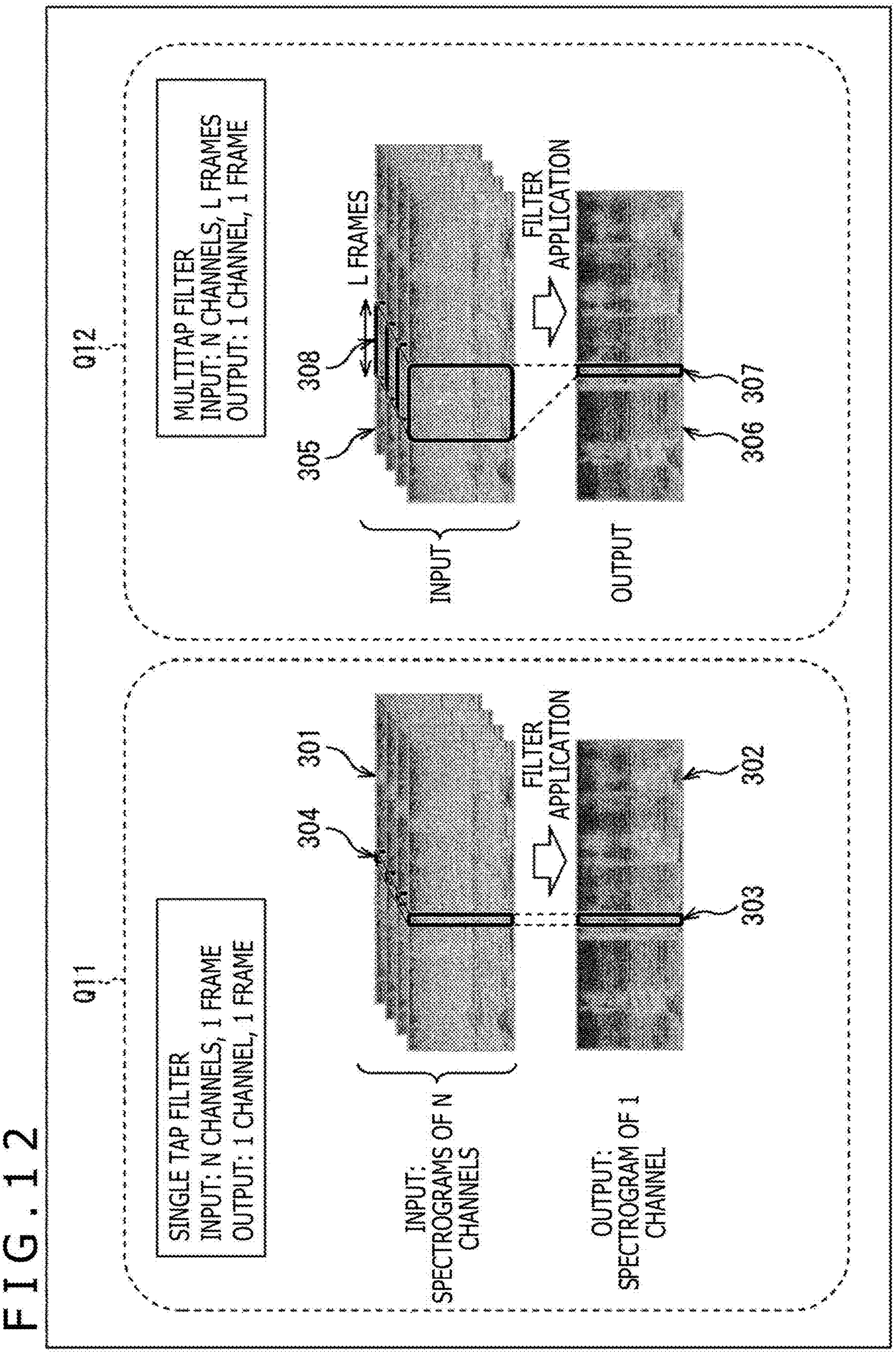
FIG. 12 is a figure for explaining a multitap SIBF.

The left half of FIG. 12, that is, the portion represented by a frame Q11, represents single tap filtering. Note that, in each spectrogram in FIG. 12, the vertical axis represents frequency, and the horizontal axis represents time.

In this example, an input is observation signal spectrograms 301 of N channels, and an output, that is, a filtering result, is a spectrogram 302 of one channel.

An output 303 for one frame by single tap filtering is generated from an observation signal 304 of the same time and of one frame. This single tap filtering corresponds to Formula (9) and Formula (67) described above.

On the other hand, the right half of FIG. 12, that is, the portion represented by a frame Q12, represents multitap filtering.

In this example, an input is an observation signal spectrogram 305 of N channels, and an output, that is, a filtering result, is a spectrogram 306 of one channel. That is, the shapes of an input and an output in multitap filtering are the same as those in the case of single tap filtering.

However, in multitap filtering, an output 307 for one frame in the spectrogram 306 is generated from observation signals 308 of L frames (multiple frames) in the observation signal spectrogram 305 of N channels.

Such multitap filtering corresponds to the following Formula (79).

[Math. 79]

$$y_1(f,t) = [q_1(f,t) \ \dots \ q_1(f,L)]\begin{bmatrix} x(f,t-0) \\ \vdots \\ x(f,t-(L-1)) \end{bmatrix} = q_1''(f)x''(f,t) \tag{79}$$

Hereinbelow, the number of frames L of the observation signals 308 which serves as an input for obtaining the output 307 for one frame by multitap filtering is also called the number of taps.

A long reverberation straddles multiple frames of an observation signal, but in a case where the number of taps L is longer than the reverberation length, the influence of the long reverberation can be cancelled. Alternatively, as compared with the case of single tapping, the influence of a reverberation like those described regarding the problems of single tap filtering can be reduced even if the number of taps L is shorter than the reverberation length.

Note that, when a frame number of the current time is defined as t in Formula (79), an extraction result of the current time is generated from an observation signal of the current time and observation signals of the past (L−1) frames. In other words, Formula (79) represents that observation signals of the future are not used for the extraction result generation of the current time.

Such a filter to generate an extraction result without using signals of the future is called a causal filter. In this second modification example, an SIBF using a causal filter is explained, and an acausal SIBF is explained in the next third modification example.

Hereinbelow, a multitap SIBF which is a method obtained by expanding the single tap SIBF to cope with (causal) multitapping is explained. As in the case of the single tap SIBF, a scheme for which uncorrelation is essential is explained first, and then a scheme for which uncorrelation is not necessary is explained.

In the multitap SIBF also, a procedure of processes (overall procedure) performed at the sound source extracting apparatus 100 is the same as that in the case of the single tap SIBF. That is, in the multitap SIBF also, the sound source extracting apparatus 100 performs the processes explained with reference to FIG. 9.

Figure 9:
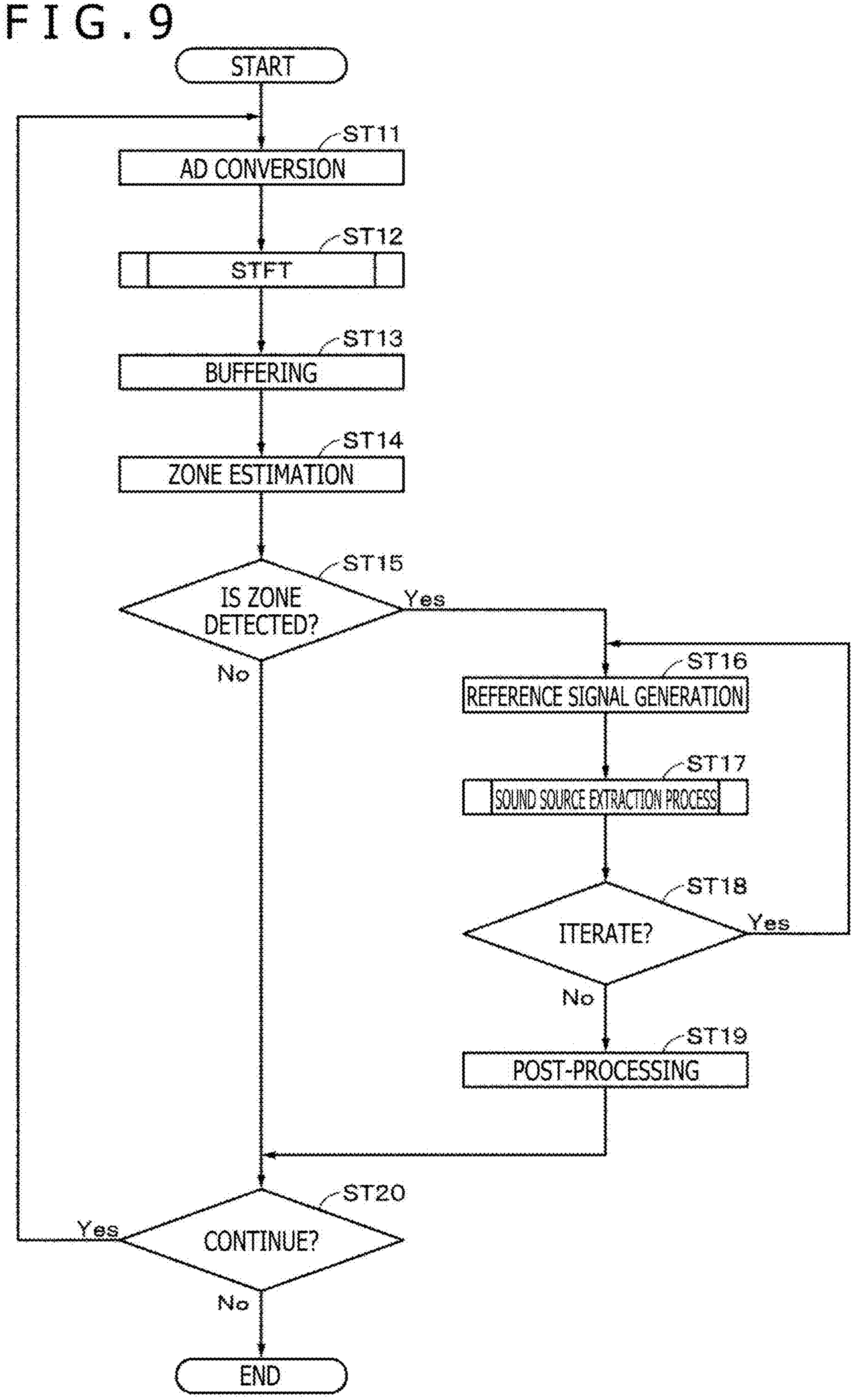
FIG. 9 is a flowchart to be referred to in the explanation of an overall procedure of processes performed at the sound source extracting apparatus according to the embodiment.

In addition, in the multitap SIBF, a sound source extraction process corresponding to Step ST17 in FIG. 9 is also basically identical to that in the case of the single tap SIBF.

Figure 11:
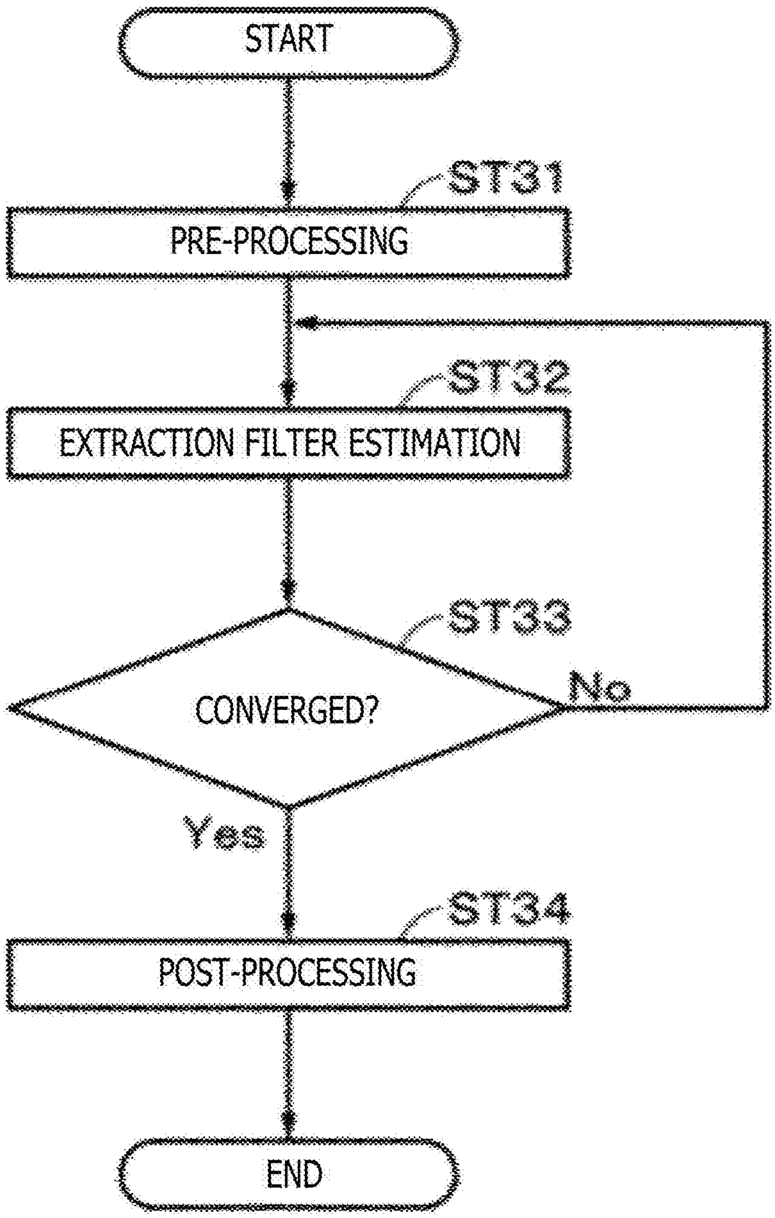
FIG. 11 is a flowchart to be referred to in the explanation of a procedure of a sound source extraction process according to the embodiment.

That is, a process explained with reference to FIG. 11 is performed in the multitap SIBF as the sound source extraction process corresponding to Step ST17, but details of each step are different from those in the case of the single tap SIBF, and the differences are explained hereinbelow.

Figure 13:
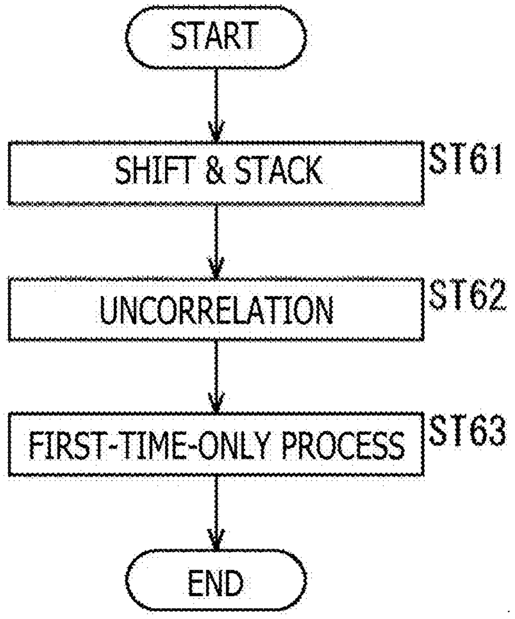
FIG. 13 is a flowchart for explaining pre-processing.

First, with reference to a flowchart in FIG. 13, pre-processing performed as the process in Step ST31 in FIG. 11 in the case of the multitap SIBF is explained.

When the pre-processing has been started, in Step ST61, the pre-processing section 17A performs shift & stack on observation signals (observation signal spectrograms) which are supplied from the observation signal buffer 14 and correspond to a time range of multiple frames including a target-sound zone.

The largest difference of the pre-processing in the multitap SIBF from the pre-processing in the single tap SIBF is that the process in Step ST61, that is, a process called shift & stack, is added at the beginning.

Shift & stack is a process of stacking up observation signal spectrograms in the channel direction while shifting them in a predetermined direction. By performing such shift & stack, data (signals) almost the same as that in the case of the single tap SIBF can be treated in the following processes even in the multitap SIBF.

Here, shift & stack is explained with reference to FIG. 14.

An observation signal spectrogram 331 is an original multi-channel observation signal spectrogram, and this observation signal spectrogram 331 is the same as the observation signal spectrogram 301 and the observation signal spectrogram 305 depicted in FIG. 12.

In addition, an observation signal spectrogram 332 is a spectrogram obtained by shifting the observation signal spectrogram 331 in the right direction in the figure, that is, in a time-increasing direction (future direction) in the time direction by an amount corresponding to one frame (once).

Similarly, an observation signal spectrogram 333 is a spectrogram obtained by shifting the observation signal spectrogram 331 in the right direction in the figure (time-increasing direction) by an amount corresponding to (L−1) frames ((L−1) times).

In such a manner, one spectrogram is obtained by stacking up observation signal spectrograms in the channel direction (in the depthwise direction in FIG. 14) while changing the number of times of shifting from zero to L−1. Hereinbelow, such a spectrogram is also called a shifted & stacked observation signal spectrogram.

Figure 14:
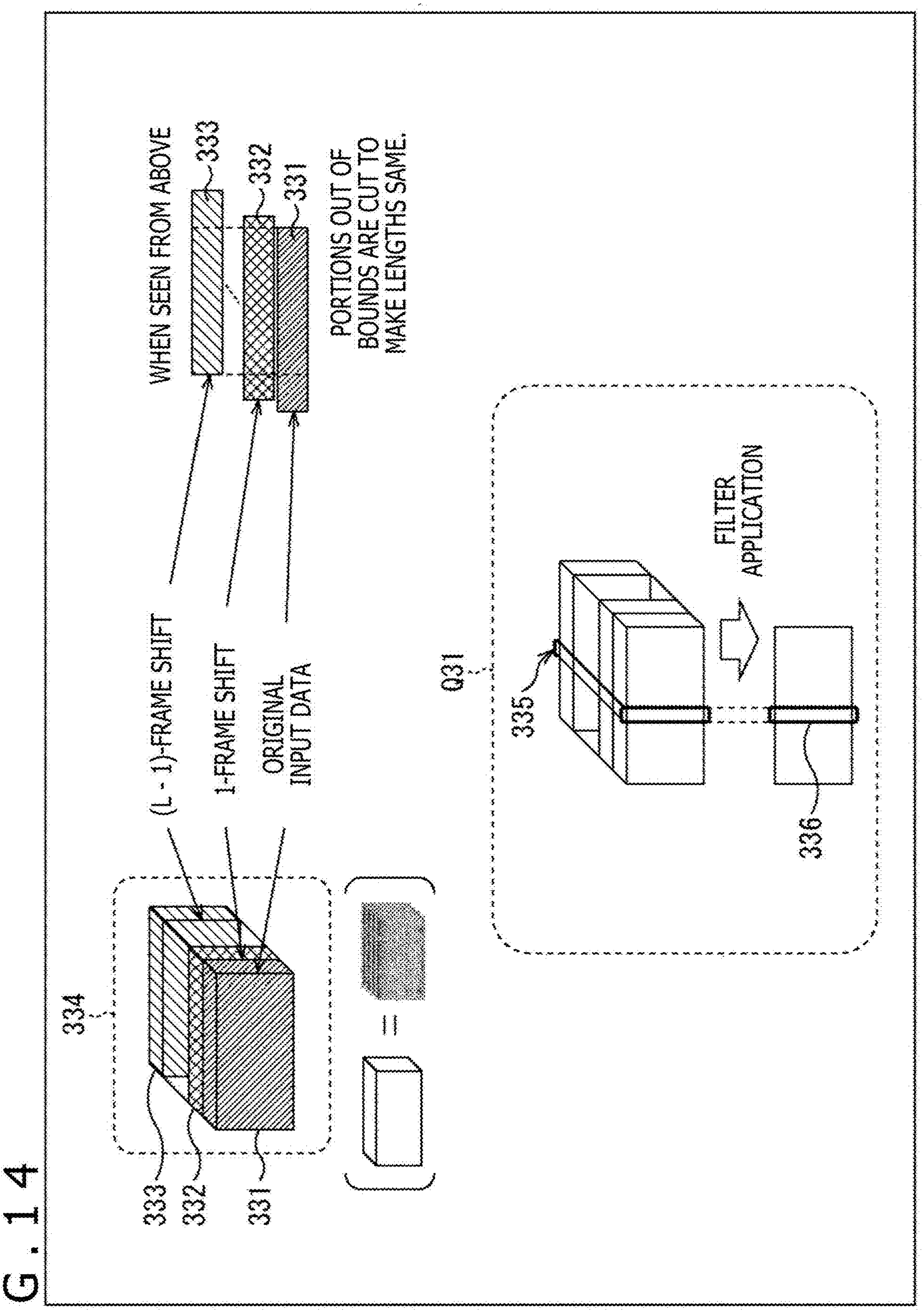
FIG. 14 is a figure for explaining shift & stack.
Figure 15:
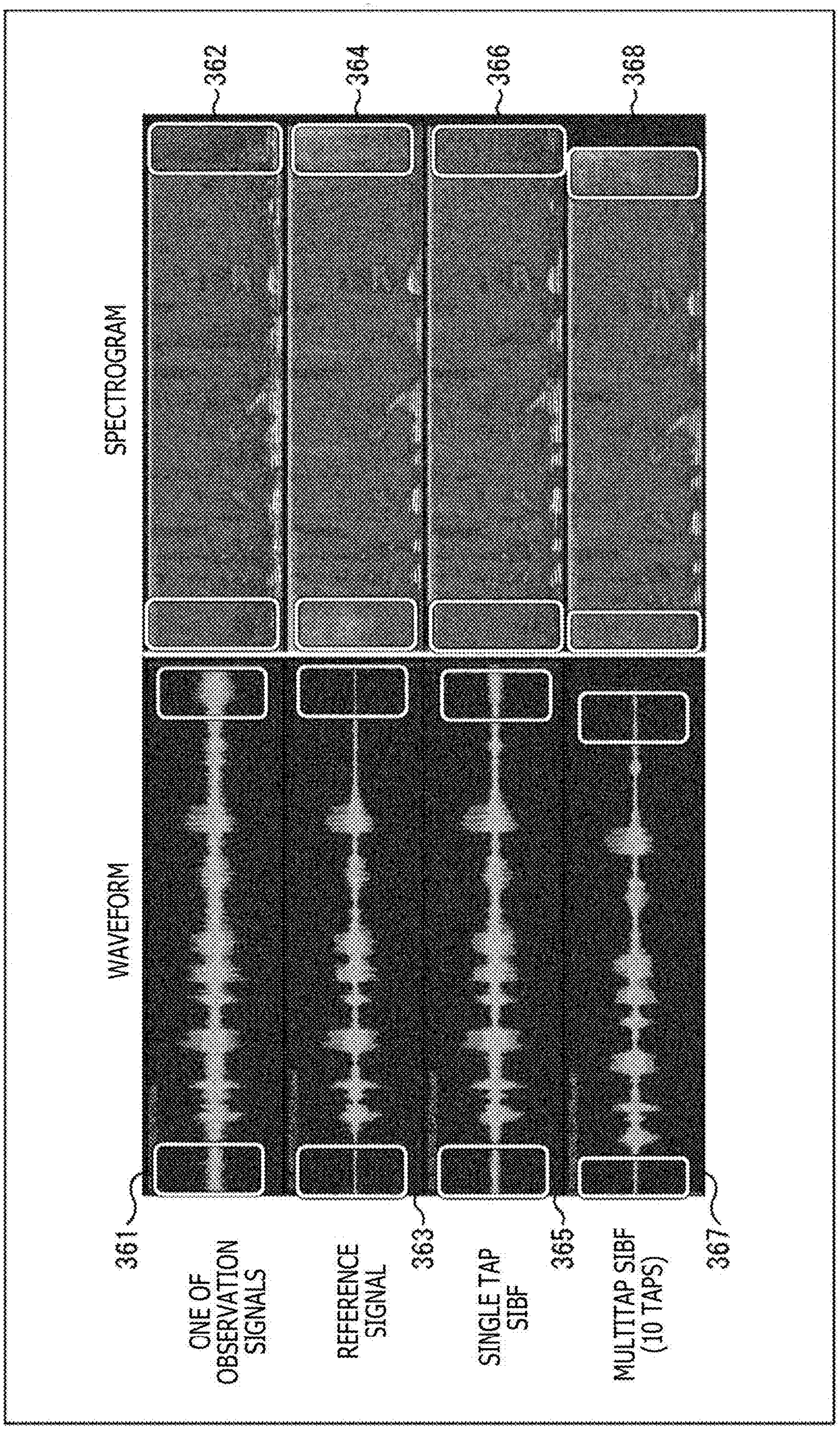
FIG. 15 is a figure for explaining advantages of a modification into a multitap form.

In the example in FIG. 14, the observation signal spectrogram 332 obtained by shifting once (by an amount corresponding to one frame) is stacked on the observation signal spectrogram 331 that has been shifted zero times, that is, that has not been shifted.

Further, on the thus-obtained observation signal spectrogram, observation signal spectrograms obtained by shifting the observation signal spectrogram 331 are stacked sequentially. That is, a process of shifting and stacking the observation signal spectrogram 331 is performed (L−1) times.

As a result, a shifted & stacked observation signal spectrogram 334 including the L observation signal spectrograms is generated. For example, when the observation signal spectrogram 331 is a spectrogram of N channels, the shifted & stacked observation signal spectrogram 334 corresponding to N×L channels is generated.

Note that, in the generation of the shifted & stacked observation signal spectrogram 334, in order to make the numbers of frames the same, portions of the stacked observation signal spectrograms that are located out of bounds due to the shift operation are cut as depicted on the upper right in the figure.

Specifically, regarding an observation signal spectrogram that has been shifted τ times, a portion on the left end that corresponds to (L−1−τ) frames and a portion on the right end that corresponds to τ frames are cut (removed).

By shift & stack described above, from observation signal spectrograms of N channels and T frames, a shifted & stacked observation signal spectrogram of N×L channels and (T−(L−1)) frames is generated.

Note that, hereinafter, both observation signal spectrograms before shift & stack and observation signal spectrograms after shift & stack (shifted & stacked observation signal spectrograms) are also called observation signal spectrograms.

The portion of a frame Q31 in FIG. 14 represents filtering of the shifted & stacked observation signal spectrogram.

Although an observation signal (shifted & stacked observation signal) 335 here represents a signal of one frame in the shifted & stacked observation signal spectrogram, the observation signal 335 is equivalent to the observation signals 308 of L frames depicted in FIG. 12.

Accordingly, a process of generating an extraction result 336 of one frame by applying a single tap extraction filter to the observation signal 335 is single tap filtering in form, but is substantially multitap filtering equivalent to the process depicted in the portion of the frame Q12 in FIG. 12.

This has the same meaning as the fact that, when the second formula from right (formula of multitap filtering) in Formula (79) is rewritten into the right side, Formula (79) can be represented by a formula of single tap filtering in form.

Further, it is represented also that the shifted & stacked observation signal x"(f,t) of the right side in Formula (79) can be generated by taking out one frame from the shifted & stacked observation signal spectrogram (i.e., corresponds to the observation signal 335).

Note that the operation called shift & stack that has been explained is equivalent to generation of an "observation signal spectrogram shift set" in patent literature by the same inventor (Japanese Patent Application No. 2007-328516 (Japanese Patent Laid-open No. 2008-233866)).

Note that, since the patent literature described above relates to sound source separation and the number of output channels is the same as the number of input channels, if the apparent number of channels of observation signals increases to N×L due to shift & stack, the number of output channels also increases. On the other hand, since the present disclosure relates to sound source extraction and the number of output channels is constantly one, the number of output channels remains one even if shift & stack is performed.

Returning to the explanation regarding the flowchart in FIG. 13, after shift & stack is performed in Step ST61, a process in Step ST62 is subsequently performed.

That is, in Step ST62, the pre-processing section 17A performs uncorrelation on the shifted & stacked observation signal obtained in Step ST61.

In Step ST62, unlike in the case of the single tap SIBF, uncorrelation is performed on the shifted & stacked observation signal.

An uncorrelated observation signal obtained by uncorrelation on the shifted & stacked observation signal is written as u"(f,t).

In this case, as represented by the following Formula (80), the pre-processing section 17A multiplies the shifted & stacked observation signal x"(f,t) by an uncorrelation matrix P"(f) corresponding to the shifted & stacked observation signal to thereby generate an uncorrelated observation signal u"(f,t).

[Math. 80]

$$u''(f,t)=P''(f)x''(f,t) \tag{80}$$

The uncorrelated observation signal u"(f,t) satisfies the following Formula (81).

[Math. 81]

$$\langle u''(f,t)u''(f,t)^H\rangle_t=I \tag{81}$$

In addition, the uncorrelation matrix P"(f) is calculated in accordance with the following Formula (82) to Formula (84).

[Math. 82]

$$R''_{xx}(f)=\langle x''(f,t)x''(f,t)^H\rangle_t \tag{82}$$

[Math. 83]

$$R''_{xx}(f)=V''(f)D''(f)V''(f)^H \tag{83}$$

[Math. 84]

$$P''(f)=D''(f)^{-\frac{1}{2}}V''(f)^H \tag{84}$$

These Formula (82) to Formula (84) are obtained by replacing the observation signal x(f,t) with the shifted & stacked observation signal x"(f,t) in Formula (4) to Formula (6) described above.

If the uncorrelated observation signal u"(f,t) or the uncorrelation matrix P"(f) is used, sound source extraction corresponding to multitapping becomes the following Formula (85). Note that, in Formula (85), $w_1$"(f) is an extraction filter corresponding to multitapping, and a formula to determine the extraction filter is described later.

[Math. 85]

$$y_1(f,t)=w''_1(f)u''(f,t)=w''_1(f)P''(f)x''(f,t) \quad (85)$$

In Step ST63, the pre-processing section 17A performs a first-time-only process.

As in the case of the single tap SIBF, the first-time-only process is a process to be performed only once before an iteration process, that is, before Step ST32 and Step ST33 in FIG. 11.

As explained with reference to the flowchart in FIG. 11, there are some sound source models in which special processes are performed only at the initial execution of iteration, such processes also are performed in Step ST63.

After the first-time-only process is performed in Step ST63, the pre-processing section 17A supplies the obtained uncorrelated observation signal u"(f,t) or the like to the extraction filter estimating section 17B, and the pre-processing ends.

The end of the pre-processing means the end of Step ST31 in the sound source extraction process depicted in FIG. 11. Accordingly, the process thereafter proceeds to Step ST32, and an extraction filter estimation process is performed.

Whereas the extraction filter $w_1(f)$ of Formula (9) is estimated as an extraction filter in the single tap SIBF described above, in the multitap SIBF, the extraction filter estimating section 17B estimates the extraction filter $w_1''(f)$ depicted in Formula (85).

For this purpose, it is sufficient if $w_1(f)$, x(f,t), u(f,t), P(f), and the like in the formula calculated in the single tap SIBF are replaced with $w_1''(f)$, x"(f,t), u"(f,t), P"(f), and the like, respectively.

For example, the following Formula (86) and Formula (87) in the multitap SIBF are obtained from Formula (35) and Formula (36) described above in the single tap SIBF.

[Math. 86]

$$[a''_{min}(f) \ldots a''_{max}(f)] = eig\left(\sum_t \frac{u''(f,t)u''(f,t)^H}{r(f,t)^{2\beta}}\right) \quad (86)$$

[Math. 87]

$$w''_1(f) \leftarrow a''_{min}(f)^H \quad (87)$$

The extraction filter estimating section 17B estimates the extraction filter $w_1''(f)$ by performing calculations according to Formula (86) and Formula (87) on the basis of the element r(f,t) of the reference signal R supplied from the reference signal generating section 16 and the uncorrelated observation signal u"(f,t) supplied from the pre-processing section 17A.

After the process in Step ST32 is performed, the processes in Step ST33 and Step ST34 are performed, and the sound source extraction process in FIG. 11 ends. At this time, the extraction filter estimating section 17B supplies the extraction filter $w_1''(f)$, the uncorrelated observation signal u"(f,t), and the like to the post-processing section 17C as appropriate.

In the processes in Step ST33 and Step ST34 in the multitap SIBF, processes similar to those in the case of the single tap SIBF are performed.

For example, in Step ST34, the post-processing section 17C performs sound source extraction by performing a calculation according to Formula (85) on the basis of the uncorrelated observation signal u"(f,t) and the extraction filter $w_1''(f)$ supplied from the extraction filter estimating section 17B, and obtains the extraction result $y_1(f,t)$, that is, the extracted signal (extraction signal). Then, as in the case of the single tap SIBF, the post-processing section 17C performs processes such as a rescaling process or the inverse Fourier transform on the basis of the extraction result $y_1(f,t)$.

In the manner described above, the sound source extracting apparatus 100 realizes the multitap SIBF by performing shift & stack on observation signals. In such a multitap SIBF also, the target sound extraction precision can be improved as in the case of the single tap SIBF.

Note that, as in the case of the first modification example, uncorrelation and the filter estimation process can be integrated also in the multitap SIBF. That is, it is also possible to directly determine $q_1''(f)$ in Formula (79). For this purpose, for example, it is sufficient if the following Formula (88) and Formula (89) are used instead of Formula (72) and Formula (73) of the single tap SIBF.

[Math. 88]

$$[v''_{min}(f) \ldots v''_{max}(f)] = gev\left(\sum_t \frac{x''(f,t)x''(f,t)^H}{r(f,t)^{2\beta}}, \sum_t x''(f,t)x''(f,t)^H\right) \quad (88)$$

[Math. 89]

$$q''_1(f) \leftarrow v''_{min}(f)^H \quad (89)$$

Next, advantages of a modification into a multitap form are explained with reference to FIG. 15.

Note that, for details of experiments performed here, refer to the following paper by the present inventor himself. Note that multitap SIBFs are not described in the paper described below.

"Similarity-and-Independence-Aware Beamformer: Method for Target Source Extraction using Magnitude Spectrogram as Reference Atsuo Hiroe https://arxiv.org/abs/2006.00772"

In FIG. 15, an observation signal 361 is a signal of one channel in an observation signal, a spectrogram 362 of the observation signal 361 is depicted to the right, in the figure, of the observation signal 361.

These pieces of data (the observation signal 361 and the spectrogram 362) are called CHiME3 dataset (http://spandh.dcs.shef.ac.uk/chime_challenge/chime2015/), and are recorded with six microphones placed around a tablet terminal.

In the example in FIG. 15, a target sound is a voice utterance, and an interfering sound is a background noise at a cafeteria. In addition, a portion surrounded by a square frame in each observation signal or spectrogram represents a timing when there is only the background noise, and by comparing these portions, it can be known how much the interfering sound has been removed.

An amplitude spectrogram 364 is a reference signal (amplitude spectrogram) generated by a DNN. In addition, a reference signal 363 is a waveform (time-domain signal) corresponding to the amplitude spectrogram 364, the amplitude is attributable to the amplitude spectrogram 364, and the phase is attributable to the spectrogram 362.

At a glance, the interfering sound seems to have been removed sufficiently in the reference signal 363 and the amplitude spectrogram 364 seemingly, but actually, the target sound (voice) is distorted as a side effect of interfering sound removal, and it is difficult to say that they are ideal extraction results.

A signal 365 and a spectrogram 366 are extraction results of the single tap SIBF generated with use of the amplitude spectrogram 364 as a reference signal.

It can be known that the interfering sound has been removed in these signal 365 and spectrogram 366 as compared to the observation signal 361. In addition, a merit of linear filtering is that the target sound is less distorted. However, there are elimination residues of the interfering sound in the signal 365 and the spectrogram 366, and it is considered that this corresponds to Problem 1 described before.

A signal 367 and a spectrogram 368 are extraction results of the multitap SIBF in a case where the number of taps L=10, and as in the case of the single tap SIBF, the amplitude spectrogram 364 is used as a reference signal.

The signal 367 and the spectrogram 368 obviously have small elimination residues of the interfering sound as compared with the case of the single tap SIBF, and advantages of a modification into a multitap form can be confirmed.

Third Modification Example

The extraction filter determined in the second modification example is a causal filter, that is, one that generates an extraction result of the current frame from an observation signal of the current frame, and observation signals of the past (L−1) frames.

In contrast, an acausal filter, that is, one that uses the current, past, and future observation signals, also is possible as follows.

Observation signals of the future D frames.

Observation signal of one current frame

Observation signals of the past (L−1−D) frames

Note that D is an integer that satisfies 0≤D≤L−1. There is a possibility that sound source extraction that is more precise than a causal filter can be realized by selecting the value of D appropriately. Hereinbelow, a method to realize acausal filtering in a multitap SIBF and a method to determine the optimum value of D are explained.

Acausal filtering can be written as in the following Formula (90) or Formula (91).

[Math. 90]

$$y_1(f,t) = [q_1(f,1) \ \dots \ q_1(f,L)] \begin{bmatrix} x(f,t+D) \\ \vdots \\ x(f,t+D-(L-1)) \end{bmatrix} \tag{90}$$

[Math. 91]

$$y_1(f,t-D) = [q_1(f,1) \ \dots \ q_1(f,L)] \begin{bmatrix} x(f,t) \\ \vdots \\ x(f,t-(L-1)) \end{bmatrix} \tag{91}$$

A method to realize such filtering by the multitap SIBF is easy, and it is sufficient if a reference signal is delayed by D frames. Specifically, for example, it is sufficient if the following Formula (92) is used, instead of Formula (86).

[Math. 92]

$$[a''_{min}(f) \ \dots \ a''_{max}(f)] = eig\left(\sum_t \frac{u''(f,t)u''(f,t)^H}{r(f,t-D)^{2\beta}}\right) \tag{92}$$

Note that, even in a case where another sound source model is used, an acausal multitap SIBF can be realized by replacing r(f,t) in the formula with r(f,t−D).

In addition, the method to generate a reference signal delayed by D frames may be any of the following.

Method 1: A reference signal without delay is generated once, and next, the reference signal is shifted in the right direction (time-increasing direction) D times.

Method 2: An observation signal spectrogram that is generated at a time of shift & stack and is shifted D times in the right direction (time-increasing direction) is input to the reference signal generating section 16.

Since an extraction result is delayed by D frames relative to an observation signal in the acausal multitap SIBF, a change is made also to rescaling performed as post-processing in Step ST34 in FIG. 11.

Specifically, it is sufficient if the following Formula (93) is used as a formula for determining the coefficient γ(f) in rescaling, instead of Formula (62) described above.

[Math. 93]

$$\gamma(y) = \left\langle x_i(f,t-D)\overline{y_1(f,t))} \right\rangle_t \tag{93}$$

In an actual process, it is sufficient if an observation signal spectrogram that is generated at a time of shift & stack and is shifted D times is used as $x_i(f,t-D)$.

Next, a method to determine an optimum number of frames D is explained.

SIBFs are formulated as the minimization problems of predetermined objective functions. This similarly applies also to the acausal multitap SIBF, but its objective function includes D.

For example, an objective function L(D) in a case where the TFVV Gaussian distribution is used as a sound source model is represented by the following Formula (94).

[Math. 94]

$$L(D) = -\frac{1}{T}\sum_f \sum_t \frac{|y_1(f,t)|^2}{r(f,t-D)^{2\beta}} \tag{94}$$

Note that the extraction result $y_1(f,t)$ in Formula (94) is a value to which rescaling has not yet been applied. That is, the extraction result $y_1(f,t)$ in Formula (94) is the extraction result $y_1(f,t)$ calculated by determining the extraction filter $w_1''(f)$ in accordance with Formula (86) and Formula (87) and applying the extraction filter $w_1''(f)$ to Formula (85).

The optimum value of D is one that minimizes the objective function L(D) when the value of the objective function L(D) of Formula (94) is calculated, on the basis of the extraction result $y_1(f,t)$ and the reference signal r(f,t-D), with each of an integer D that satisfies 0≤D≤L−1.

Fourth Modification Example

Next, examples of re-inputting an extraction result of an SIBF to a DNN or the like are explained. Re-inputting of an extraction result explained in the fourth modification example and the fifth modification example described below can be implemented in combination with the embodiment explained above or each modification example such as the first modification example to the third modification example or the sixth modification example.

Re-inputting means inputting an extraction result generated by an SIBF to the reference signal generating section 16.

In other words, this is equivalent to a procedure in which, in the flowchart in FIG. 9, it is assessed (determined) in Step ST18 that an iteration is to be performed and the process returns to Step ST16 (reference signal generation).

In this case, in Step ST16 in the second and subsequent iterations, the reference signal generating section 16 generates the reference signal r(f,t) on the basis of the extraction result $y_1(f,t)$ obtained in Step ST34 performed in the last (immediately preceding) iteration.

Specifically, for example, in each example explained with reference to FIG. 5 to FIG. 7, the reference signal generating section 16 inputs the extraction result $y_1(f,t)$, instead of an observation signal or the like, to a neural network (DNN) for extraction of a target sound to thereby generate a new reference signal r(f,t).

At this time, the reference signal generating section 16 treats an output of the neural network itself as the reference signal r(f,t), generates the reference signal r(f,t) by applying a time-frequency mask obtained as an output of the neural network to the extraction result $y_1(f,t)$ or the like, and so on.

In Step ST32 in the second and subsequent iterations, the extraction filter estimating section 17B determines an extraction filter on the basis of the reference signal r(f,t) newly generated at the reference signal generating section 16.

Hereinbelow, not only the case where the process in Step ST16 is executed twice, but also the case where the process is executed three times or more also is called re-inputting.

Since an observation signal is unchanged at a time of re-inputting, some processes on the observation signal can be skipped (omitted). Hereinbelow, the skipping of some processes is explained, and a special process at a time of re-inputting also is described.

In the single tap SIBF, uncorrelation can be omitted at a time of re-inputting. That is, it is sufficient if the uncorrelated observation signal u(f,t) and the uncorrelation matrix P(f) are calculated only when the process (sound source extraction process) in Step ST17 in FIG. 9 is executed for the first time and, at times of re-inputting, that is, in the process in Step ST17 in the second and subsequent iterations, the uncorrelated observation signal u(f,t) and the uncorrelation matrix P(f) obtained at the initial process are reused.

Similarly, in a multitap SIBF, both processes of shift & stack and uncorrelation can be omitted at times of re-inputting.

That is, regarding both the shifted & stacked observation signal x''(f,t) and the uncorrelated observation signal u''(f,t) and uncorrelation matrix P'' (f) generated in uncorrelation on the shifted & stacked observation signal x''(f,t), it is sufficient if, at times of re-inputting, values thereof calculated in the initial execution are reused.

Further, in the acausal multitap SIBF, the reference signal generation method at times of re-inputting is different from that at the initial execution (the method depicted in the third modification example), and a shift operation is unnecessary.

This is because an extraction result of the acausal multitap SIBF is delayed by D frames relative to an observation signal and a reference signal generated from the extraction result also is delayed by D frames. Accordingly, a shift operation for causing a delay is unnecessary.

In other words, even in the acausal multitap SIBF, at times of re-inputting, a sound source extraction process needs to be performed in accordance with a formula not including the delay D.

For example, even if the extraction filter $w_1''(f)$ is estimated in accordance with Formula (92) when the sound source extraction process in Step ST17 in FIG. 9 is executed for the first time, Formula (86) is used when it is assessed in Step ST18 that an iteration is to be performed and the sound source extraction process in Step ST17 is executed again.

This is because the delay D is already reflected in the reference signal r(f,t) determined as a result of re-inputting. If Formula (92) is used at a time of re-inputting also, in other words, if a reference signal is shifted at a time of re-inputting also, the delay of an extraction result relative to an observation signal undesirably increases to 2D.

On the other hand, one should be careful that, regarding rescaling, it is necessary to use Formula (93) also at times of both the initial execution and re-inputting. This is because, at times of both the initial execution and re-inputting, the delay between an observation signal and an extraction result is constantly D.

Note that, in a case where re-inputting is combined with the method of determining an optimum number of frames D of a delay explained in the third modification example, it is sufficient if the following process is performed.

That is, the sound source extracting section 17 determines the optimum number of frames (integer) D of a delay by Formula (94) or the like at a time of the initial execution of the sound source extraction process in Step ST17. Then, an extraction result corresponding to D (rescaled extraction result) is input to the reference signal generating section 16, and a reference signal reflecting the optimum delay D is generated. It is sufficient if the thus-generated reference signal is used in the second execution of Step ST17 (sound source extraction process).

Since a more precise reference signal can be obtained by performing re-inputting of extraction results as described above, a more precise extraction result $y_1(f,t)$ can be obtained with use of the reference signal. That is, the precision of target sound extraction can be improved.

Fifth Modification Example

Meanwhile, it is assumed in the explanation with reference to FIG. 9 that the reference signal generation in Step ST16 and the sound source extraction process in Step ST17 are executed as a set. However, the scope of the present disclosure also covers cases where only the reference signal generation in Step ST16 is executed at times of re-inputting. Hereinbelow, this is explained.

In a state to be considered here, the reference signal generation in Step ST16 and the sound source extraction process in Step ST17 are iteratively executed n times, further, it is assessed (determined) in Step ST18 that an iteration is to be performed, and the (n+1)-th reference signal generation (the process in Step ST16) has been completed, but the sound source extraction process in Step ST17 has not been executed. Then, a result of the n-th sound source extraction process is defined as $y_1(f,t)$, and an output of the (n+1)-th reference signal generation is defined as r(f,t). Note that it is assumed that the extraction result $y_1(f,t)$ of the n-th sound source extraction process is a value obtained after rescaling application.

At this timing, instead of execution of the sound source extraction process (i.e., the linear filtering process) at the (n+1)-th execution of Step ST17, the extraction filter estimating section 17B may output, as the final extraction result $y_1(f,t)$, a value calculated in accordance with the following Formula (95), that is, the combination of the amplitude of the reference signal r(f,t) and the phase of the previous extraction result $y_1(f,t)$.

Stated differently, the extraction filter estimating section 17B may perform a calculation according to Formula (95) to thereby generate the final extraction result $y_1(f,t)$ on the basis of the amplitude of the reference signal r(f,t) generated in the (n+1)-th execution of Step ST16 and the phase of the extraction result $y_1$(f,t) extracted in the n-th execution of Step ST17.

[Math. 95]

$$r(f,t)\frac{y_1(f,t)}{|y_1(f,t)|} \tag{95}$$

A merit of such a fifth modification example is that, even if the reference signal generation in Step ST16 is a non-linear process such as generation by a DNN, merits of linear filtering such as beamformers can be enjoyed to some extent. This is because a reference signal generated at a time of re-inputting can be expected to be highly precise as compared with the initial execution (have a high ratio of a target sound, and be less distorted) and further, the final extraction result $y_1$(f,t) has also an appropriate phase since a phase attributable to the sound source extraction process (linear filtering) of the previous (immediately preceding) execution of Step ST17 is applied.

On the other hand, the example in the fifth modification example also provides merits of non-linear processing. For example, at a timing when there is no target sound and there is only an interfering sound, it is difficult for a beamformer to output an approximately complete silence, but it is possible in the fifth modification example to output an approximately complete silence.

Sixth Modification Example

Automatic adjustment of parameters of sound source models is explained.

Some sound source models have adjustable parameters. For example, Formula (25), which is the bivariate Laplace distribution, has parameters $c_1$ and $c_2$.

Similarly, Formula (33), which is the TFVV Student-t distribution, has a parameter which is the degree of freedom ν (nu). Hereinafter, these adjustable parameters $c_1$ and $c_2$ and the degree of freedom ν are called sound source model parameters.

It is known that, when a sound source model parameter is changed, such a change influences the sound source extraction precision. For example, the following paper by the inventor compares the extraction result precision of the bivariate Laplace distribution by changing the parameter $c_1$ in a state where the parameter $c_2$ is fixed to one (in the paper, a variable α is used instead of $c_1$, and a is called a reference weight).

"(Non Patent Literature)

"Similarity-and-independence-aware beamformer: Method for target source extraction using magnitude spectrogram as reference,"

arXiv. 2020, doi: 10.21437/interspeech.2020-1365. https://arxiv.org/abs/2006.00772"

The paper described above (Non Patent Literature) has reported as follows.

- In a case where a reference signal is highly precise, the extraction result precision increases when emphasis is placed on the similarity between the reference signal and an extraction result by increasing the value of $c_1$ (e.g., $c_1$=100).
- Conversely, in a case where a reference signal is less precise, the extraction result precision increases when the value of $c_1$ is reduced (e.g., $c_1$=0.01), since this means that relative emphasis is placed on the independence between an extraction result and another imaginary separation result.

However, since it is typically difficult to know the precision of a reference signal at a time of use, it is also difficult to appropriately adjust a sound source model parameter manually at the time of use.

In view of this, in the present sixth modification example, optimum sound source model parameters are also estimated simultaneously when an extraction filter and an extraction result are estimated iteratively. The basic way of thinking includes the following two points.

(1) An objective function including both an extraction result and a sound source model parameter is prepared.

(2) Optimization of the objective function is performed for both the extraction result and the sound source parameter.

Hereinbelow, formulae are explained first, and processes are explained next.

A formula in a case where the bivariate Laplace distribution is used as a sound source model is written at this time as the following Formula (96).

[Math. 96]

$$p(r(f,t), y_1(f,t)) = \frac{1}{\sqrt{c_1(f)+1}}\exp\left(-\sqrt{\frac{c_1(f)r(f,t)^2+|y_1(f,t)|^2}{c_1(f)+1}}\right) \tag{96}$$

Differences of Formula (96) from Formula (25) are the following three points.

- The parameter $c_2$ is fixed to 1.
- The parameter $c_1$ is written as $c_1$(f) since it is adjusted for each frequency bin f.
- The term related to the parameter $c_1$(f) is written without omission.

A premise of Formula (96) is that the mean square in the time direction of the reference signal r(f,t) is 1. Accordingly, as pre-processing, r(f,t) is divided by the square root of $\langle r(f,t)^2\rangle_t$ such that $\langle r(f,t)^2\rangle_t=1$ is satisfied.

In a case where this sound source model (bivariate Laplace distribution) is used, the negative log likelihood can be written as the following Formula (97). The sound source model represented by Formula (97) includes the extraction result $y_1$(f,t) and the parameter $c_1$(f), and minimization of not only the extraction result $y_1$(f,t) but also the parameter $c_1$(f) is performed by using this Formula (97) as an objective function.

Since it is difficult to directly perform minimization of Formula (97), similarly to Formula (45), an inequality like the following Formula (98) based on an auxiliary function is used to minimize Formula (97) (objective function). b(f,t) in Formula (98) is called an auxiliary variable.

[Math. 97]

$$-\sum_t \log p(r(f,t), y_1(f,t)) = \frac{T}{2}\log(c_1(f)+1) + \sum_t\sqrt{\frac{c_1(f)r(f,t)^2+|y_1(f,t)|^2}{c_1(f)+1}} \tag{97}$$

[Math. 98]

$$\leq \frac{T}{2}\log(c_1(f)+1) + \frac{1}{2}\sum_t\left(\frac{c_1(f)r(f,t)^2+|y_1(f,t)|^2}{\{c_1(f)+1\}b(f,t)} + b(f,t)\right) \tag{98}$$

The auxiliary variable b(f,t) and parameter $c_1(f)$ that minimize Formula (98) are represented by the following Formula (99) and Formula (100), respectively. Note that max(A,B) In Formula (100) represents an operation to select one with the larger value of A and B, and lower_limit is a non-negative constant representing the lower limit value of the parameter $c_1(f)$. By performing this operation, the parameter $c_1(f)$ is prevented from becoming smaller than lower_limit.

[Math. 99]

$$b(f,t)=\sqrt{\frac{c_1(f)r(f,t)^2+|y_1(f,t)|^2}{c_1(f)+1}} \tag{99}$$

[Math. 100]

$$c_1(f)=\max\left(\frac{1}{T}\sum_t\left(\frac{|y_1(f,t)|^2-r(f,t)^2}{b(f,t)}\right)-1,\ \text{lower\_limit}\right) \tag{100}$$

Then, the extraction result $y_1(f,t)$ that minimizes Formula (98) is determined by the following Formula (101) or the like. That is, after a weighted covariance matrix of the right side of Formula (101) is calculated, eigenvectors are determined by eigen decomposition.

[Math. 101]

$$[a_{min}(f)\ \ldots\ a_{max}(f)]=eig\left(\sum_t\frac{u(f,t)u(f,t)^H}{\{c_1(f)+1\}b(f,t)}\right) \tag{101}$$

The extraction filter $w_1(f)$ is the Hermitian transpose of the eigenvector corresponding to the smallest eigenvalue (Formula (36)), and the extraction result $y_1(f,t)$ is calculated by setting k to 1 in Formula (9). In which order these formulae are applied is described later.

Regarding other sound source models also, adjustment of sound source model parameters is possible by similar methods.

A formula in a case where the TFVV Student-t distribution is used as a sound source model is written as the following Formula (102) instead of Formula (33) described above. A difference of Formula (102) from Formula (33) is that the degree of freedom ν is written as ν(f) since it is adjusted for each frequency bin f.

[Math. 102]

$$p(r(f,t),y_1(f,t))\propto\frac{1}{r(f,t)^2}\left(1+\frac{2}{\nu(f)}\frac{|y_1(f,t)|^2}{r(f,t)^2}\right)^{-\frac{2+\nu(f)}{2}} \tag{102}$$

In a case where this sound source model (TFVV Student-t distribution) is used, the negative log likelihood can be written as the following Formula (103). Since it is difficult to directly minimize this Formula (103), an inequality like the following Formula (105) is applied to the second log of the right side to obtain Formula (104). b(f,t) in this Formula (104) is called an auxiliary variable.

[Math. 103]

$$-\sum_t\log p(r(f,t),y_1(f,t))=2\sum_t\log(r(f,t))+\frac{2+\nu(f)}{2}\sum_t\log\left(1+\frac{2}{\nu(f)}\frac{|y_1(f,t)|^2}{r(f,t)^2}\right) \tag{103}$$

[Math. 104]

$$\leq 2\sum_t\log(r(f,t))+\frac{2+\nu(f)}{2}\sum_t\left(\frac{1}{b(f,t)}\left(1+\frac{2}{\nu(f)}\frac{|y_1(f,t)|^2}{r(f,t)^2}\right)-1+\log(b(f,t))\right) \tag{104}$$

[Math. 105]

$$\log a\leq\frac{a}{b}-1+\log b \tag{105}$$

The auxiliary variable b(f,t) and degree of freedom ν(f) that minimize Formula (104) are represented by the following Formula (106) and Formula (107), respectively. Then, the extraction result $y_1(f,t)$ that minimizes Formula (104) is determined in accordance with Formula (108), Formula (36), and Formula (9).

[Math. 106]

$$b(f,t)=1+\frac{2}{\nu(f)}\frac{|y_1(f,t)|^2}{r(f,t)^2} \tag{106}$$

[Math. 107]

$$\nu(f)=\frac{2\sqrt{\sum_t\left(\frac{|y_1(f,t)|^2}{b(f,t)r(f,t)^2}\right)}}{\sqrt{\sum_t\left(\frac{1}{b(f,t)}-1+\log(b(f,t))\right)}} \tag{107}$$

[Math. 108]

$$[a_{min}(f)\ \ldots\ a_{max}(f)]=eig\left(\sum_t\frac{2+\nu(f)}{\nu(f)}\frac{u(f,t)u(f,t)^H}{r(f,t)^2b(f,t)}\right) \tag{108}$$

Formulae in a case where the time-frequency-varying scale (TFVS) Cauchy distribution is used as still another sound source model are explained.

The Cauchy distribution includes a parameter called a scale. When the reference signal r(f,t) is interpreted as a scale that changes for each time and frequency, the sound source model can be written as the following Formula (109).

[Math. 109]

$$p(r(f,t),y_1(f,t))\propto\frac{\sqrt{\gamma(f)}\,r(f,t)}{\gamma(f)r(f,t)^2+|y_1(f,t)|^2} \tag{109}$$

The coefficient γ(f) in this Formula (109) is a positive value, and represents a value like the influence of the reference signal. This coefficient γ(f) can become a sound source model parameter.

In a case where this sound source model (TFVS Cauchy distribution) is used, the negative log likelihood can be written as the following Formula (110). In order to minimize this Formula (110), an inequality like Formula (105) is applied to the third log of the right side to obtain Formula (111). b(f,t) in this Formula (111) is called an auxiliary variable.

[Math. 110]

$$-\sum_t \log p(r(f,t), y_1(f,t)) = -\frac{T}{2}\log(\gamma(f)) - \sum_t \log(r(f,t)) + \sum_t \log\left(\gamma(f) r(f,t)^2 + |y_1(f,t)|^2\right) \tag{110}$$

[Math. 111]

$$\leq -\frac{T}{2}\log(\gamma(f)) - \sum_t \log(r(f,t)) + \sum_t \left(\frac{\gamma(f) r(f,t)^2 + |y_1(f,t)|^2}{b(f,t)} - 1 + \log(b(f,t))\right) \tag{111}$$

The auxiliary variable b(f,t) and coefficient γ(f) that minimize Formula (111) are represented by the following Formula (112) and Formula (113), respectively. Then, the extraction result $y_1(f,t)$ that minimizes Formula (111) is determined in accordance with Formula (114), Formula (36), and Formula (9).

[Math. 112]

$$b(f,t) = \gamma(f) r(f,t)^2 + |y_1(f,t)|^2 \tag{112}$$

[Math. 113]

$$\gamma(f) = \frac{2}{\frac{1}{T}\sum_t \frac{r(f,t)^2}{b(f,t)}} \tag{113}$$

[Math. 114]

$$[a_{min}(f) \ \ldots \ a_{max}(f)] = eig\left(\sum_t \frac{u(f,t)u(f,t)^H}{b(f,t)}\right) \tag{114}$$

Next, how to use the formulae explained above in actual processes is explained. Adjustment of sound source model parameters is performed in the extraction filter estimation process in Step ST32 in the sound source extraction process explained with reference to FIG. 11.

Hereinbelow, an extraction filter estimation process corresponding to Step ST32 in FIG. 11 is explained with reference to a flowchart in FIG. 16.

In Step ST91, the extraction filter estimating section 17B assesses whether or not the extraction filter estimation process corresponding to Step ST32 currently performed is the initial execution (is performed for the first time).

For example, in a case where it is assessed in Step ST91 that the currently performed extraction filter estimation process is the initial execution, the process thereafter proceeds to Step ST92, and in a case where it is assessed in Step ST91 that the currently performed extraction filter estimation process is not the initial execution, that is, in a case where it is assessed that the process is the second or subsequent execution, the process thereafter proceeds to Step ST94.

Here, the extraction filter estimation process being the initial execution represents a case where the process proceeds to Step ST32 next to Step ST31 in FIG. 11.

In addition, the extraction filter estimation process being not the initial execution, that is, the process being the second or subsequent execution, represents a case where, in FIG. 11, it is assessed in Step ST33 that the extraction filter has not converged and the process in Step ST32 is performed again.

Note that, in a case where re-inputting of extraction results is performed as in the fourth modification example and fifth modification example described above, the flowchart (sound source extraction process) in FIG. 11 itself is executed multiple times. However, even in such a case, it is assessed in Step ST91 that the process is the initial execution, when the process proceeds to Step ST32 next to Step ST31 in FIG. 11.

In addition, in a case where re-inputting of extraction results is performed, when execution of the flowchart (sound source extraction process) in FIG. 11 is the second or subsequent execution, in the following Step ST92 to Step ST97, the new reference signal r(f,t) generated on the basis of the extraction result $y_1(f,t)$ at the immediately preceding Step ST16 is used.

In a case where it is assessed in Step ST91 that the process is the initial execution, in Step ST92, the extraction filter estimating section 17B generates an initial value of the extraction result $y_1(f,t)$.

In a case where extraction filter estimation is the initial execution, the extraction result $y_1(f,t)$ in the scheme explained with reference to Formula (96) to Formula (114) has not been generated.

In view of this, the extraction filter estimating section 17B generates the extraction result $y_1(f,t)$, that is, an initial value of the extraction result $y_1(f,t)$, by using another scheme.

Examples of schemes that can be used here include, for example, the scheme explained with reference to Formula (34) to Formula (36), that is, an SIBF using TFVV Gauss (TFVV Gaussian distribution).

In this case, for example, the extraction filter estimating section 17B computes the extraction filter $w_1(f)$ from the reference signal r(f,t) and the uncorrelated observation signal u(f,t) in accordance with Formula (35) and Formula (36).

Further, the extraction filter estimating section 17B performs a calculation according to a formula obtained by setting k to 1 in Formula (9), on the basis of the extraction filter $w_1(f)$ and the uncorrelated observation signal u(f,t), to thereby determine the extraction result $y_1(f,t)$, and sets the initial value to the value of the obtained extraction result $y_1(f,t)$.

Next, in Step ST93, the extraction filter estimating section 17B assigns a predetermined value to the initial value of the sound source model parameter.

On the other hand, in a case where it is assessed in Step ST91 that the process is not the initial execution, that is, the extraction filter estimation process is the second or subsequent execution, the process proceeds to Step ST94, and a calculation of the auxiliary variable is performed.

In Step ST94, the extraction filter estimating section 17B performs a calculation of the auxiliary variable b(f,t) on the basis of the extraction result $y_1(f,t)$ and sound source model parameter calculated in the previous extraction filter estimation process.

Specifically, for example, in a case where the bivariate Laplace distribution is used as a sound source model, the extraction filter estimating section 17B performs a calculation according to Formula (99) on the basis of the extraction result $y_1(f,t)$, the parameter $c_1(f)$, which is a sound source model parameter, and the reference signal r(f,t), and determines the auxiliary variable b(f,t).

In addition, for example, in a case where the TFVV Student-t distribution is used as a sound source model, the extraction filter estimating section 17B performs a calculation according to Formula (106) on the basis of the extraction result $y_1(f,t)$, the degree of freedom ν(f), which is a sound source model parameter, and the reference signal r(f,t), and determines the auxiliary variable b(f,t).

Further, for example, in a case where the TFVS Cauchy distribution is used as a sound source model, the extraction filter estimating section 17B performs a calculation according to Formula (112) on the basis of the extraction result $y_1(f,t)$, the coefficient $\gamma(f)$, which is a sound source model parameter, and the reference signal $r(f,t)$, and determines the auxiliary variable $b(f,t)$.

Note that all of the extraction result $y_1(f,t)$, the parameter $c_1(f)$, the degree of freedom $\nu(f)$, and the coefficient $\gamma(f)$ that are used for the calculations of the auxiliary variable $b(f,t)$ are values calculated in the previous extraction filter estimation processes. In addition, the auxiliary variable $b(f,t)$ is calculated for all frequency bins f and all frames t.

In Step ST95, the extraction filter estimating section 17B updates the sound source model parameter.

For example, in a case where the bivariate Laplace distribution is used as a sound source model, the extraction filter estimating section 17B performs a calculation according to Formula (100) on the basis of the extraction result $y_1(f,t)$, the auxiliary variable $b(f,t)$, and the reference signal $r(f,t)$, and determines the parameter $c_1(f)$, which is an updated sound source model parameter.

In addition, for example, in a case where the TFVV Student-t distribution is used as a sound source model, the extraction filter estimating section 17B performs a calculation according to Formula (107) on the basis of the extraction result $y_1(f,t)$, the auxiliary variable $b(f,t)$, and the reference signal $r(f,t)$, and determines the degree of freedom $\nu(f)$, which is an updated sound source model parameter.

Further, for example, in a case where the TFVS Cauchy distribution is used as a sound source model, the extraction filter estimating section 17B performs a calculation according to Formula (113) on the basis of the auxiliary variable $b(f,t)$ and the reference signal $r(f,t)$, and determines the coefficient $\gamma(f)$, which is a sound source model parameter.

In Step ST96, the extraction filter estimating section 17B performs a recalculation of the auxiliary variable $b(f,t)$ on the basis of the extraction result $y_1(f,t)$ and the sound source model parameter.

For example, since formulae such as Formula (99), Formula (106), or Formula (112) for determining the auxiliary variable $b(f,t)$ include sound source model parameters, the auxiliary variable $b(f,t)$ also needs to be updated when the sound source model parameters are updated.

In view of this, by performing a calculation according to Formula (99), Formula (106), or Formula (112) depending on a sound source model by using the updated sound source model parameter obtained in the immediately preceding Step ST95, the extraction filter estimating section 17B computes the auxiliary variable $b(f,t)$ again.

In Step ST97, the extraction filter estimating section 17B updates the extraction filter $w_1(f)$.

That is, the extraction filter estimating section 17B performs a calculation according to any one of Formula (101), Formula (108), and Formula (114) depending on a sound source model on the basis of necessary ones of the uncorrelated observation signal $u(f,t)$, the auxiliary variable $b(f,t)$, the reference signal $r(f,t)$, and the sound source model parameter, and also performs a calculation according to Formula (36) on the basis of a result of the calculation to thereby determine the extraction filter $w_1(f)$.

In addition, the extraction filter estimating section 17B performs a calculation according to a formula obtained by setting k to 1 in Formula (9), on the basis of the extraction filter $w_1(f)$ and the uncorrelated observation signal $u(f,t)$, to thereby determine (generate) the extraction result $y_1(f,t)$.

Figure 16:
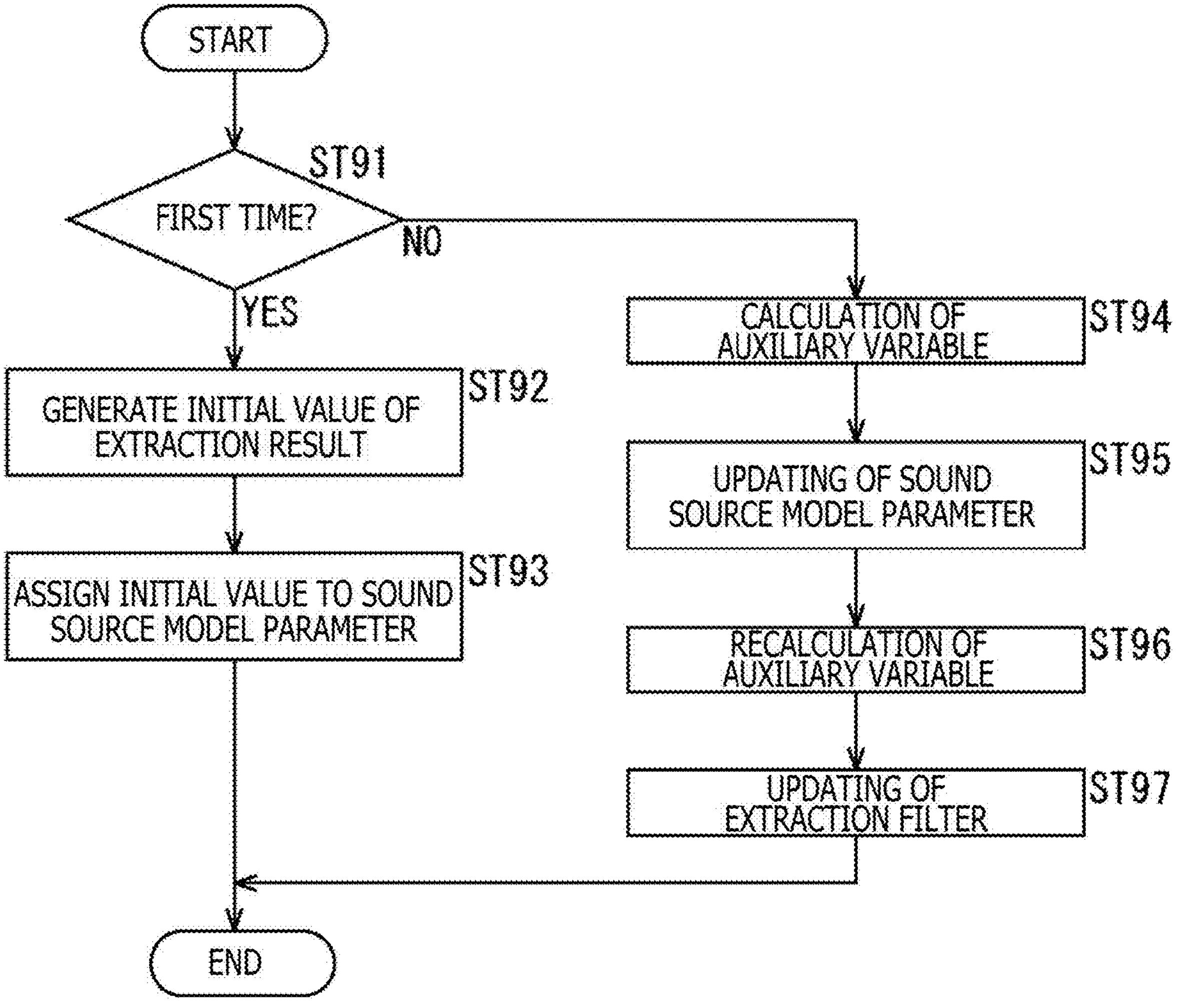
FIG. 16 is a flowchart for explaining an extraction filter estimation process.

After the extraction filter $w_1(f)$ and the extraction result $y_1(f,t)$ are obtained in the manner described above, the extraction filter estimation process in FIG. 16 ends.

In Step ST94 to Step ST97, updating (optimization) of the sound source model parameter and updating (optimization) of the extraction filter $w_1(f)$, that is, optimization of the extraction result $y_1(f,t)$, are performed alternately to thereby optimize the objective function. Stated differently, as a solution that optimizes the objective function, both the sound source model parameter and the extraction filter $w_1(f)$ are estimated.

As described above, after the process in Step ST93 or Step ST97 is performed and the extraction filter estimation process ends, which means that the process in Step ST32 in FIG. 11 has been performed, the process hence proceeds to Step ST33 in FIG. 11.

By iterative execution of the extraction filter estimation process explained with reference to FIG. 16 at the sound source extracting section 17, not only the extraction result $y_1(f,t)$ but also the sound source model parameter converge to a predetermined value. That is, the sound source model parameter also is adjusted automatically.

Accordingly, the extraction result $y_1(f,t)$ can be obtained more precisely. Stated differently, the precision of target sound extraction can be improved.

Note that the sixth modification example can be combined with other modification examples. For example, in a case where it is desired to combine the sixth modification example with modifications into multitap forms in the second modification example and the third modification example, it is sufficient if $u''(f,t)$ calculated in accordance with Formula (80) to Formula (84) is used instead of the uncorrelated observation signal $u(f,t)$ in Formula (101), Formula (108), and Formula (114). In addition, in a case where it is desired to combine the sixth modification example with re-inputting described in the fifth modification example, it is sufficient if an extraction result generated by the technique of the sixth modification example is re-input to the reference signal generating section 16 and an output therefrom is used as a reference signal.

<Configuration Example of Computer>

Meanwhile, the series of processing described above can also be executed by hardware or can also be executed by software. In a case where the series of processing is executed by software, a program included in the software is installed on a computer. Here, the computer includes a computer incorporated in dedicated hardware and a general-purpose personal computer, for example, which can execute various types of functionalities by having various types of programs installed thereon, for example.

Figure 17:
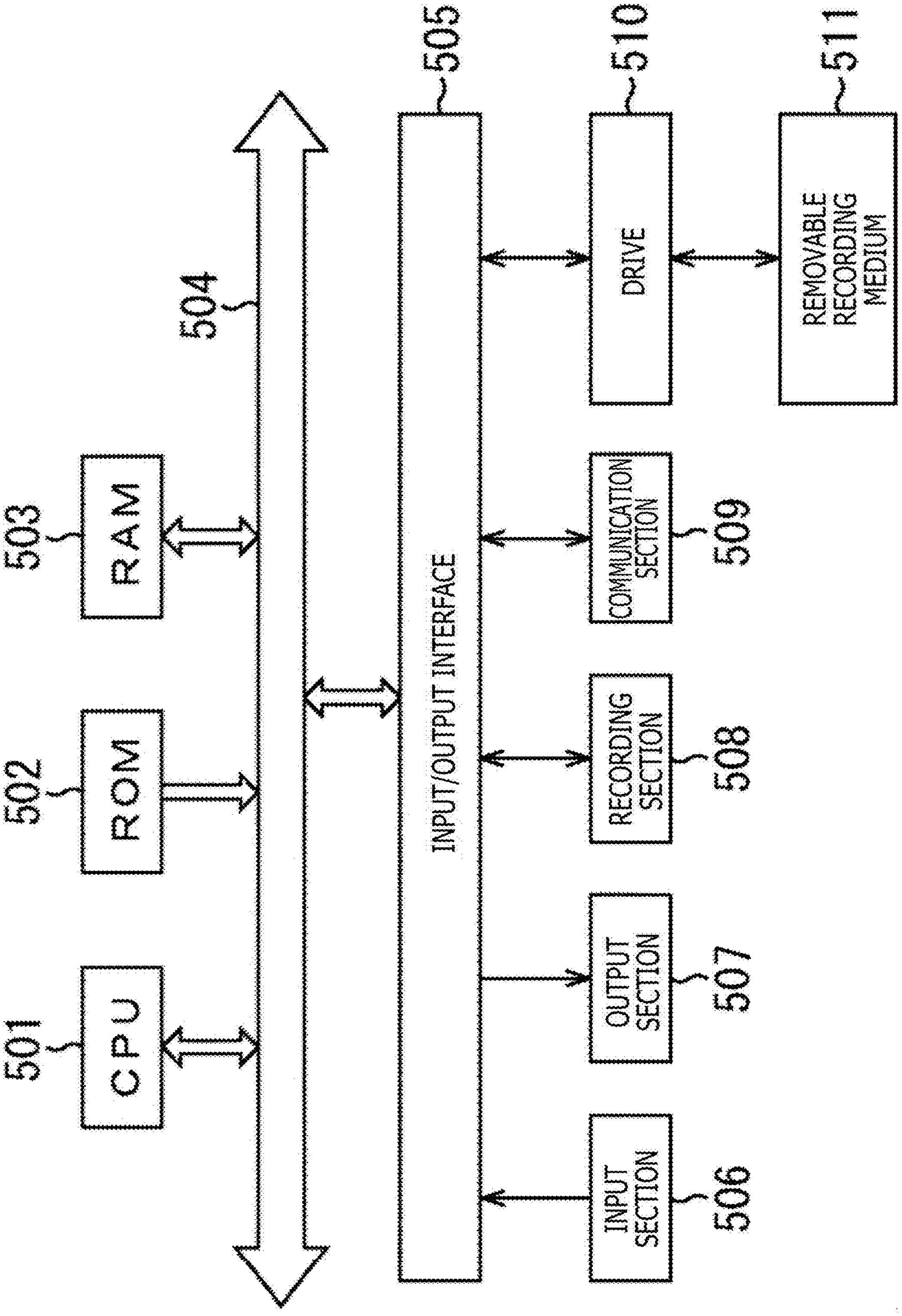
FIG. 17 is a figure depicting a configuration example of a computer.

FIG. 17 is a block diagram depicting a configuration example of the hardware of a computer that executes the series of processing described above by a program.

In the computer, a CPU (Central Processing Unit) 501, a ROM (Read Only Memory) 502, and a RAM (Random Access Memory) 503 are interconnected by a bus 504.

The bus 504 is further connected with an input/output interface 505. The Input/output interface 505 is connected with an input section 506, an output section 507, a recording section 508, a communication section 509, and a drive 510.

The input section 506 includes a keyboard, a mouse, a microphone, an imaging element, and the like. The output section 507 includes a display, a speaker unit, and the like. The recording section 508 includes a hard disk, a non-volatile memory, and the like. The communication section 509 includes a network interface and the like. The drive 510 drives a removable recording medium 511 such as a magnetic disc, an optical disc, a magneto-optical disc, or a semiconductor memory.

In the computer configured as described above, for example, the CPU 501 loads a program recorded on the recording section 508 onto the RAM 503 via the input/output interface 505 and the bus 504, and executes the program to thereby perform the series of processing described above.

The program executed by the computer (CPU 501) can be provided being recorded on the removable recording medium 511 as a package medium or the like, for example. In addition, the program can be provided via a wired or wireless transfer medium such as a local area network, the Internet, or digital satellite broadcasting.

At the computer, by attaching the removable recording medium 511 to the drive 510, the program can be installed on the recording section 508 via the input/output interface 505. In addition, the program can be received at the communication section 509 via a wired or wireless transfer medium and installed on the recording section 508. In addition to them, the program can be installed in advance on the ROM 502 or the recording section 508.

Note that the program executed by the computer may be a program that performs processes in a temporal sequence along an order explained in the present specification or may be a program that performs processes in parallel or at necessary timings such as timings when those processes are called.

In addition, embodiments of the present technology are not limited to the embodiment described above, and can be changed in various manners within the scope not departing from the gist of the present technology.

For example, the present technology can be configured as cloud computing in which one functionality is shared among multiple apparatuses via a network and is processed by the multiple apparatuses in cooperation with each other.

In addition, other than being executed on one apparatus, each step explained in a flowchart described above can be shared and executed by multiple apparatuses.

Further, in a case where one step includes multiple processes, other than being executed on one apparatus, the multiple processes included in the one step can be shared among and executed by multiple apparatuses.

Further, the present technology can also have configurations like the ones below.

(1)

A signal processing apparatus including:

a reference signal generating section that generates a reference signal corresponding to a target sound on the basis of a mixed sound signal which is recorded with multiple microphones arranged at different positions and is a mixture of the target sound and a non-target sound; and a sound source extracting section that extracts, from the mixed sound signal of one frame or multiple frames, a signal of one frame which is similar to the reference signal and in which the target sound is more enhanced.

(2)

The signal processing apparatus according to (1), in which the sound source extracting section extracts the signal of a predetermined frame from the mixed sound signal of the multiple frames including the predetermined frame and a past frame before the predetermined frame.

(3)

The signal processing apparatus according to (2), in which the sound source extracting section extracts the signal of the predetermined frame from the mixed sound signal of the multiple frames including the predetermined frame, the past frame, and a future frame after the predetermined frame.

(4)

The signal processing apparatus according to any one of (1) to (3), in which the sound source extracting section extracts the signal of one frame from a mixed sound signal of one frame equivalent to multiple channels obtained by stacking the mixed sound signal of the multiple frames while shifting the mixed sound signal of the multiple frames in a time direction.

(5)

A signal processing method performed by a signal processing apparatus, the signal processing method including:

generating a reference signal corresponding to a target sound on the basis of a mixed sound signal which is recorded with multiple microphones arranged at different positions and is a mixture of the target sound and a non-target sound; and extracting, from the mixed sound signal of one frame or multiple frames, a signal of one frame which is similar to the reference signal and in which the target sound is more enhanced.

(6)

A program that causes a computer to execute:

a process of generating a reference signal corresponding to a target sound on the basis of a mixed sound signal which is recorded with multiple microphones arranged at different positions and is a mixture of the target sound and a non-target sound; and a process of extracting, from the mixed sound signal of one frame or multiple frames, a signal of one frame which is similar to the reference signal and in which the target sound is more enhanced.

(7)

A signal processing apparatus including:

a reference signal generating section that generates a reference signal corresponding to a target sound on the basis of a mixed sound signal which is recorded with multiple microphones arranged at different positions and is a mixture of the target sound and a non-target sound; and a sound source extracting section that extracts, from the mixed sound signal, a signal which is similar to the reference signal and in which the target sound is more enhanced, in which, in a case where a process of generating the reference signal and a process of extracting the signal from the mixed sound signal are performed iteratively, the reference signal generating section generates a new reference signal on the basis of the signal extracted from the mixed sound signal, and the sound source extracting section extracts the signal from the mixed sound signal on the basis of the new reference signal.

(8)

The signal processing apparatus according to (7), in which the reference signal generating section generates the new reference signal by inputting the signal extracted from the mixed sound signal to a neural network that extracts the target sound.

(9)

The signal processing apparatus according to (7) or (8), in which the sound source extracting section generates a final signal on the basis of amplitude of the reference signal generated at an (n+1)-th iteration by the reference signal generating section and a phase of the signal extracted from the mixed sound signal at an n-th iteration.

(10)

The signal processing apparatus according to any one of (7) to (9), in which the sound source extracting section extracts the signal of one frame from the mixed sound signal of one frame or multiple frames.

(11)

The signal processing apparatus according to (10), in which the sound source extracting section extracts the signal of one frame from a mixed sound signal of one frame equivalent to multiple channels obtained by stacking the mixed sound signal of the multiple frames while shifting the mixed sound signal of the multiple frames in a time direction.

(12)

A signal processing method performed by a signal processing apparatus, the signal processing method including:

a process of generating a reference signal corresponding to a target sound on the basis of a mixed sound signal which is recorded with multiple microphones arranged at different positions and is a mixture of the target sound and a non-target sound; and a process of extracting, from the mixed sound signal, a signal which is similar to the reference signal and in which the target sound is more enhanced, in which, in a case where the process of generating the reference signal and the process of extracting the signal from the mixed sound signal are performed iteratively, the signal processing apparatus generates a new reference signal on the basis of the signal extracted from the mixed sound signal, and the signal processing apparatus extracts the signal from the mixed sound signal on the basis of the new reference signal.

(13)

A program that causes a computer to execute:

a process of generating a reference signal corresponding to a target sound on the basis of a mixed sound signal which is recorded with multiple microphones arranged at different positions and is a mixture of the target sound and a non-target sound; and a process of extracting, from the mixed sound signal, a signal which is similar to the reference signal and in which the target sound is more enhanced, in which, in a case where the process of generating the reference signal and the process of extracting the signal from the mixed sound signal are performed iteratively, the program causes the computer to execute a process of generating a new reference signal on the basis of the signal extracted from the mixed sound signal, and a process of extracting the signal from the mixed sound signal on the basis of the new reference signal.

(14)

A signal processing apparatus including:

a reference signal generating section that generates a reference signal corresponding to a target sound on the basis of a mixed sound signal which is recorded with multiple microphones arranged at different positions and is a mixture of the target sound and a non-target sound; and a sound source extracting section that estimates an extraction filter as a solution that optimizes an objective function that includes an extraction result being a signal which is similar to the reference signal and in which the target sound is more enhanced by the extraction filter, and an adjustable parameter of a sound source model representing similarity between the extraction result and the reference signal, the objective function reflecting independence and the similarity between the extraction result and a separation result of another imaginary sound source, and extracts the signal from the mixed sound signal on the basis of the estimated extraction filter.

(15)

The signal processing apparatus according to (14), in which a process of estimating the extraction filter and extracting the signal from the mixed sound signal is performed iteratively.

(16)

The signal processing apparatus according to (15), in which the sound source extracting section performs updating of the parameter and updating of the extraction filter alternately.

(17)

The signal processing apparatus according to (15) or (16), in which, in a case where a process of generating the reference signal and a process of estimating the extraction filter and extracting the signal from the mixed sound signal are performed iteratively, the reference signal generating section generates a new reference signal on the basis of the signal extracted from the mixed sound signal, and the sound source extracting section estimates a new extraction filter on the basis of the new reference signal, the parameter, and the signal extracted from the mixed sound signal.

(18)

The signal processing apparatus according to any one of (14) to (17), in which the sound source model is any one of a bivariate spherical distribution of the extraction result and the reference signal, a time-frequency-varying variance model that regards the reference signal as a value corresponding to a variance of each time frequency, and a time-frequency-varying scale Cauchy distribution.

(19)

A signal processing method performed by a signal processing apparatus, the signal processing method including:

generating a reference signal corresponding to a target sound on the basis of a mixed sound signal which is recorded with multiple microphones arranged at different positions and is a mixture of the target sound and a non-target sound;

estimating an extraction filter as a solution that optimizes an objective function that includes an extraction result being a signal which is similar to the reference signal and in which the target sound is more enhanced by the extraction filter, and an adjustable parameter of a sound source model representing similarity between the extraction result and the reference signal, the objective function reflecting independence and the similarity between the extraction result and a separation result of another imaginary sound source; and extracting the signal from the mixed sound signal on the basis of the estimated extraction filter.

(20)

A program that causes a computer to execute:

a process of generating a reference signal corresponding to a target sound on the basis of a mixed sound signal which is recorded with multiple microphones arranged at different positions and is a mixture of the target sound and a non-target sound;

a process of estimating an extraction filter as a solution that optimizes an objective function that includes an extraction result being a signal which is similar to the reference signal and in which the target sound is more enhanced by the extraction filter, and an adjustable parameter of a sound source model representing similarity between the extraction result and the reference signal, the objective function reflecting independence and the similarity between the extraction result and a separation result of another imaginary sound source; and a process of extracting the signal from the mixed sound signal on the basis of the estimated extraction filter.

REFERENCE SIGNS LIST

11: Microphone
12: AD converting section
13: STFT section
15: Zone estimating section
16: Reference signal generating section
17: Sound source extracting section
17A: Pre-processing section
17B: Extraction filter estimating section
17C: Post-processing section
18: Control section
19: Post-processing section
20: Zone/reference signal estimation sensor

The invention claimed is:

1. A signal processing apparatus, comprising:

a reference signal generating section configured to generate a reference signal, corresponding to a target sound, based on a mixed sound signal, wherein the mixed sound signal is recorded with multiple microphones, the multiple microphones are arranged at different positions, and the mixed sound signal is a mixture of the target sound and a non-target sound; and a sound source extracting section configured to extract, from the mixed sound signal of multiple frames, a signal of a first frame of the multiple frames, wherein the signal of the first frame is similar to the reference signal, the target sound is enhanced in the signal of the first frame, the signal of the first frame is extracted from the mixed sound signal of the multiple frames, the multiple frames include the first frame and a second frame, and the second frame is before the first frame.

2. The signal processing apparatus according to claim 1, wherein the sound source extracting section is further configured to extract the signal of the first frame from the mixed sound signal of the multiple frames, the multiple frames further include third frame, and the third frame is after the first frame.

3. The signal processing apparatus according to claim 1, wherein the sound source extracting section is further configured to extract the signal of the first frame from the mixed sound signal of the first frame, the mixed sound signal of the first frame is equivalent to multiple channels, and the multiple channels are obtained by stacking the mixed sound signal of the multiple frames based on shift of the mixed sound signal of the multiple frames in a time direction.

4. A signal processing method, comprising:

generating a reference signal, corresponding to a target sound, based a mixed sound signal, wherein the mixed sound signal is recorded with multiple microphones, the multiple microphones are arranged at different positions, and the mixed sound signal is a mixture of the target sound and a non-target sound; and extracting, from the mixed sound signal of multiple frames, a signal of a first frame of the multiple frames, wherein the signal of the first frame is similar to the reference signal, the target sound is enhanced in the signal of the first frame, the signal of the first frame is extracted from the mixed sound signal of the multiple frames, the multiple frames include the first frame and a second frame, and the second frame is before the first frame.

5. A non-transitory computer-readable medium having stored thereon, computer-executable instructions which, when executed by a computer, cause the computer to execute operations, the operations comprising:

generating a reference signal, corresponding to a target sound, based on a mixed sound signal, wherein the mixed sound signal is recorded with multiple microphones, the multiple microphones are arranged at different positions, and the mixed sound signal is a mixture of the target sound and a non-target sound; and extracting, from the mixed sound signal of multiple frames, a signal of a first frame of the multiple frames, wherein the signal of the first frame is similar to the reference signal, the target sound is enhanced in the signal of the first frame, the signal of the first frame is extracted from the mixed sound signal of the multiple frames, the multiple frames include the first frame and a second frame, and the second frame is before the first frame.

6. A signal processing apparatus, comprising:

a reference signal generating section configured to generate a reference signal, corresponding to a target sound, based on a mixed sound signal, wherein the mixed sound signal is recorded with multiple microphones, the multiple microphones are arranged at different positions, and the mixed sound signal is a mixture of the target sound and a non-target sound; and a sound source extracting section configured to extract, from the mixed sound signal, a final signal, wherein the final signal is similar to the reference signal, the target sound is enhanced in the final signal, and in a case where a process of the generation of the reference signal and a process of the extraction of the final signal from the mixed sound signal are executed iteratively:

the reference signal generating section is further configured to generate a new reference signal based on the final signal extracted at an n-th iteration from the mixed sound signal; and the sound source extracting section is further configured to extract a new final signal from the mixed sound signal based on the new reference signal, wherein the new final signal is extracted based on each of an amplitude of the new reference signal generated at an (n+1)-th iteration and a phase of the final signal extracted from the mixed sound signal at the n-th iteration.

7. The signal processing apparatus according to claim 6, wherein the reference signal generating section is further configured to generate the new reference signal based on an input of the final signal extracted from the mixed sound signal to a neural network, and the neural network extracts the target sound.

8. The signal processing apparatus according to claim 6, wherein the sound source extracting section is further configured to extract the final signal of one frame of multiple frames from the mixed sound signal of one of the one frame or the multiple frames.

9. The signal processing apparatus according to claim 8, wherein the sound source extracting section is further configured to extract the final signal of the one frame from the mixed sound signal of the one frame, the mixed sound signal of the one frame is equivalent to multiple channels, and the multiple channels are obtained by stacking the mixed sound signal of the multiple frames based on shift of the mixed sound signal of the multiple frames in a time direction.

10. A signal processing method, comprising:

generating a reference signal, corresponding to a target sound, based on a mixed sound signal, wherein the mixed sound signal is recorded with multiple microphones, the multiple microphones are arranged at different positions, and the mixed sound signal is a mixture of the target sound and a non-target sound; and extracting, from the mixed sound signal, a final signal, wherein the final signal is similar to the reference signal, the target sound is enhanced in the final signal, and in a case where a process of the generation of the reference signal and a process of the extraction of the final signal from the mixed sound signal are executed iteratively;

generating, by a signal processing apparatus, a new reference signal based on the final signal extracted at an n-th iteration from the mixed sound signal; and extracting, by the signal processing apparatus, a new final signal from the mixed sound signal based on the new reference signal, wherein the new final signal is extracted based on each of an amplitude of the new reference signal generated at an (n+1)-th iteration and a phase of the final signal extracted from the mixed sound signal at the n-th iteration.

11. A non-transitory computer-readable medium having stored thereon, computer-executable instructions which, when executed by a computer, cause the computer to execute operations, the operations comprising:

generating a reference signal, corresponding to a target sound, based on a mixed sound signal, wherein the mixed sound signal is recorded with multiple microphones, the multiple microphones are arranged at different positions, and the mixed sound signal is a mixture of the target sound and a non-target sound; and extracting, from the mixed sound signal, a final signal, wherein the final signal is similar to the reference signal, the target sound is enhanced in the final signal, and in a case where a process of the generation of the reference signal and a process of the extraction of the final signal from the mixed sound signal are executed iteratively, the operations further comprising:

generating a new reference signal based on the final signal extracted at an n-th iteration from the mixed sound signal; and extracting a new final signal from the mixed sound signal based on the new reference signal, wherein the new final signal is extracted based on each of an amplitude of the new reference signal generated at an (n+1)-th iteration and a phase of the final signal extracted from the mixed sound signal at the n-th iteration.

12. A signal processing apparatus, comprising:

a reference signal generating section configured to generate a reference signal, corresponding to a target sound, based on a mixed sound signal, wherein the mixed sound signal is recorded with multiple microphones, the multiple microphones are arranged at different positions, and the mixed sound signal is a mixture of the target sound and a non-target sound; and a sound source extracting section configured to:

estimate an extraction filter as a solution that optimizes an objective function, wherein the objective function includes:

an extraction result, wherein the extraction result includes a specific signal which is similar to the reference signal, and the target sound is enhanced by the extraction filter in the specific signal; and an adjustable parameter of a sound source model, wherein the sound source model represents similarity between the extraction result and the reference signal, and the objective function reflects each of:

the similarity between the extraction result and the reference signal, and independence between the extraction result and a separation result of an imaginary sound source; and extract the specific signal from the mixed sound signal based on the estimated extraction filter.

13. The signal processing apparatus according to claim 12, wherein a process of each of the estimation of the extraction filter and the extraction of the specific signal from the mixed sound signal is executed iteratively.

14. The signal processing apparatus according to claim 2, wherein the sound source extracting section is further configured to update the adjustable parameter and update the extraction filter alternately.

15. The signal processing apparatus according to claim 13, wherein in a case where the process of the generation of the reference signal and the process of the estimation of the extraction filter and the extraction of the specific signal from the mixed sound signal are executed iteratively:

the reference signal generating section is further configured to generate a new reference signal based on the specific signal extracted from the mixed sound signal; and the sound source extracting section is further configured to estimate a new extraction filter based on of the new reference signal, the adjustable parameter, and the specific signal extracted from the mixed sound signal.

16. The signal processing apparatus according to claim 12, wherein the sound source model is one of:

a bivariate spherical distribution of the extraction result and the reference signal, a time-frequency-varying variance model that regards the reference signal as a value corresponding to a variance of each time frequency, or a time-frequency-varying scale Cauchy distribution.

17. A signal processing method, comprising:

generating a reference signal, corresponding to a target sound, based on a mixed sound signal, wherein the mixed sound signal is recorded with multiple microphones, the multiple microphones are arranged at different positions, and the mixed sound signal is a mixture of the target sound and a non-target sound;

estimating an extraction filter as a solution that optimizes an objective function, wherein the objective function includes;

an extraction result, wherein the extraction result includes a specific signal which is similar to the reference signal, and the target sound is enhanced by the extraction filter in the specific signal; and an adjustable parameter of a sound source model, wherein the sound source model represents similarity between the extraction result and the reference signal, and the objective function reflects each of the similarity between the extraction result and the reference signal and independence between the extraction result and a separation result of an imaginary sound source; and extracting the specific signal from the mixed sound signal based on the estimated extraction filter.

18. A non-transitory computer-readable medium having stored thereon, computer-executable instructions which, when executed by a computer, cause the computer to execute operations, the operations comprising:

generating a reference signal, corresponding to a target sound, based on a mixed sound signal, wherein the mixed sound signal is recorded with multiple microphones, the multiple microphones are arranged at different positions, and the mixed sound signal is a mixture of the target sound and a non-target sound;

estimating an extraction filter as a solution that optimizes an objective function, wherein the objective function includes:

an extraction result, wherein the extraction result includes a specific signal which is similar to the reference signal, and the target sound is enhanced by the extraction filter in the specific signal; and an adjustable parameter of a sound source model, wherein the sound source model represents similarity between the extraction result and the reference signal, and the objective function reflects each of the similarity between the extraction result and the reference signal and independence between the extraction result and a separation result of an imaginary sound source; and extracting the specific signal from the mixed sound signal based on the estimated extraction filter.

* * * * *